(12) United States Patent
Tang et al.

(10) Patent No.: US 10,833,585 B2
(45) Date of Patent: Nov. 10, 2020

(54) SCALABLE SWITCHED CAPACITOR INTEGRATED BUCK (SCIB) REGULATOR FOR HIGH CONVERSION STEP DOWN APPLICATION

(71) Applicant: Texas Instruments Incorporated, Dallas, TX (US)

(72) Inventors: Yichao Tang, Santa Clara, CA (US); Sombuddha Chakraborty, Redwood City, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/207,051

(22) Filed: Nov. 30, 2018

(65) Prior Publication Data

US 2019/0273436 A1    Sep. 5, 2019

Related U.S. Application Data

(60) Provisional application No. 62/637,856, filed on Mar. 2, 2018.

(51) Int. Cl.
   *H02M 3/158*    (2006.01)
   *H02M 3/07*     (2006.01)

(52) U.S. Cl.
   CPC ......... *H02M 3/158* (2013.01); *H02M 3/1584* (2013.01); *H02M 2003/072* (2013.01)

(58) Field of Classification Search
   CPC ............ H02M 3/07; H02M 2003/071; H02M 2003/072; H02M 2003/0778; H02M 2001/0067; H02M 2001/007; H02M 2001/0074; H02M 2001/008
   See application file for complete search history.

(56) References Cited

U.S. PATENT DOCUMENTS

| | | | | |
|---|---|---|---|---|
| 10,404,175 | B2 * | 9/2019 | Chakraborty | ....... H02M 3/1588 |
| 10,523,121 | B2 * | 12/2019 | Zhao | ..................... H02M 3/156 |
| 10,547,241 | B1 * | 1/2020 | Li | ........................... H02M 3/07 |
| 2008/0239772 | A1 * | 10/2008 | Oraw | ..................... H02M 3/07 363/60 |

(Continued)

OTHER PUBLICATIONS

Li, et al., Google 48V Power Architecture, Mar. 27, 2017, 15 pages.

(Continued)

*Primary Examiner* — Alex Torres-Rivera
(74) *Attorney, Agent, or Firm* — Michael A. Davis, Jr.; Charles A. Brill; Frank D. Cimino

(57) ABSTRACT

Described herein is a technology for implementing a scalable SCIB regulator for high conversion step down application. Particularly, the SCIB is configured to include stacked input switch circuits with parallel-connected output switch circuits. The input switch circuits are stacked with or without DC shift switch circuits in between. Furthermore, the input voltage is stepped down to a biasing voltage by input switch circuits and then is regulated to one or more output voltages having one or more independent and predetermined values by output switch circuits. The input switch circuits, output switch circuits and DC shift switch circuits can be modified for scalable power capability and ease of control and manufacturing.

13 Claims, 49 Drawing Sheets

(56) References Cited

U.S. PATENT DOCUMENTS

| | | | | |
|---|---|---|---|---|
| 2015/0207401 A1* | 7/2015 | Zhang | ............... | H02M 3/158 323/271 |
| 2018/0026518 A1* | 1/2018 | Liu | ............... | H02M 3/1584 323/312 |
| 2019/0348913 A1* | 11/2019 | Zhang | ............... | H02M 1/36 |
| 2019/0372457 A1* | 12/2019 | Zhang | ............... | H02M 3/158 |

OTHER PUBLICATIONS

Hybrid Step-Down Synchronous Controller, Analog Devices, LTC7821, 2017-2018, 36 pages.

Shenoy, Introduction to the Series Capacitor Buck Converter, Apr. 2016, 15 pages, Texas Instruments Incorporated.

Meynard, et al., Multi-Level Conversion: High Voltage Choppers and Voltage-Source Inverters, 1992, 7 pages, IEEE.

48V: An Improved Power Delivery System for Data Centers, White Paper, Jun. 2017, 19 pages, Wiwynn.

Shehabi, et al., United States Data Center Energy Usage Report, Jun. 2016, ETA Publications, Lawrence Berkeley National Lab Report for USDOE.

http://www.opencompute.org/.

ST Microelectronics, 48V Direct Conversion to CPU, Memory or ASIC, Proceedings of APEC 2017.

Ahmed, et al., High-Efficiency High-Power Density 48/1V Sigma Converter Voltage Regulator Module, Conference Proceedings—IEEE Applied Power Electronics Conference and Exposition, 2017.

He, et al., Switched tank converter based partial power architecture for voltage regulation applications, Applied Power Electronics Conference and Exposition (APEC), 2018 IEEE, pp. 91-97.

Bemat, et al., 2 stage solutions for Datacenters, Applied Power Electronics Conference and Exposition (APEC), 2018 IEEE, Industrial Session.

* cited by examiner

US 10,833,585 B2

SCALABLE SWITCHED CAPACITOR INTEGRATED BUCK (SCIB) REGULATOR FOR HIGH CONVERSION STEP DOWN APPLICATION

RELATED APPLICATIONS

This application claims the benefit of priority of U.S. Provisional Patent Application No. is 62/637,856 filed Mar. 2, 2018 incorporated herein by reference.

BACKGROUND

Data center energy consumption has steadily grown. Such growth can be attributable to increases in large "hyperscale" data centers and moving previously localized data center activity to cloud facilities. Along with total server count, the power demand for each server has also increased.

To meet the increased current demand, new datacenter power architectures are gaining significant adoption. Increasing the server rack distribution bus to 54V from traditional 12V can lower loss by three quarters and increase energy density of turbo cap backup, where turbo cap backup is parallel to battery backup and used to sustain surge current. This allows increasing the rack power level to 30 kW from existing 5 kW without increased copper backplane. However, at the board level, stepping down or converting 54V to a low voltage with similar transient performance and footprint target as traditional 12V solution, and even so at a higher power levels poses challenges. Various semiconductor solution vendors have taken the emerging 54V market very seriously and have invested significantly in developing innovative solutions to respond to market demand.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein is a technology for implementing a scalable switch capacitor integrated buck or SCIB regulator for high conversion step down application. For example, a voltage step down dc-dc converter includes: one or more input switch circuits connected in series, where one of the input switch circuits receives an input voltage (Vin); one or more DC shift switch circuits, a DC shift switch circuit is connected in series with the input switch circuits; and one or more output switch circuits connected in parallel with one another, and connected in series with the input switch circuits and the DC shift switch circuits, the input switch circuits step down the input voltage to a biasing voltage (Vbias) with a fixed ratio, and the output switch circuits comprise buck regulator circuits to regulate the biasing voltage to one or more predetermined output voltage (Vout), and wherein the input switch circuit and the output switch circuit includes another DC shift switch circuit when the output switch circuit is disconnected to the output (Vout), and the DC shift switch circuits compensate the voltage difference between the input switch circuits.

Figure 1:
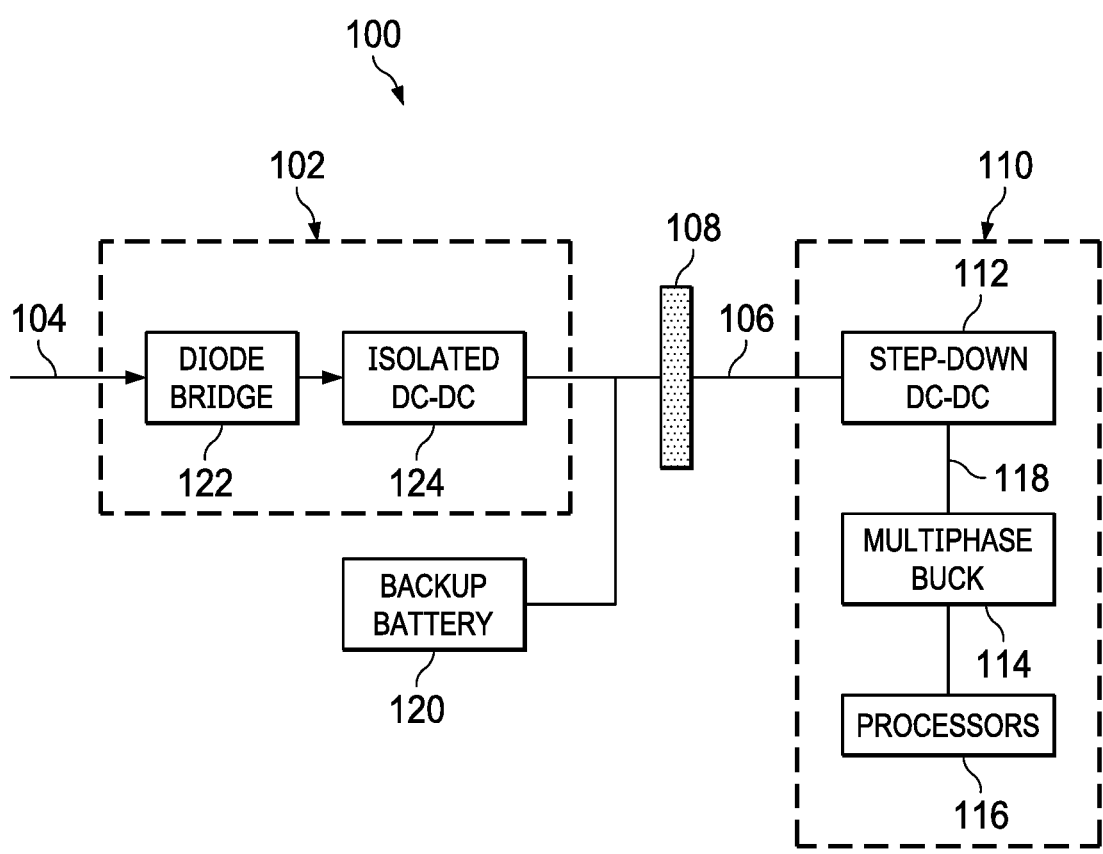
FIG. 1 is a power supply architecture as described in present implementations herein.

FIG. 1 is an example power supply architecture 100 as described in present implementations herein. The power supply architecture 100 may be implemented in a server power supply system where a high input power is down converted for subsequent utilization by devices with lower voltage capacities. The devices may include a CPU/GPU/TPU, a desktop computer, a laptop, a mobile phone, or other types of computing devices. As shown, the power supply architecture 100 includes a power supply unit (PSU) 102 that receives a high power—input 104 of about 226-270 VAC (volt alternating current). The PSU 102 rectifies the input 104 to about 40-60 VDC (volt direct current), and the 40-60V is supplied as an input voltage (Vin) 106 through a bus bar 108 (DC) to a motherboard 110.

In certain implementations, the motherboard 110 includes a step-down DC-DC component 112, a multiphase Buck 114, and processors 116. The step-down DC-DC component 112 may include an SCIB circuit that receives the Vin 106 and performs a down conversion to supply a regulated output voltage (Vout) 118 of about 3-15V to the multiphase Buck 114. The multiphase Buck 114 may couple the step-down DC-DC component 112 to the processors 116.

The power supply architecture 100 further illustrates a backup battery 120 that supplies the input voltage 106 in case of power failure at the PSU 102 where the PSU 102 may not be able to supply the necessary voltage at the bus bar 108. The PSU 102 further includes a diode bridge 122 and an isolated DC-DC 124 to rectify the input 104 to about 48-54V at the bus bar 108.

Figure 2:
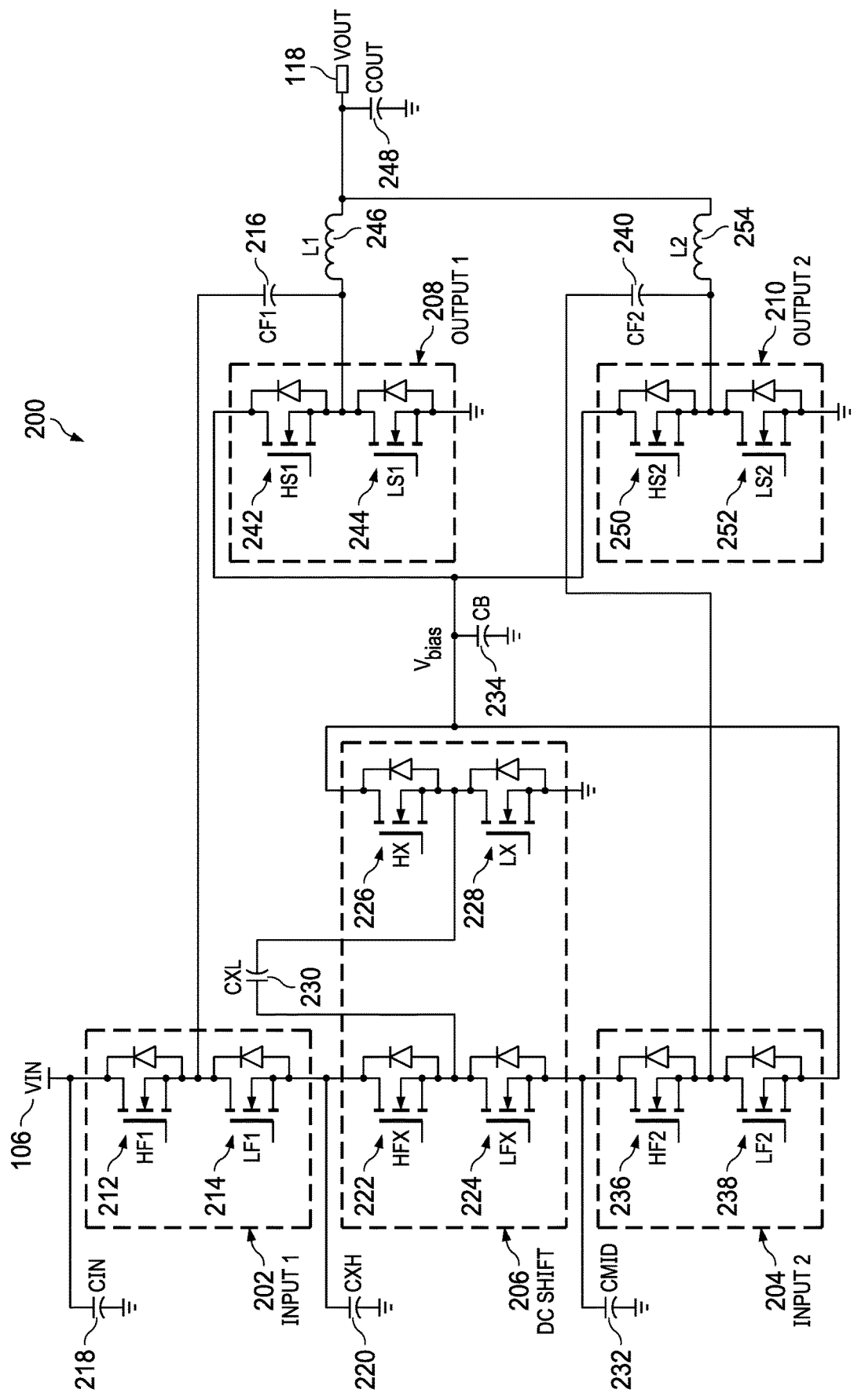
FIGS. 2, 6, 10, 14, 18A, 18B, 22A, 22B, 26A, 26B, 30A, 30B and 34 are block diagrams of example variations of a scalable switched cap integrated buck (SCIB) circuit as described in present implementations herein.

FIG. 2 is an example SCIB circuit 200 as described in present implementations herein. Particularly, the SCIB circuit 200 is one of primary variant circuits described herein that merges a Dickson based switched capacitor converter with a buck half-bridge converter to generate, for example, a voltage step down dc-dc converter. The example SCIB circuit 200 is an example implementation of the step-down DC-DC component 112.

With the increase in CPU/GPU/TPU current demand, a need to lower the distribution loss has prompted the growth, for example, of 54V bus power delivery from data center PSU 102 to the processors 116. The SCIB circuit 200 is an embodiment of the first stage of an efficient two stage power architecture that is scalable, flexible, and compatible with existing microcontrollers or CPUs. The SCIB circuit 200 generates a regulated low output voltage and further includes one or more switched capacitor converters with inputs in stack and outputs in parallel (ISOP). The ISOP is utilized for down conversion with low voltage switches and the inputs are stacked by using or not using a DC shift switch circuit as described herein.

As shown, the SCIB circuit 200 includes a first input switch circuit 202 that is connected in series with a second input switch circuit 204. The first input switch circuit 202 can be stacked with the second input switch circuit 204 through a DC shift switch circuit 206. The SCIB circuit 200 further shows a first output circuit 208 that is connected in parallel with a second output circuit 210 to generate a regulated intermediate bus voltage (IBV) output 118. For example, the IBV output 118 is a predetermined output voltage of about 0.5-15 volts. In this example, IBV output 118 can allow a low voltage that goes to a dc-dc converter (e.g., multiphase buck 114) or a load (e.g., processors 116). Furthermore, the IBV output 118 can split into two outputs with different predetermined output voltages (e.g., 5V and 1.8V) that goes to a dc-dc converter (e.g., multiphase buck 114) and a load (e.g., processors 116).

Referencing the first input switch circuit 202, the Vin 106 supplies a voltage of about 4-60 volts to the stacked or series connected input switch circuits of the SCIB circuit 200. The pair of input switch circuits 202 and 204 in FIG. 2 facilitates a stepping down of this supplied voltage from 4-60 volts with a fixed ratio equal to one plus the number of the input switch circuits to generate a biasing voltage (Vbias). In an embodiment, the first input switch circuit 202 includes a high-side switch (HF1) 212 and a low-side switch (LF1) 214 that are connected in series. In this embodiment, the input switch circuit 202 is driven by a half bridge gate driver and a level shift circuit. In this embodiment, a common node between the high-side switch HF1 212 and the low-side switch LF1 214 is connected to a first flying capacitor (CF1) 216. Furthermore, the other end of the high-side switch HF1 212 is connected to an input capacitor (CIN) 218 while the other end of the low-side switch LF1 214 is connected to a voltage compensation capacitor (CXH) 220 and a DC shift floating high-side switch (HFX) 222. The voltage of the flying capacitor CF1 216 is equal to three quarters of the Vin 106. In an embodiment, the high-side switch HF1 212 and the low-side switch LF1 214 have an inherent capability of zero voltage switching.

The DC shift switch circuit 206 is configured to compensate for a voltage difference in between the pair of input switch circuits. For example, the pair of input switch circuits includes the first input switch circuit 202 and second input switch circuit 204. In this example, the DC shift switch circuit 206 is driven by two half bridge gate drivers and a level shift circuit. The DC shift switch circuit 206 compensates for the voltage difference between the first input switch circuit 202 and the second input switch circuit 204.

As shown, the DC shift switch circuit 206 includes a floating high-side switch (HFX) 222, a floating low-side switch (LFX) 224, a high-side switch (HX) 226, and a low-side switch (LX) 228 that is connected in series with the high-side switch HX 226. A common node between the HFX 222 and the LFX 224 is further connected to a voltage compensation capacitor (CXL) 230 while the other end of the floating HFX 222 is connected to a voltage compensation capacitor (CXH) 220 and the other end of the floating LFX 224 is connected to a middle capacitor (CMID) 232. The high-side switch HX 226 is connected to a biasing voltage capacitor (CB) 234 while one end of the low-side switch LX 228 is connected to a ground. The DC shift switch circuit 206 further shows a common node of the high-side switch HX 226 and the low-side switch LX 228 to be connected to the CXL 230. The voltage of the voltage compensation capacitor CXH 220 is equal to about three quarters of the Vin 106. The voltage of the voltage compensation capacitor CXL 230 and the voltage of the middle capacitor CMID 232 are equal to about half of the Vin 106. In an embodiment, the floating high-side switch HFX 222 and the floating low-side switch LFX 224 have an inherent capability of zero voltage switching. The high-side switch HX 226 and the low-side switch LX 228 have an inherent capability of zero current switching.

The second input switch circuit includes a high-side switch (HF2) 236 and a low-side switch (LF2) 238. The input switch circuit 204 is driven by a half bridge gate driver and a level shift circuit. A common node of the high-side switch HF2 236 and low-side switch LF2 238 is connected to a second flying capacitor (CF2) 240. The other end of the high-side switch HF2 236 is connected to the CMID 232 and the LFX 224, while the other end of the low-side switch LF2 238 is connected to a common node between the CB 234 and the high-side switch HX 226 of the DC shift switch circuit 206. The voltage of the flying capacitor CF2 240 is equal to a quarter of the Vin 106. In an embodiment, the high-side switch HF2 236 and the low-side switch LF2 238 have an inherent capability of zero voltage switching.

Referencing the first output circuit 208, the first output circuit 208 includes a high-side switch (HS1) 242 in series with a low-side switch (LS1) 244. A common node between the high-side switch HS1 242 and low-side switch LS1 244 is connected to an LC circuit that includes a first output inductor (L1) 246 and an output capacitor (Cout) 248. The other end of the high-side switch HS1 242 is connected to the CB 234 and a high-side switch (HS2) 250 of the second output circuit 210. The other end of the low-side switch LS1 244 is connected to ground. The voltage of the biasing voltage capacitor CB 234 is equal to about a quarter of the Vin 106. In an embodiment, the low-side switch LS1 244 has an inherent capability of zero voltage switching.

The second output circuit 210 includes the high-side switch (HS2) 250 and a low-side switch (LS2) 252. A common node between the high-side switch HS2 250 and low-side switch LS2 252 is connected to the CF2 240 and an LC circuit that includes a second inductor (L2) 254 and the Cout 248. In an embodiment, the low-side switch LS2 252 has an inherent capability of zero voltage switching. Each output circuit in FIG. 2 can be driven by a half bridge gate driver as further described below. Furthermore, the output switch circuit that is connected to the LC circuit generates a buck phase. The number of output switch circuits that are connected to the LC circuit is equal to number of phases of the SCIB circuit.

In an embodiment, the SCIB circuit 200 is a pulse width modulation (PWM) switching converter. That is, the SCIB circuit 200 is configured to provide output based upon an amount of pulses with adjusted width duty cycle. The duty cycle (D) is the time width of the pulse over the time of one pulse cycle (Ts). Each of the first input switch circuit 202, the second input switch circuit 204, the first output switch circuit 208 and the second output switch circuit 210 is a switch bridge with one high-side switch and one low-side switch. The high-side switch is turned ON, low-side switch is turned OFF when the pulse is high; the high-side switch is turned OFF, low-side switch is turned ON when the pulse is low.

The first input switch circuit 202 and the second input switch circuit 204 can step down the Vin 106 depending upon the amount of pulses with adjusted width duty cycle during different states. For example, the Vin 106 is stepped down to a quarter voltage for the Vbias. In this example, the Vbias is further stepped down into a regulated IBV 118 by the first output switch circuit 208 and the second output switch circuit 210 depending upon the pulses with adjusted width duty cycle (D) equal to IBV 118 over the quarter voltage Vbias. In other examples, different adjustment of duty cycles can be implemented to generate different values of regulated IBV 118. Thus, the step down ratio is equal to Vin/Vout=4/D.

In an embodiment, the SCIB circuit 200 is an interleaved PWM switching converter. That is, the SCIB circuit 200 is configured to provide output based upon two interleaved pulses with adjusted width duty cycle. The first PWM pulse and the second PWM pulse have a time difference in between that is equal to half of pulse cycle Ts. The first input switch circuit 202 and the first output switch circuit 208 can step down the Vin 106 and provide output depending upon the first PWM pulse. The second input switch circuit 204 and the second output switch circuit 210 can step down the Vin 106 and provide output depending upon the second PWM pulse.

During a first state (P1) of interleaved switching of the SCIB circuit 200 as a PWM switching converter, the first PWM pulse is high and the second PWM pulse is low. The high-side switch HF1 212 of the first input switch circuit 202 and the high-side switch HS1 242 of the first input switch circuit 208 are turned ON. Thereby the first phase delivers power to output 118 from two sources—CIN 218 and CB 234. The low-side switch LF1 214 and the low-side switch LS1 244 are turned OFF. The low-side switch LF2 238 of the second input switch circuit 204 and the low-side switch LS2 252 of the second output switch circuit 210 are turned ON. Thereby the second phase freewheels, and the CB 234 and the CF2 240 inherently charge balance. The floating low-side switch LFX 224 and the low-side switch LX 228 of the DC shift switch circuit 206 are turned ON and the CXL 230 and the CMID 232 inherently charge balance. By regulating the high-side turn-on time (ton) or pulse width duty cycle, the corresponding step down ratio can be adjusted.

During second state (P2), the first PWM pulse is low and the second PWM pulse is high. The high-side switch HF2 236 of the second input switch circuit 204 and the high-side switch HS2 250 of the second output circuit 210 are turned ON. Thereby the second phase delivers power to output from two sources—CMID 232 and CB 234. The low-side switch LF2 238 and the low-side switch LS2 252 are turned OFF. The low-side switch LF1 214 of the first input switch circuit 202 and the low-side switch LS1 244 of the first output switch circuit 208 are turned ON. Thereby the first phase freewheels, and the CB 234, the CXL 230 and the CF1 216 inherently charge balance. The floating high-side switch HFX 222 and the high-side switch HX 228 of the DC shift switch circuit 206 are turned ON, and the CXH 220, the CXL 230 and the CB 234 inherently charge balance.

Both first state (P1) and second state (P2) are followed by a freewheel state (FW) where the low-side switch LS1 244 of the first output circuit 208 and the low-side switch LS2 252 of the second output circuit 210 are turned ON, thereby both first and second phases freewheel. The low-side switch LF1 214 of the first input switch circuit 202 and the low-side switch LF2 238 of the second input switch circuit 204 are turned ON and all the capacitors inherently charge balance.

With the above operations, the SCIB circuit 200 can deliver a regulated IBV output 118 as low as 5V with two output phases from Vin 106 of about 40V-60V without need of transformer. The voltages of the input switch circuits, the DC shift switch circuits and the output switch circuits are equal to the biasing voltage Vbias, which is about 10V-15V. Furthermore, the solution generating low IBV allows high frequency at the second stage, and easy scalability for different IBV 118 output and power.

In an embodiment, the SCIB circuit 200 can be configured to operate on a single output phase by removing one of two inductors. For example, the SCIB circuit 200 only delivers power to output through the inductor L1 246 when the inductor L2 254 is removed. In this example, the second input circuit 204 and the second output circuit 210 act as a DC shift switch circuit for phases' capacitor charge balance. With the removal of the inductor, it does not compromise voltage and current variants in addition to reduced number of components to generate lower cost and lower footprint.

In an embodiment, the SCIB circuit 200 can be configured to generate two independent and regulated IBV outputs 118 by connecting two inductors to two different output capacitors COUT 248. That is, the inductor L1 246 is connected to a first output capacitor with a first regulated IBV output and the inductor L2 254 is connected to a second output capacitor with a second regulated IBV. The first regulated IBV depends upon the duty cycle of the first PWM pulse for the first input switch circuit 202 and the first output switch circuit 208, and the second regulated IBV depends upon the duty cycle of the second PWM pulse for the second input switch circuit 204 and the second output switch circuit 210.

Figure 3:
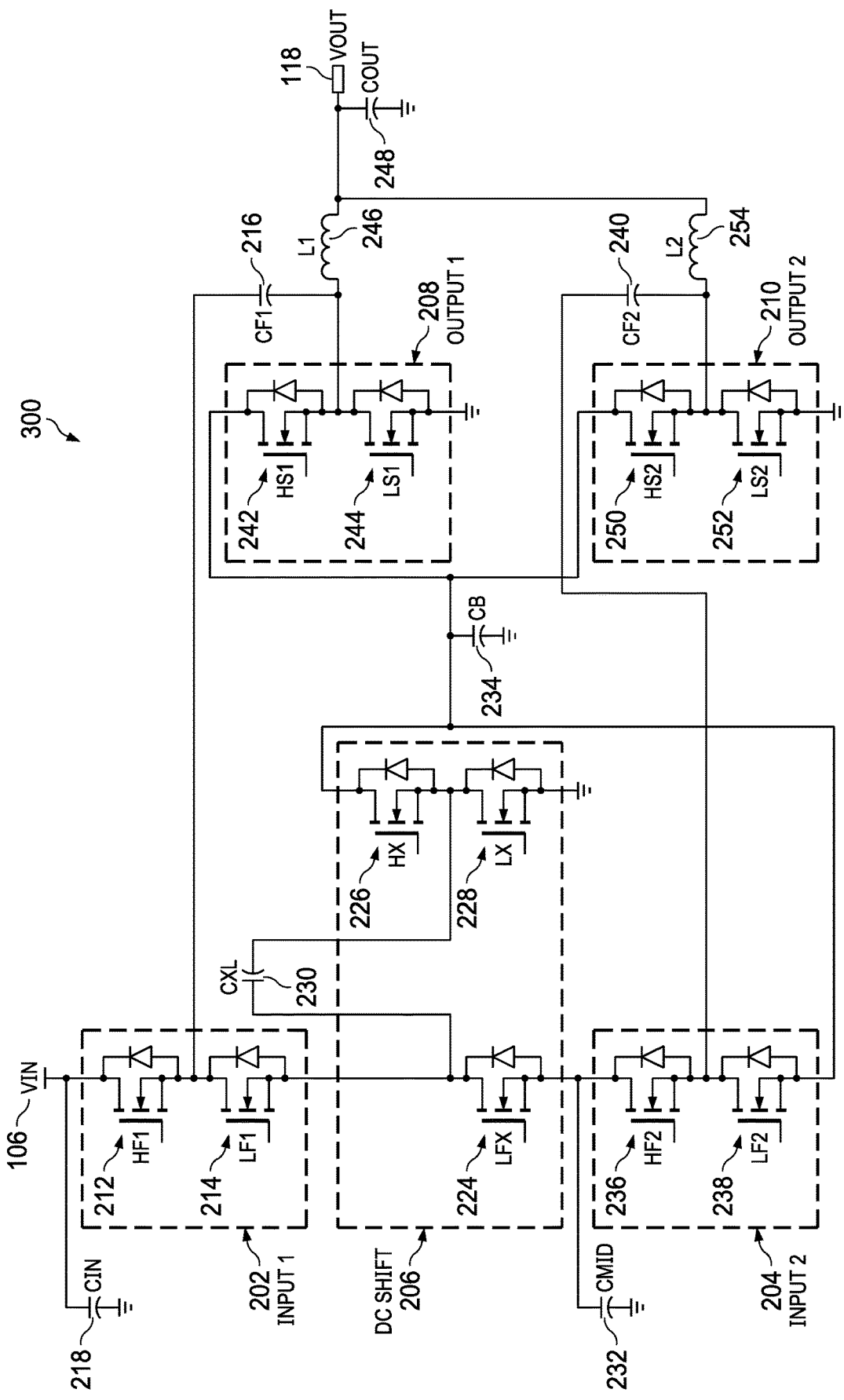
FIGS. 3-5 are block diagrams of example variations of a scalable switched cap integrated buck (SCIB) circuit of example FIG. 2 as described in present implementations herein.

FIG. 3 is an example SCIB circuit 300 as described in present implementations herein. Particularly, the SCIB circuit 300, which is a variant of the SCIB circuit 200, includes a modified DC shift switch circuit 206 to generate a variant on the DC shift switch circuit between the first input switch circuit 202 that is connected in series with the second input switch circuit 204. The numbering of components in FIG. 2 is adopted throughout the circuit variations in this document; however, in certain implementations the values and other parameters can be changed.

In an embodiment, the DC shift floating high-switch HFX 222 is removed to generate a variant circuit with less number of components. Furthermore, the CXH 220 is removed from the SCIB circuit 200. These modifications do not compromise voltage and current variants in addition to reduced number of components to generate lower cost and lower footprint. In certain embodiments, the one end of the low-side switch LF1 214 of the first input switch circuit 202 is connected to the CXL 230 and one end of the LFX 224. The common node of the high-side switch HX 226 and the low-side switch LX 228 of the DC shift switch circuit 206 is connected to the capacitor CXL 230. With the removal of the HFX 222 and CXH 220, the CXL 230 and the CB 234 can still inherently charge balance when the floating low-side switch LFX 224 and the low-side switch LX 228 of the DC shift switch circuit 206 are turned ON. Other capacitors can still inherently charge balance. The values of the other components can be varied due to absence of the HFX 222, and the SCIB circuit 300 can generate a step down ratio of Vin/Vout=4/D with one or two output phases and one or two independent and regulated IBV outputs.

Figure 4:
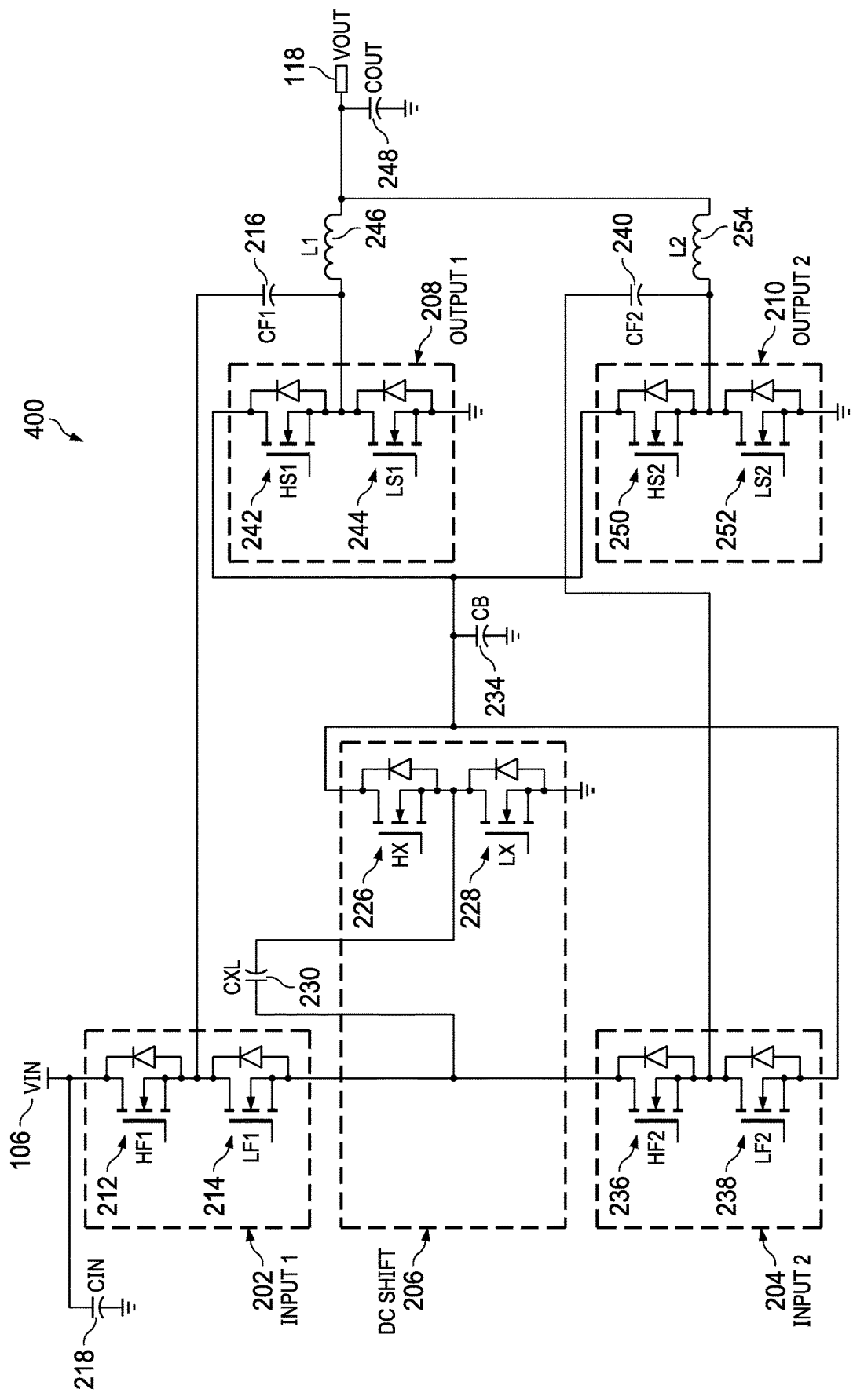

FIG. 4 is an example SCIB circuit 400 as described in present implementations herein. Particularly, the SCIB circuit 400, which is a variant of the SCIB circuit 300, includes a modified DC shift switch circuit 206 to generate a variant on the DC shift switch circuit between the first input switch circuit 202 that is connected in series with the second input switch circuit 204. The numbering of components in FIG. 2 is adopted throughout the circuit variations in this document; however, in certain implementations the values and other parameters can be changed.

In an embodiment, the DC shift floating low-switch LFX 224 and the CMID 232 are further removed to generate a variant circuit with less number of components. These modifications do not compromise voltage and current variants in addition to reduced number of components to generate lower cost and lower footprint. In this embodiment, the one end of the low-side switch LF1 214 of the first input switch circuit 202 is connected to the CXL 230 and one end of the high-side switch HF2 236 of the second input switch circuit 204. The common node of the high-side switch HX 226 and the low-side switch LX 228 of the DC shift switch circuit 206 is connected to the capacitor CXL 230. With the removal of the LFX 224, HFX 222, CXH 220 and the CMID 232, the CXL 230 and the CB 234 can inherently charge balance when the low-side switch LX 228 of the DC shift switch circuit 206 is turned ON. Other capacitors can inherently charge balance. The values of the other components can be varied due to absence of the HFX 222 and the LFX 224, and the SCIB circuit 400 can generate a step down ratio of Vin/Vout=4/D with one or two output phases and one or two independent and regulated IBV outputs.

Figure 5:
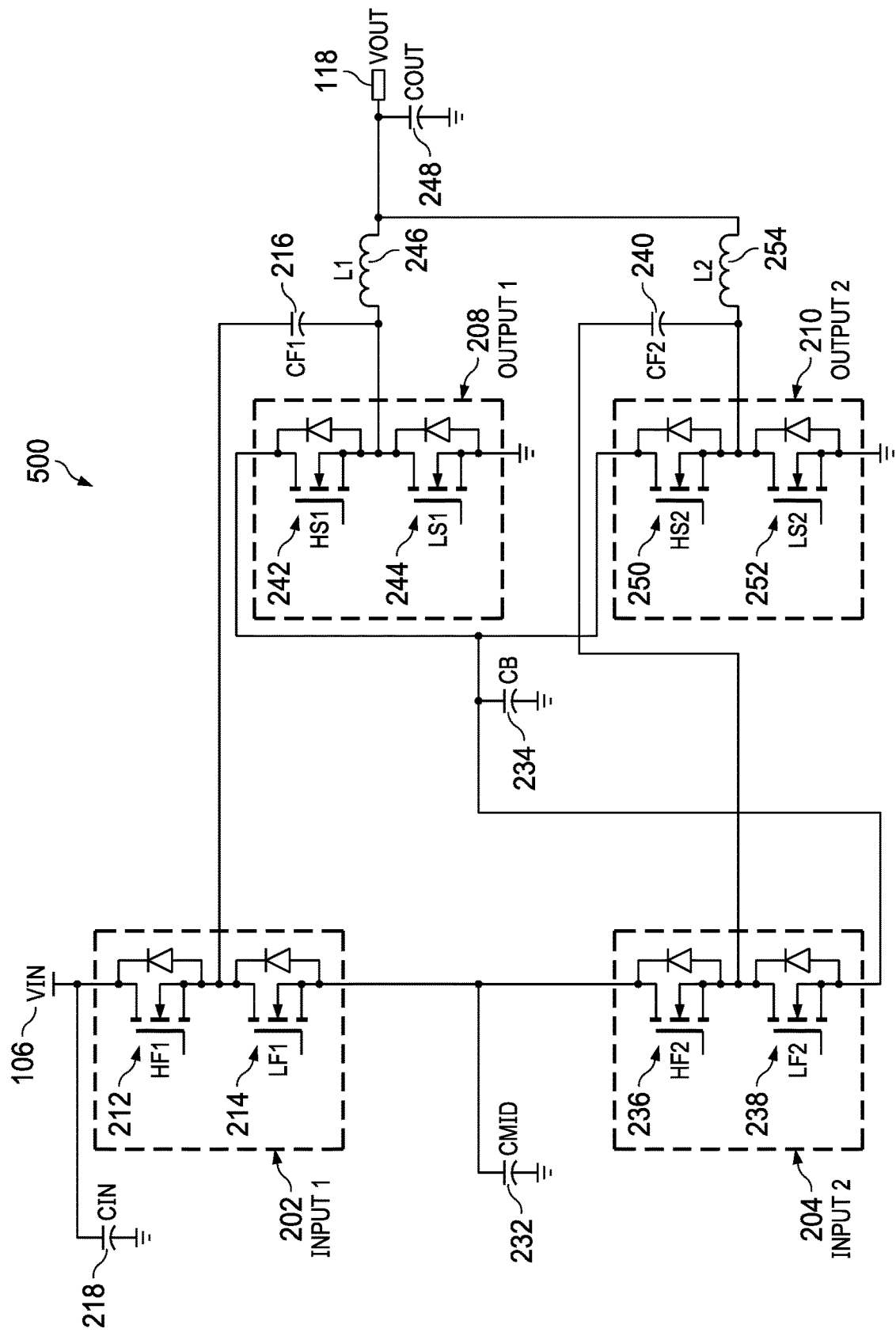

FIG. 5 is an example SCIB circuit 500 as described in present implementations herein. Particularly, the SCIB circuit 500, which is a variant of the SCIB circuit 400, does not include DC shift switch circuit 206 between the series connected first input switch circuit 202 and second input switch circuit 204. The numbering of components in FIG. 2 is adopted throughout the circuit variations in this document; however, in certain implementations the values and other parameters can be changed.

In an embodiment, the DC shift switch circuit 206 is removed to generate a variant circuit with less number of components. These modifications do not compromise voltage and current variants in addition to reduced number of components to generate lower cost and lower footprint. In this embodiment, the one end of the low-side switch LF1 214 of the first input switch circuit 202 is connected to the CMID 232 and one end of the high-side switch HF2 236 of the second input switch circuit 204. The low-side switch LF2 238 of the second input switch circuit 204 is connected to the capacitor CF2 240. Even with the removal of the DC shift switch circuit 206, the CMID 232, the CF1 216, the CF2 240 and the CB 234 can still inherently charge balance. The values of the other components can be varied due to absence of the DC shift switch circuit 206, and the SCIB circuit 500 can generate a step down ratio of Vin/Vout=4/D with one or two output phases and one or two independent and regulated IBV outputs.

Figure 6:
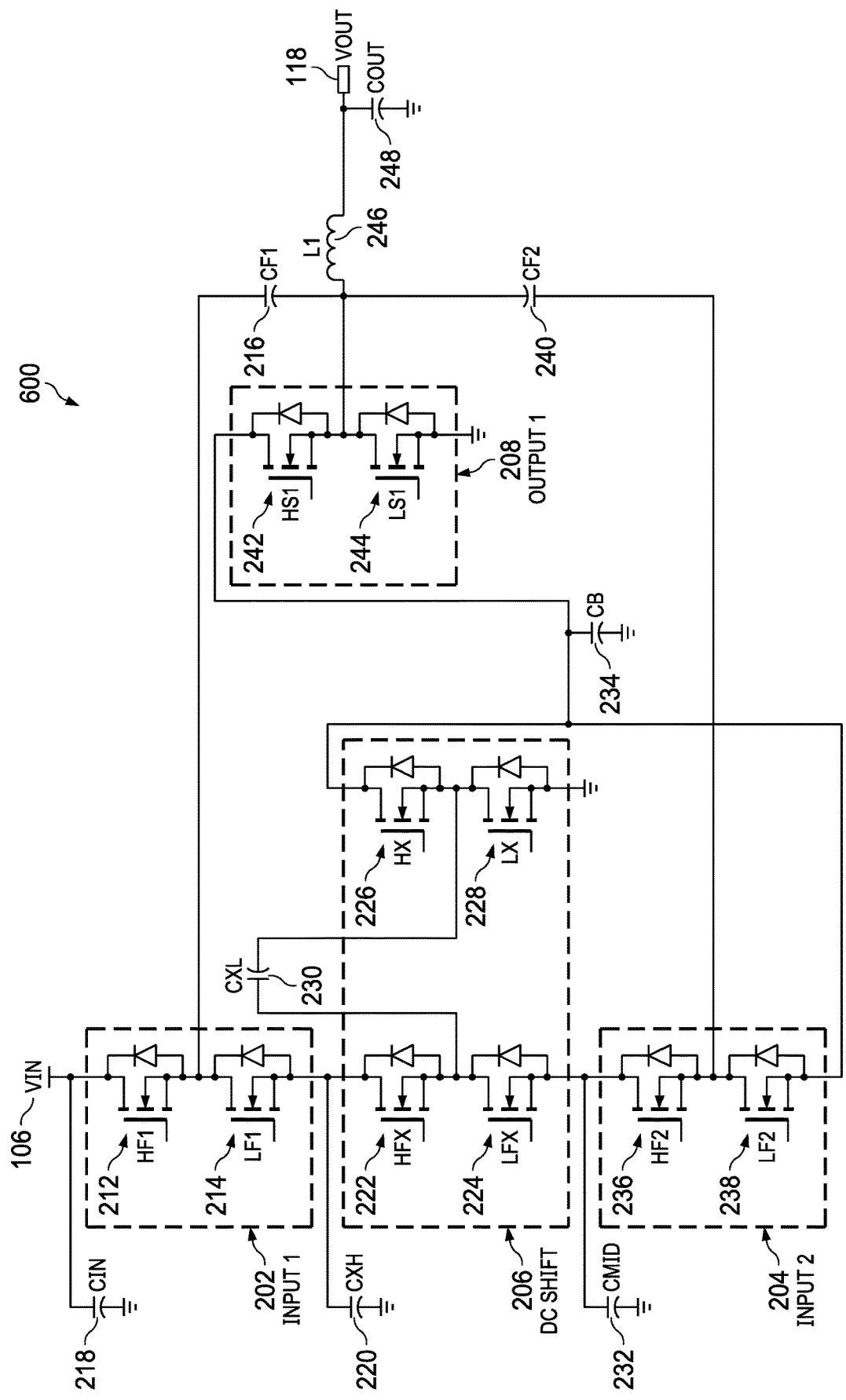

FIG. 6 is an example SCIB circuit 600 as described in present implementations herein. Particularly, the SCIB circuit 600 includes two input switch circuits and a single output for a single phase. The single output can include the first output circuit 208 that further includes the LC circuit—inductor L1 246 and the Cout 248. In an embodiment, the first output circuit 208 for the SCIB circuit 600 is a Buck regulator circuit to regulate the Vbias to a predetermined output voltage IBV 118.

Referencing the SCIB circuit 200, the second output circuit 210 is removed from the circuitry of SCIB circuit 200 in order to form the SCIB circuit 600. In an embodiment, the common node between the high-side switch HF2 236 and low-side switch LF2 238 of the second input switch circuit 204 is connected to one end of the second flying capacitor (CF2) 240. The other end of the CF2 240 is connected to: the common node between the high-side switch HS1 242 and the low-side switch LS1 244 of the first output switch circuit 208; one end of CF1 216; and the LC circuit—inductor L1 246 and Cout 248. As shown, the SCIB circuit 600 can generate a duty cycle of Vin/Vout=4/D with a single output phase and a single regulated IBV output.

Figure 7:
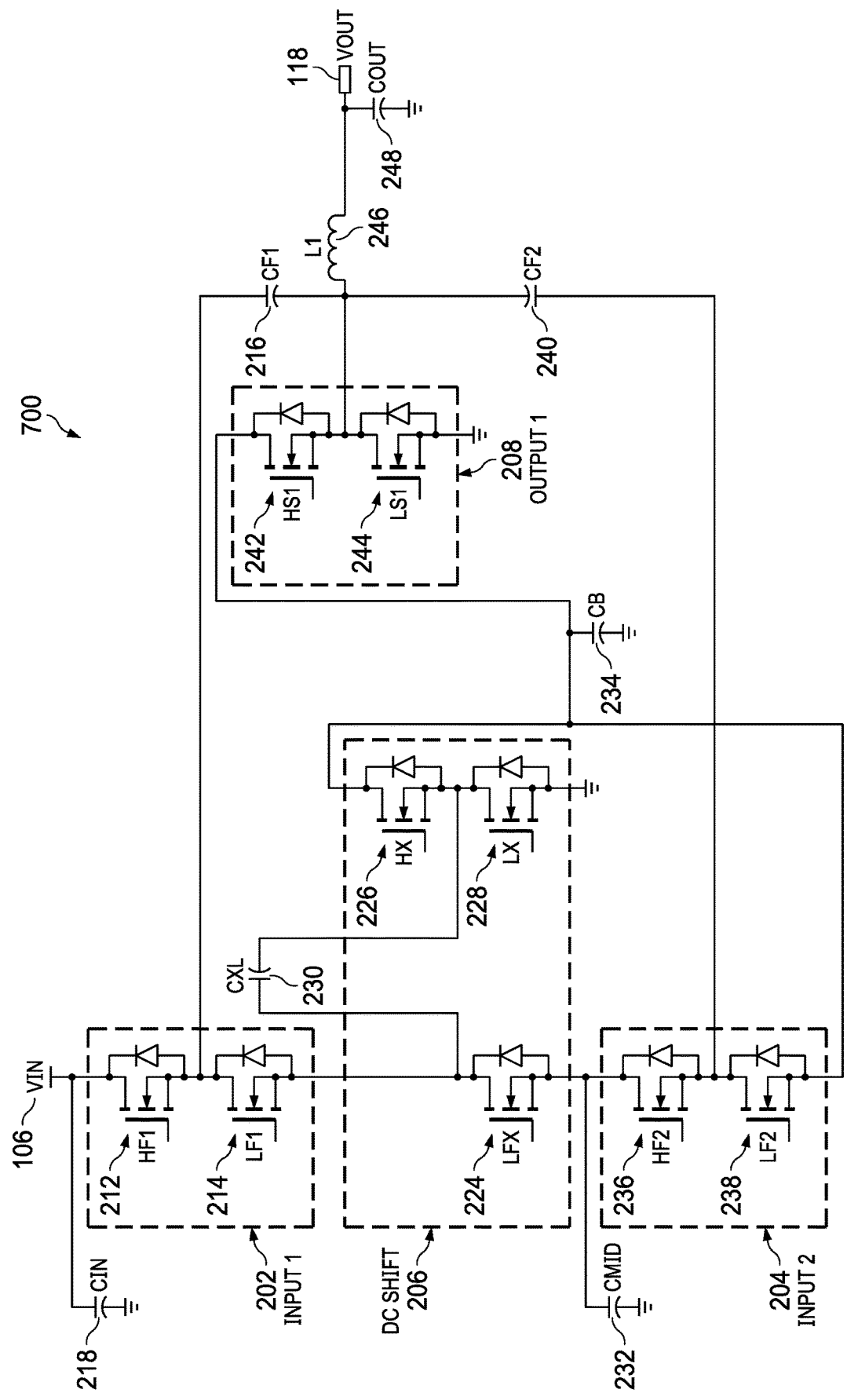
FIGS. 7-9 are block diagrams of example variations of a scalable switched cap integrated buck (SCIB) circuit of example FIG. 6 as described in present implementations herein.

FIG. 7 is an example SCIB circuit 700 as described in present implementations herein. Particularly, the SCIB circuit 700 includes the SCIB 600 with a modified DC shift switch circuit 206. The modified DC shift switch circuit 206 does not include the HFX 222 and the CXH 220. The SCIB circuit 700 includes two input switch circuits and a single output for a single phase. The single output can include the first output circuit 208 that further includes the LC circuit—inductor L1 246 and the Cout 248. In an embodiment, the first output circuit 208 for the SCIB circuit 700 is a Buck regulator circuit to regulate the Vbias to a predetermined output voltage IBV 118.

In an embodiment, the variant does not compromise voltage and current variants in addition to reduced number of components to generate lower cost and lower footprint. In this embodiment, the one end of the low-side switch LF1 214 of the first input switch circuit 202 is now connected to the CXL 230 and the LFX 224. The common node of the high-side switch HX 226 and the low-side switch LX 228 of the DC shift switch circuit 206 is connected to the CXL 230.

In this embodiment, even with the removal of the HFX 222 and CXH 220, the CXL 230 and the CB 234 can inherently charge balance when the floating low-side switch LFX 224 and the low-side switch LX 228 of the DC shift switch circuit 206 are turned ON. Other capacitors can inherently charge balance. The values of the other components can be varied due to absence of HFX 222 and CXH 220, and the SCIB circuit 700 can generate duty cycle of Vin/Vout=4/D with a single output phase and a single regulated IBV output.

Figure 8:
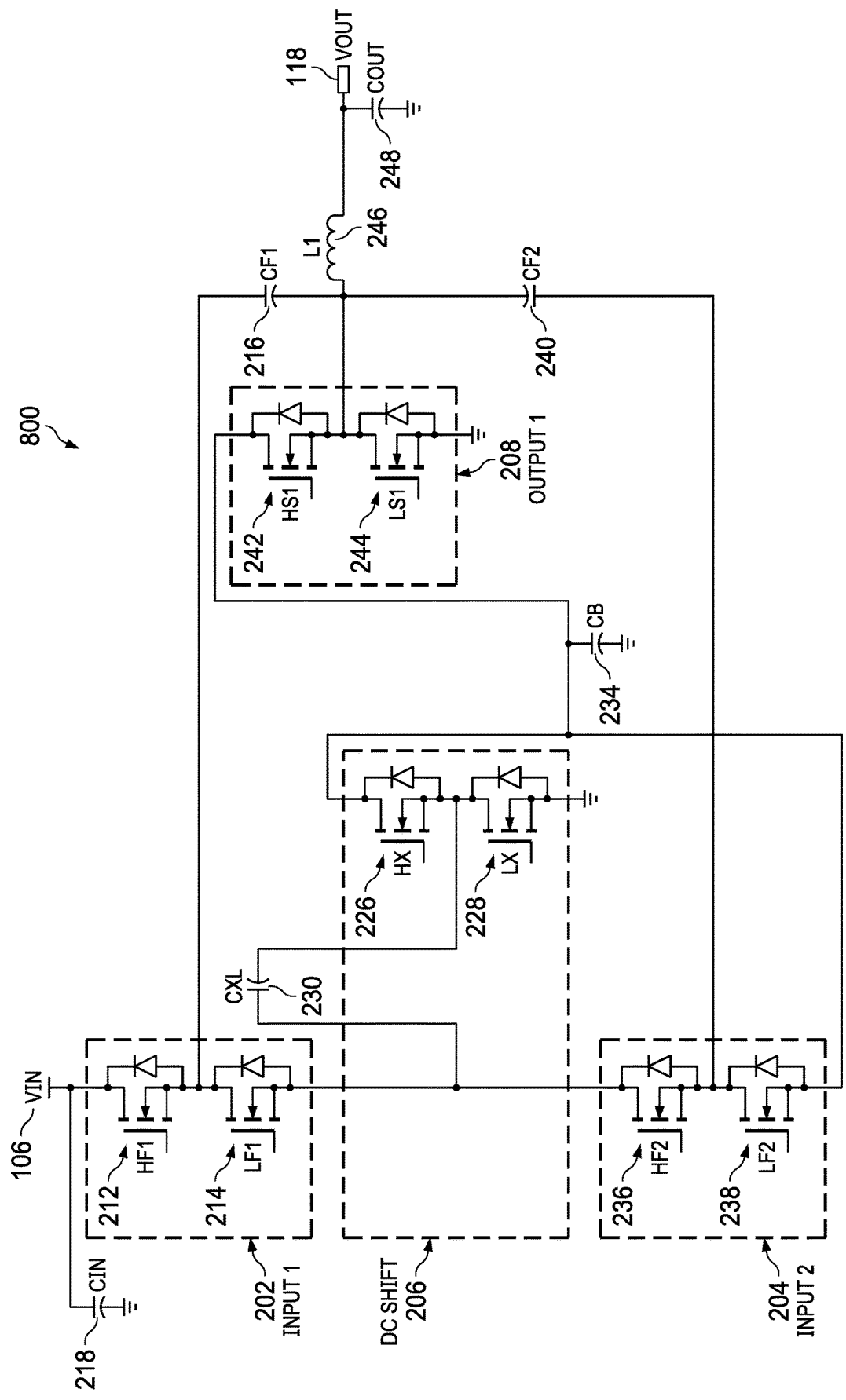

FIG. 8 is an example SCIB circuit 800 as described in present implementations herein. Particularly, the SCIB circuit 800 includes the SCIB 700 with a modified DC shift switch circuit 206. That is, the modified DC shift switch circuit 206 does not include the LFX 224, HFX 222, CMID 232 and the CXH 220. The SCIB circuit 800 includes two input switch circuits and a single output for a single phase. The single output can include the first output circuit 208 that further includes the LC circuit—inductor L1 246 and the Cout 248. In an embodiment, the first output circuit 208 for the SCIB circuit 800 is a Buck regulator circuit to regulate the Vbias to a predetermined output voltage IBV 118.

In an embodiment, the variant does not compromise voltage and current variants in addition to reduced number of components to generate lower cost and lower footprint. In this embodiment, the one end of the low-side switch LF1 214 of the first input switch circuit 202 is connected to the CXL 230 and the HF2 236. The common node of the high-side switch HX 226 and the low-side switch LX 228 of the DC shift switch circuit 206 is connected to the CXL 230. In this embodiment, even with the removal of the LFX 224, HFX 222, CXH 220 and the CMID 232, the CXL 230 and the CB 234 can inherently charge balance when the low-side switch LX 228 of the DC shift switch circuit 206 is turned ON. Other capacitors can inherently charge balance. The values of the other components can be varied due to absence of LFX 224, HFX 222, CXH 220 and the CMID 232, and the SCIB circuit 800 can generate duty cycle of Vin/Vout=4/D with a single output phase and a single regulated IBV output.

Figure 9:
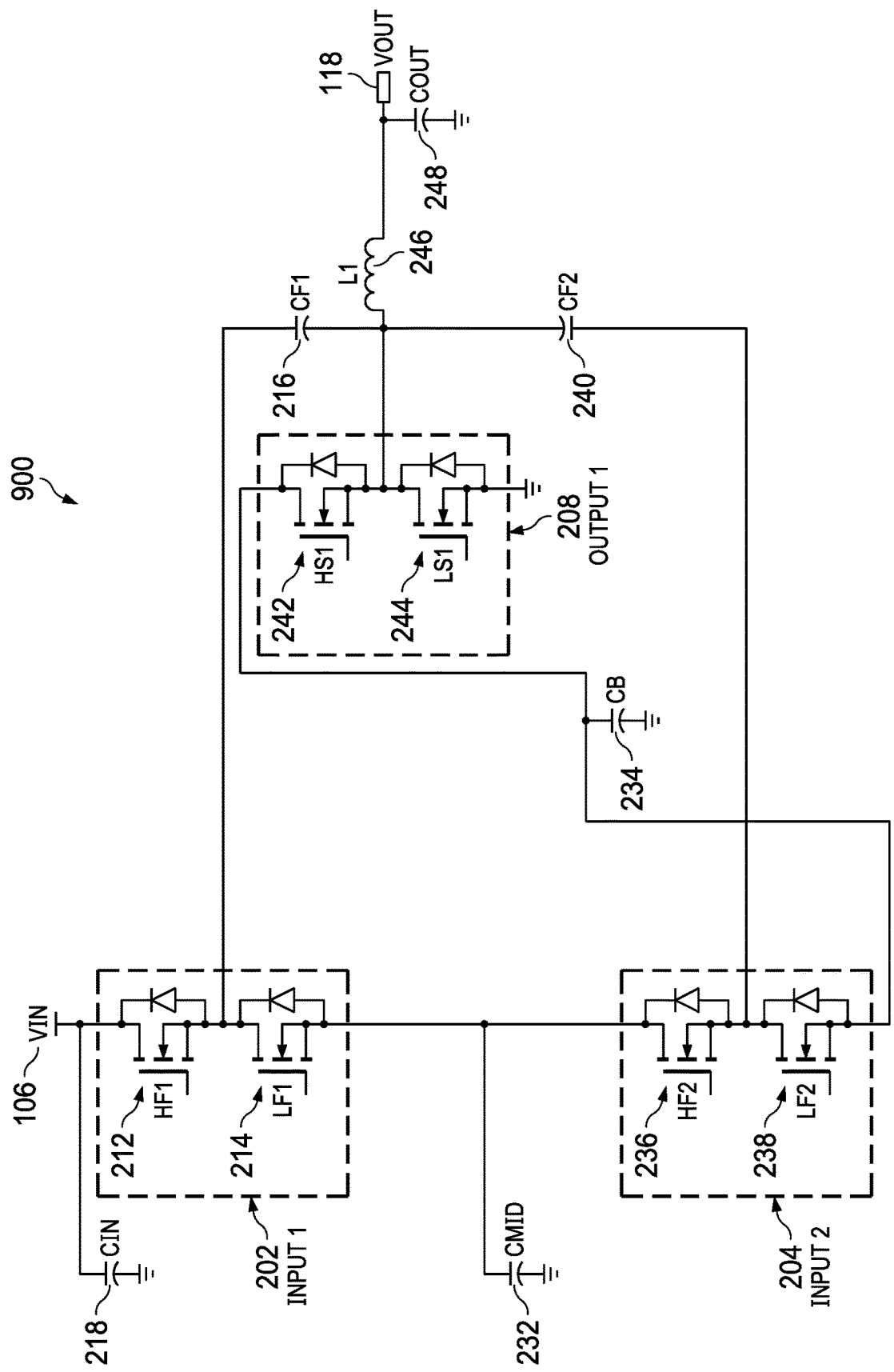

FIG. 9 is an example SCIB circuit 900 as described in present implementations herein. Particularly, the SCIB circuit 900, which is a variant of the SCIB circuit 800, does not include DC shift switch circuit 206 between the series connected first input switch circuit 202 and second input switch circuit 204. The numbering of components in FIG. 2 is adopted throughout the circuit variations in this document; however, in certain implementations the values and other parameters can be changed.

In an embodiment, the DC shift switch circuit 206 is removed to generate a variant circuit with less number of components. These modifications do not compromise voltage and current variants in addition to reduced number of components to generate lower cost and lower footprint. In this embodiment, the one end of the low-side switch LF1 214 of the first input switch circuit 202 is connected to the CMID 232 and one end of the high-side switch HF2 236 of the second input switch circuit 204. In this embodiment, even with the removal of the DC shift switch circuit 206, the CMID 232, the CF1 216, the CF2 240 and the CB 234 can inherently charge balance. The values of the other components can be varied due to absence of the DC shift switch circuit 206, and the SCIB circuit 900 can generate duty cycle of Vin/Vout=4/D with a single output phase and a single regulated IBV output.

Figure 10:
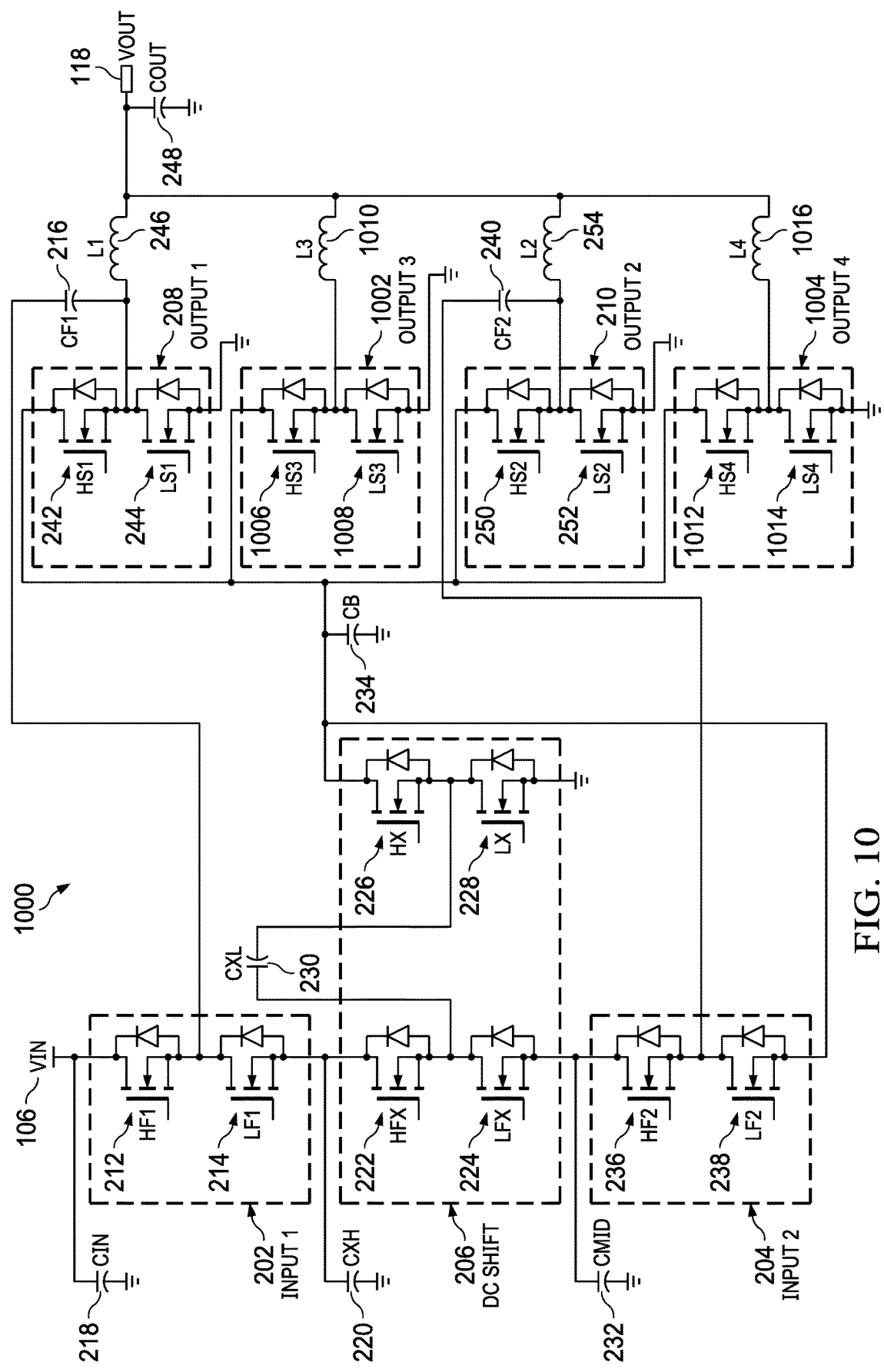

FIG. 10 is an example SCIB circuit 1000 as described in present implementations herein. Particularly, the SCIB circuit 1000 includes two input switch circuits 202 and 204, a single DC shift switch circuit 206, and four parallel output circuits 208, 210, 1002, and 1004 to generate one/two/three/four output buck phases and one/two/three/four independent and regulated IBV outputs.

As shown, the third output circuit 1002 includes a high-side switch HS3 1006 and a low-side switch LS3 1008 where a common node of the high-side switch HS3 1006 and low-side switch LS3 1008 is connected to a third inductor L3 1010. The fourth output circuit 1004 includes a high-side switch HS4 1012 and a low-side switch LS4 1014 where a common node of the high-side switch HS4 1012 and low-side switch LS4 1014 is connected to a fourth inductor L4 1016.

In an embodiment, the third output circuit 1002 is connected in parallel with the first output circuit 208. That is, a common node between the high-side switch HS1 242 of the first output circuit 208 and the high-side switch HS3 1006 of the third output circuit 1002 is connected to the CB 234. The common node between the high-side switch HS1 242 and the low-side switch LS1 244 is connected to the CF1 216 and the inductor L1 246.

The fourth output circuit 1004 is connected in parallel with the second output circuit 210. That is, a common node between the high-side switch HS2 250 of the second output circuit 210 and the high-side switch HS4 1012 of the fourth output circuit 1004 is connected to the CB 234. Furthermore, the common node between the high-side switch HS2 250 and the low-side switch LS2 252 is connected to the CF2 240 and the inductor L2 254.

In an embodiment, the inductors L1 246, L2 254, L3 1010, and L4 1016 are connected in parallel and connected to the Cout 248 and are configured to operate on four different phases to provide a regulated IBV 118. For example, the four different phases including a first phase, a second phase, a third phase, and a fourth phase are interleaved with each other and controlled by four PWM pulses that have time differences in between equal to a quarter of pulse cycle Ts. Furthermore, the SCIB circuit 1000 can be configured to operate on three output phases by removing one of four inductors; two output phases by removing two of four inductors; one output phase by removing three of four inductors. For example, the SCIB circuit 1000 delivers power through the inductors L1 246 and L4 1016 when the inductors L2 254 and L3 1010 are removed. In this example, the second input circuit 204 and the second output circuit 210 act as a DC shift switch circuit for phases' capacitor charge balance. With the removal of the inductor, voltage and current variants are not compromised. Reduced number of components can also be realized.

In an embodiment, the SCIB circuit 1000 can be configured to generate two or three or four regulated IBV outputs 118 by connecting four inductors to four different output capacitors COUT 248. That is, the inductor L1 246 is connected to a first output capacitor with a first regulated IBV output; the inductor L2 254 is connected to a second output capacitor with a second regulated IBV output; the inductor L3 1010 is connected to a third output capacitor with a third regulated IBV output; the inductor L4 1016 is connected to a fourth output capacitor with a fourth regulated IBV output. The first regulated IBV depends upon the duty cycle of the first PWM pulse for the first input switch circuit 202 and the first output switch circuit 208; and the second regulated IBV depends upon the duty cycle of the second PWM pulse for the second input switch circuit 204 and the second output switch circuit 210; and the third regulated IBV depends upon the duty cycle of the third PWM pulse for the third output switch circuit 1002; and the fourth regulated IBV depends upon the duty cycle of the fourth PWM pulse for the fourth output switch circuit 1004.

Figure 11:
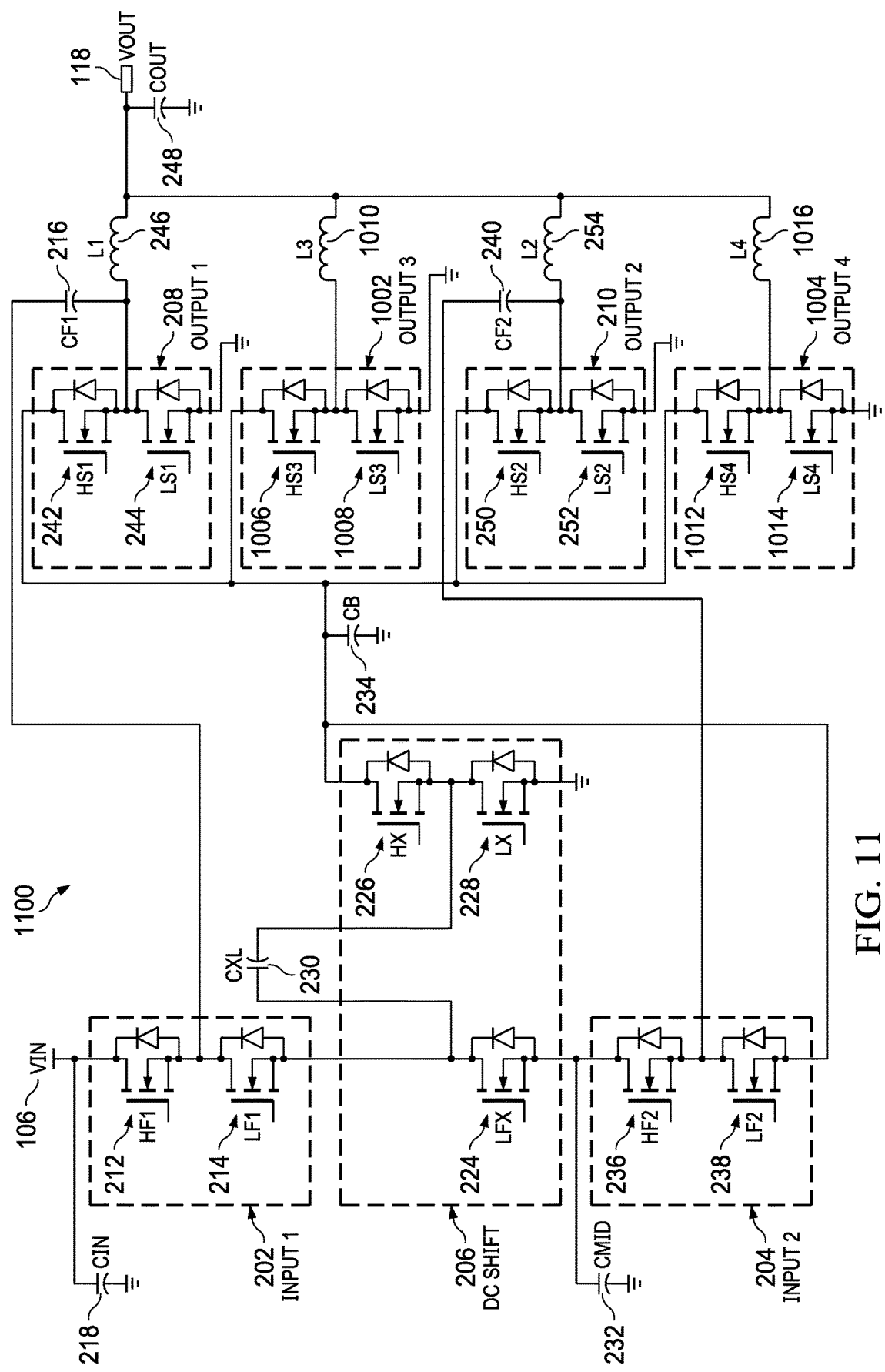
FIGS. 11-13 are block diagrams of example variations of a scalable switched cap integrated buck (SCIB) circuit of example FIG. 10 as described in present implementations herein.

FIG. 11 is an example SCIB circuit 1100 as described in present implementations herein. Particularly, the SCIB circuit 1100, which is a variant of the SCIB circuit 1000, includes modified DC shift switch circuit 206 to generate a variant on the DC shift switch circuit between the first input switch circuit 202 that is connected in series with the second input switch circuit 204. The modified DC shift switch circuit 206 does not include the HFX 222 and the CXH 220. The SCIB circuit 1100 includes two input switch circuits and four output switch circuits.

Referencing the SCIB 1000 of FIG. 10, the HFX 222 and the CXH 220 of the SCIB circuit 1000 are removed to generate a variant circuit with less number of components. This embodiment does not compromise voltage and current variants. Reduced number of components can also be realized. In this embodiment, the one end of the low-side switch LF1 214 of the first input switch circuit 202 is now connected to the CXL 230 and the floating low-side switch LFX 224 of the DC shift switch circuit 206. The common node of the high-side switch HX 226 and the low-side switch LX 228 of the DC shift switch circuit 206 is still connected to the CXL 230. In this embodiment, with the removal of the CXH 220 and the HFX 222, the CXL 230 and the CB 234 can inherently charge balance when the floating low-side switch LFX 224 and the low-side switch LX 228 of the DC shift switch circuit 206 are turned ON. Other capacitors can inherently charge balance. The values of the other components can be varied due to absence of the CXH 220 and the HFX 222, and the SCIB circuit 1100 can generate a step down ratio of Vin/Vout=4/D with one/two/three/four output phases and one/two/three/four independent and regulated IBV outputs.

Figure 12:
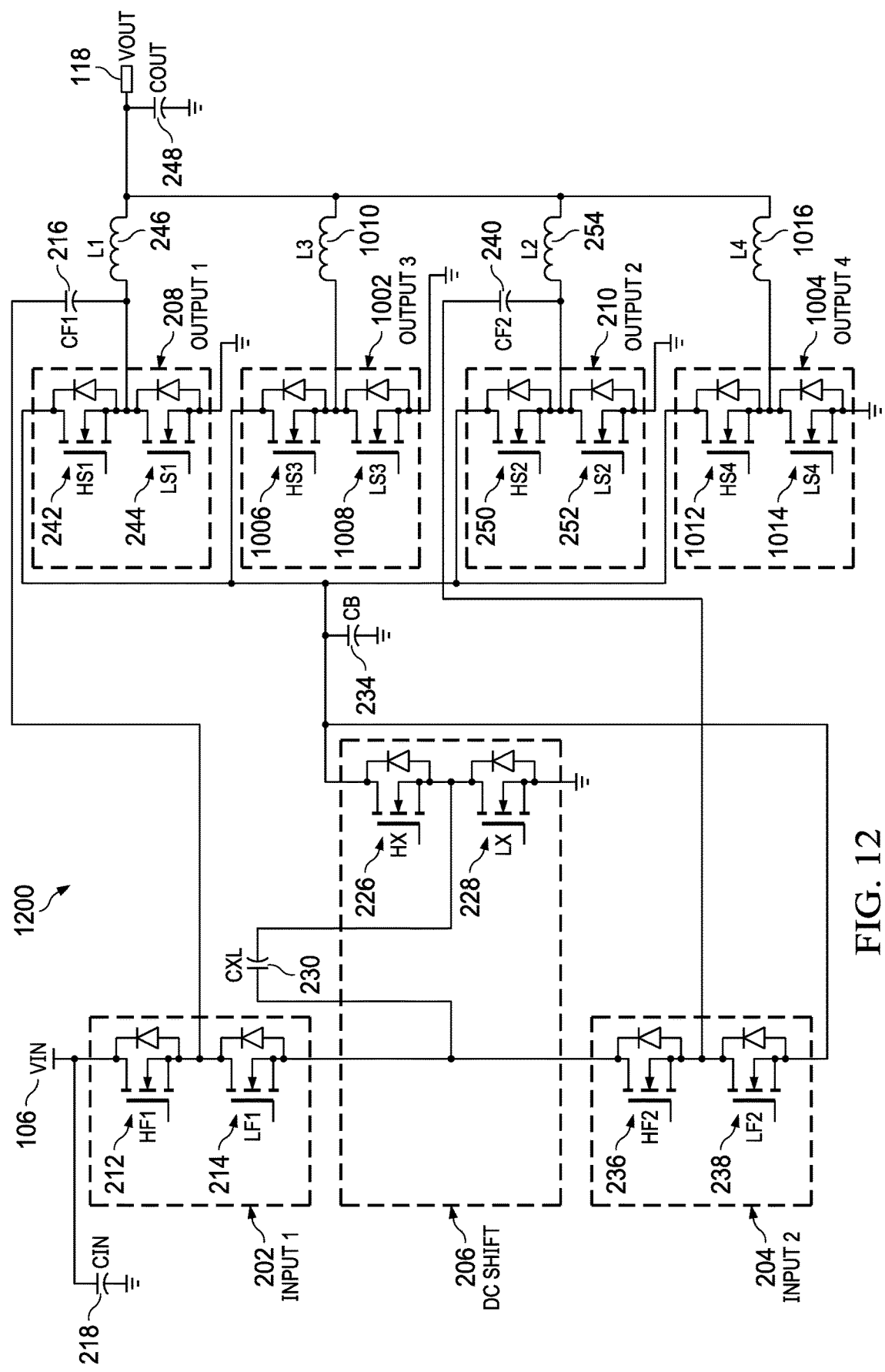

FIG. 12 is an example SCIB circuit 1200 as described in present implementations herein. Particularly, the SCIB circuit 1200, which is a variant of the SCIB circuit 1100, includes modified DC shift switch circuit 206 to generate a variant on the DC shift switch circuit between the first input switch circuit 202 that is connected in series with the second input switch circuit 204. The modified DC shift switch circuit 206 does not include the LFX 224, HFX 222, CMID 232 and the CXH 220. The SCIB circuit 1200 includes two input switch circuits and four output switch circuits.

Referencing the SCIB 1100 of FIG. 11, the LFX 224 and the CMID 232 are removed to form a variant SCIB circuit 1200 with less number of components. This embodiment does not compromise voltage and current variants. Reduced number of components can also be realized. In this embodiment, the one end of the low-side switch LF1 214 of the first input switch circuit 202 is now connected to the CXL 230 and the high-side switch HF2 236 of the second input switch circuit 204. The common node of the high-side switch HX 226 and the low-side switch LX 228 of the DC shift switch circuit 206 is connected to the CXL 230. In this embodiment, even with the removal of the LFX 224, HFX 222, CXH 220 and the CMID 232, the CXL 230 and the CB 234 can still inherently charge balance when the low-side switch LX 228 of the DC shift switch circuit 206 is turned ON. Other capacitors can inherently charge balance. The values of the other components can be varied due to absence of the LFX 224, HFX 222, CXH 220 and the CMID 232, and the SCIB circuit 1200 can generate a step down ratio of Vin/Vout=4/D with one/two/three/four output phases and one/two/three/four independent and regulated IBV outputs.

Figure 13:
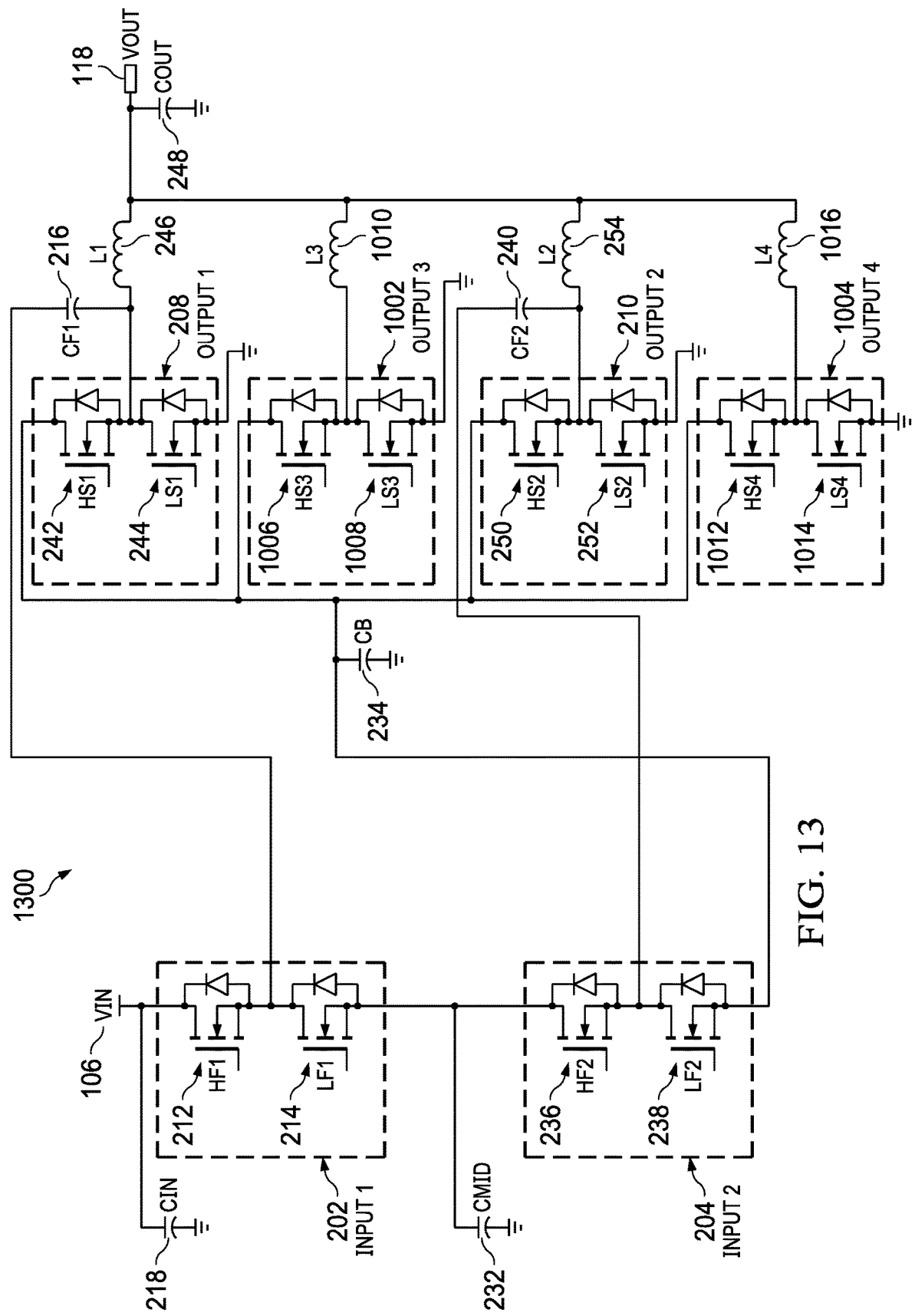

FIG. 13 is an example SCIB circuit 1300 as described in present implementations herein. Particularly, the SCIB circuit 1300, which is a variant of the SCIB circuit 1200, does not include DC shift switch circuit 206 between the series connected first input switch circuit 202 and second input switch circuit 204. The numbering of components in FIG. 2 is adopted throughout the circuit variations in this document; however, in certain implementations the values and other parameters can be changed.

In an embodiment, the DC shift switch circuit 206 is removed to generate a variant circuit with less number of components. This embodiment does not compromise voltage and current variants. Reduced number of components can also be realized. In this embodiment, the one end of the low-side switch LF1 214 of the first input switch circuit 202 is connected to the CMID 232 and one end of the high-side switch HF2 236 of the second input switch circuit 204. In this embodiment, with the removal of the DC shift switch circuit 206, the CMID 232, the CF1 216, the CF2 240 and the CB 234 can inherently charge balance.

The values of the other components can be varied due to absence of the DC shift switch circuit 206, and the SCIB circuit 1300 can generate a step down ratio of Vin/Vout=4/D with one/two/three/four output phases and one/two/three/four independent and regulated IBV outputs.

Figure 14:
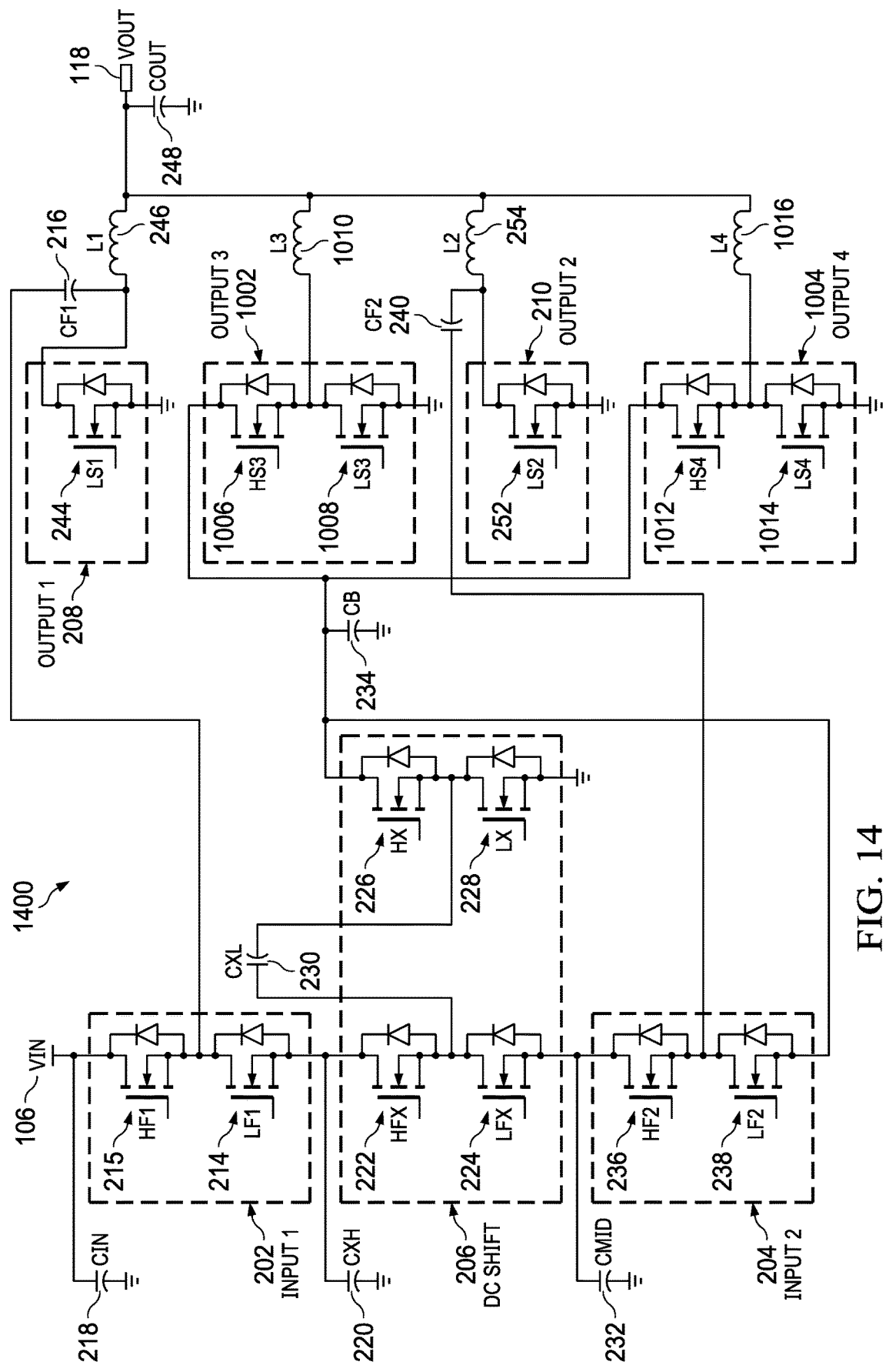

FIG. 14 is an example SCIB circuit 1400 as described in present implementations herein. Particularly, the SCIB circuit 1400 is similar to the SCIB circuit 1000; however, the high-side switch HS1 242 of first output circuit 208 and the high-side switch HS2 250 of the second output circuit 210 are removed from the SCIB circuit 1000 to form the SCIB 1400 that generates four output phases from the four parallel output circuits 108, 110, 1002, and 1004.

As shown, when the high-side switch HS1 242 of first output circuit 208 is removed from the SCIB circuit 1000, one end of the low-side switch LS1 244 of the first output circuit 208 is connected to the common node between the CF1 216 and the inductor L1 246. The other end of the low-side switch LS1 244 of the first output circuit 208 is connected to ground.

On the other hand, when the high-side switch HS2 250 of second output circuit 210 is removed from the SCIB circuit 1000, one end of the low-side switch LS2 252 of the second output circuit 210 is connected to the common node between the CF2 240 and the inductor L2 254. The other end of the low-side switch LS2 252 of the second output circuit 210 is connected to ground.

In an embodiment, the inductors L1 246, L2 254, L3 1010, and L4 1016 are connected in parallel and are configured to operate on four different phases to provide a regulated IBV 118. For example, the four different phases including a first phase, a second phase, a third phase, and a fourth phase are interleaved with each other and controlled by four PWM pulses that have time differences in between equal to a quarter of pulse cycle Ts. Furthermore, the SCIB circuit 1400 can be configured to operate on three output phases by removing one of four inductors; two output phases by removing two of four inductors; one output phase by removing three of four inductors. With the removal of the inductor, voltage and current variants are not compromised. Reduced number of components can also be realized.

Figure 15:
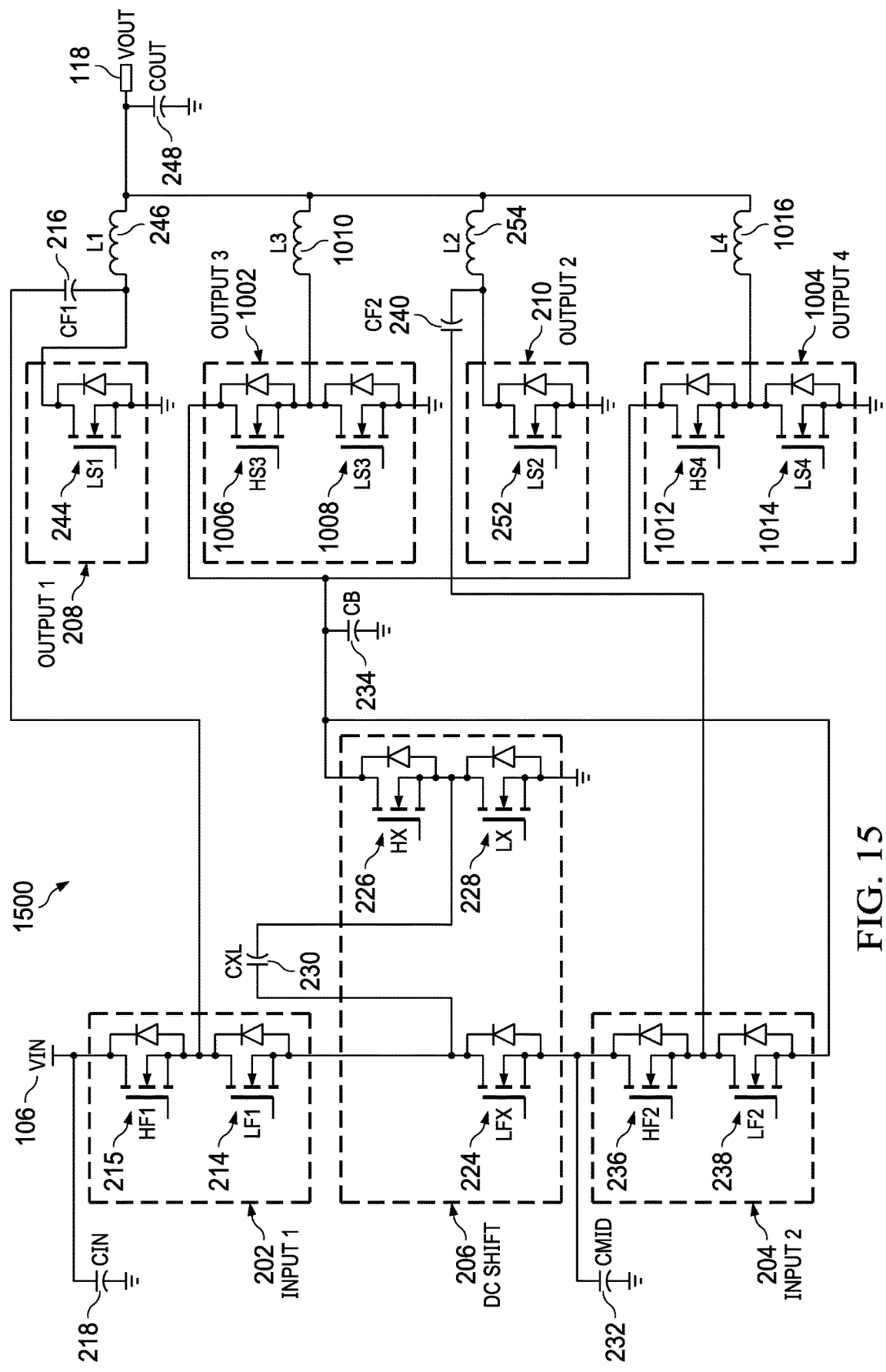
FIGS. 15-17 are block diagrams of example variations of a scalable switched capacitor integrated buck (SCIB) circuit of example FIG. 14 as described in present implementations herein.

FIG. 15 is an example SCIB circuit 1500 as described in present implementations herein. Particularly, the SCIB circuit 1500 includes the SCIB 1400 with a modified DC shift switch circuit 206. The modified DC shift switch circuit 206 does not include the HFX 222 and the CXH 220. The SCIB circuit 1500 includes two input switch circuits and four output switch circuits.

Referencing the SCIB 1400 of FIG. 14, the HFX 222 and the CXH 220 of the SCIB circuit 1400 are removed to form a variant SCIB circuit 1500 with less number of components. This embodiment does not compromise voltage and current variants. Reduced number of components can also be realized. In this embodiment, the one end of the low-side switch LF1 214 of the first input switch circuit 202 is connected to the CXL 230 and the floating low-side switch LFX 224 of the DC shift switch circuit 206. The common node of the high-side switch HX 226 and the low-side switch LX 228 of the DC shift switch circuit 206 is connected to the CXL 230. In this embodiment, with the removal of the CXH 220 and the HFX 222, the CXL 230 and the CB 234 can inherently charge balance when the floating low-side switch LFX 224 and the low-side switch LX 228 of the DC shift switch circuit 206 are turned ON. Other capacitors can inherently charge balance. The values of the other components can be varied due to absence of the CXH 220 and the HFX 222, and the SCIB circuit 1500 generate a step down ratio of Vin/Vout=4/D with one/two/three/four output phases and one/two/three/four independent and regulated IBV outputs.

Figure 16:
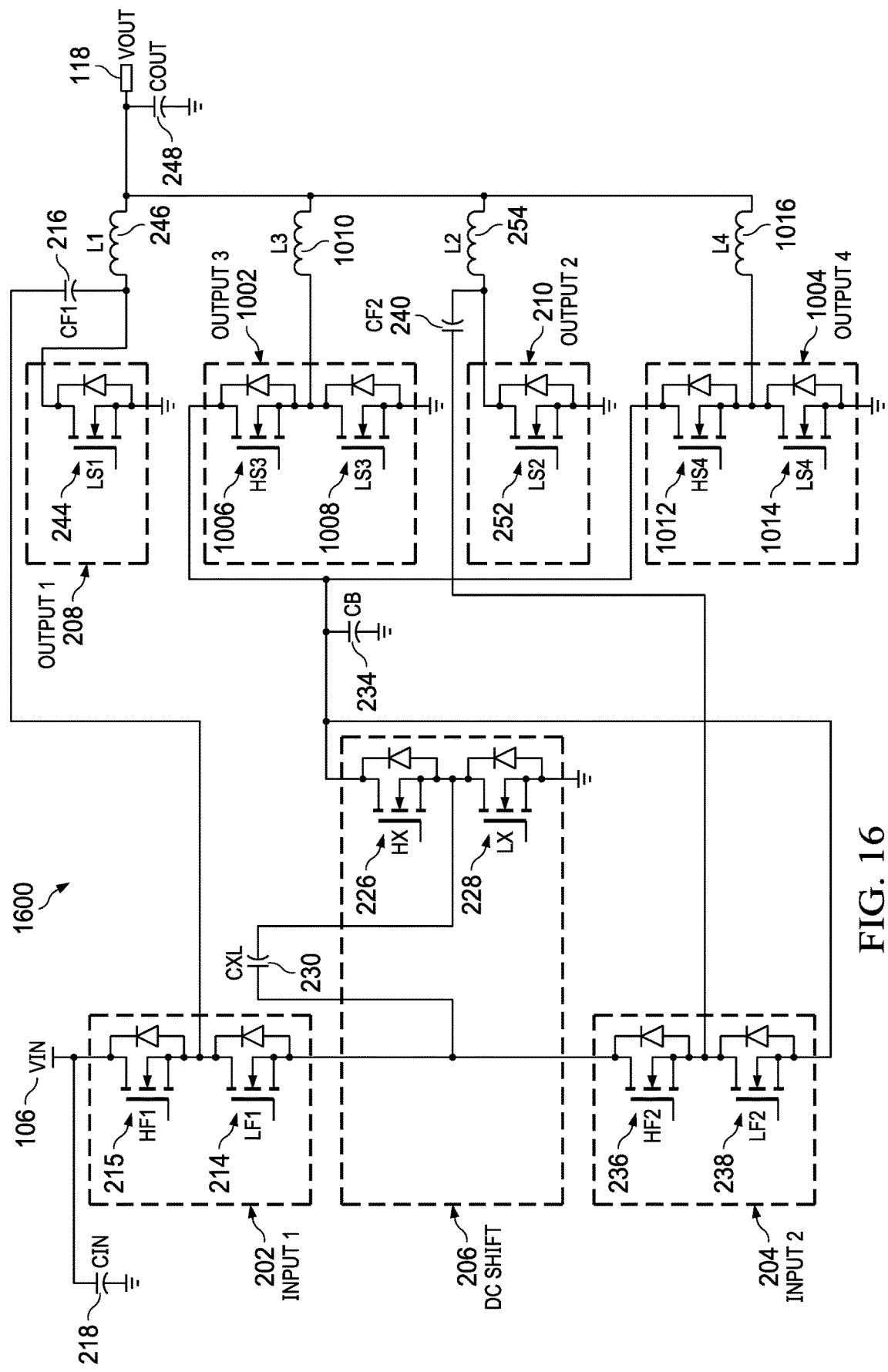

FIG. 16 is an example SCIB circuit 1600 as described in present implementations herein. Particularly, the SCIB circuit 1600, which is a variant of the SCIB circuit 1500, includes modified DC shift switch circuit 206 to generate a variant on the DC shift switch circuit between the first input switch circuit 202 that is connected in series with the second input switch circuit 204.

Referencing the SCIB 1500 of FIG. 15, the LFX 224 and the CMID 232 are removed to generate a variant SCIB circuit 1600 with less number of components. This embodiment does not compromise voltage and current variant. Reduced number of components can also be realized. In this embodiment, the one end of the low-side switch LF1 214 of the first input switch circuit 202 is connected to the CXL 230 and the high-side switch HF2 236 of the second input switch circuit 204. The common node of the high-side switch HX 226 and the low-side switch LX 228 of the DC shift switch circuit 206 is connected to the CXL 230. In this embodiment, with the removal of the HFX 222 and CXH 220, the CXL 230 and the CB 234 can inherently charge balance when the low-side switch LX 228 of the DC shift switch circuit 206 is turned ON. Other capacitors can inherently charge balance. The values of the other components can be varied due to absence of the HFX 222 and CXH 220, and the SCIB circuit 1600 can generate a step down ratio of Vin/Vout=4/D with one/two/three/four output phases and one/two/three/four independent and regulated IBV outputs.

Figure 17:
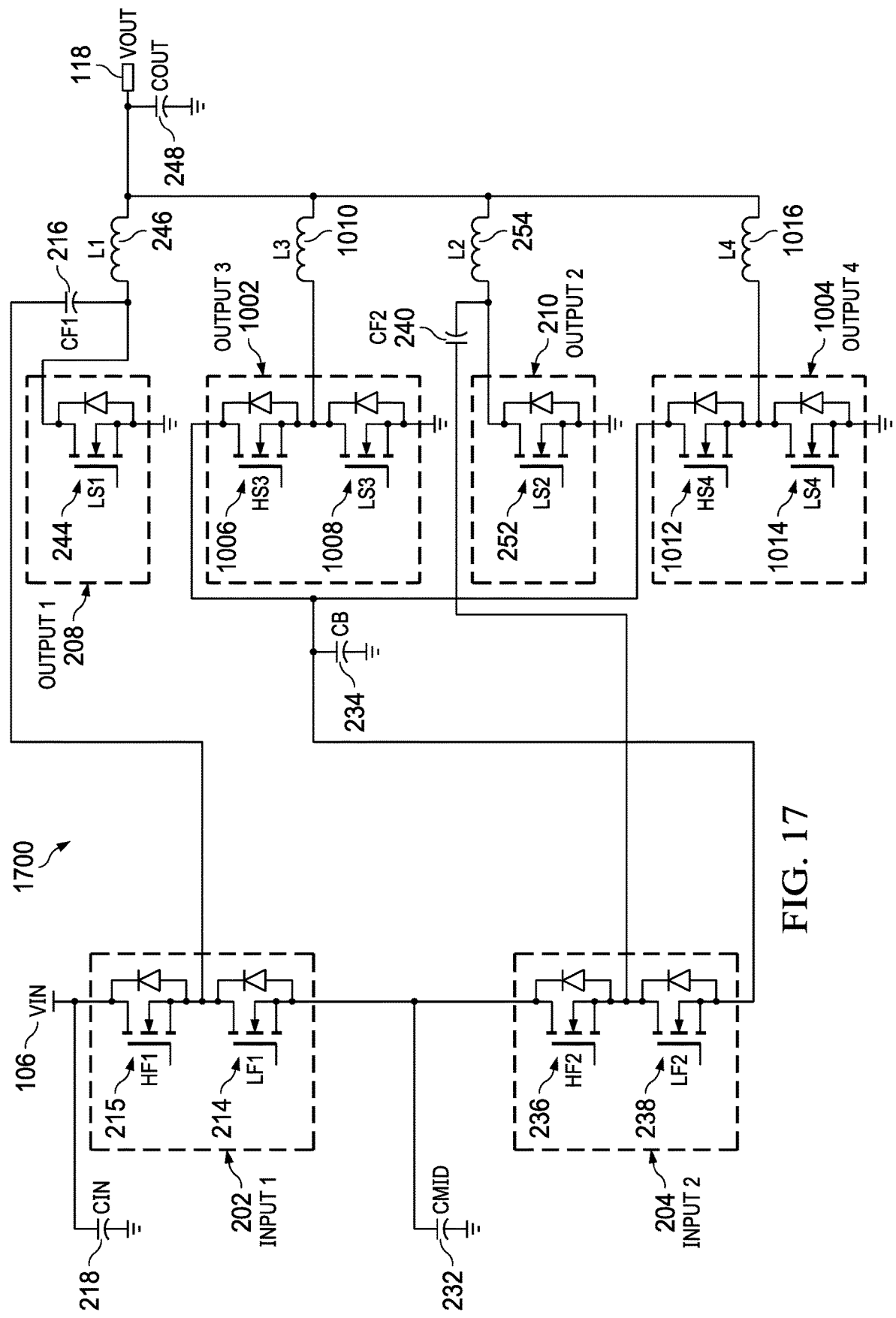

FIG. 17 is an example SCIB circuit 1700 as described in present implementations herein. Particularly, the SCIB circuit 1700, which is a variant of the SCIB circuit 1600, does not include DC shift switch circuit 206 between the series connected first input switch circuit 202 and second input switch circuit 204. The numbering of components in FIG. 2 is adopted throughout the circuit variations in this document; however, in certain implementations the values and other parameters can be changed.

In an embodiment, the DC shift switch circuit 206 is removed to generate a variant circuit with less number of components. This embodiment does not compromise voltage and current variants. Reduced number of components can also be realized. In this embodiment, the one end of the low-side switch LF1 214 of the first input switch circuit 202 is connected to the CMID 232 and one end of the high-side switch HF2 236 of the second input switch circuit 204. In this embodiment, with the removal of the DC shift switch circuit 206, the CMID 232, the CF1 216, the CF2 240 and the CB 234 can inherently charge balance. The values of the other components can be varied due to absence of the DC shift switch circuit 206, and the SCIB circuit 1700 can generate a step down ratio of Vin/Vout=4/D with one/two/three/four output phases and one/two/three/four independent and regulated IBV outputs.

Figure 18A:
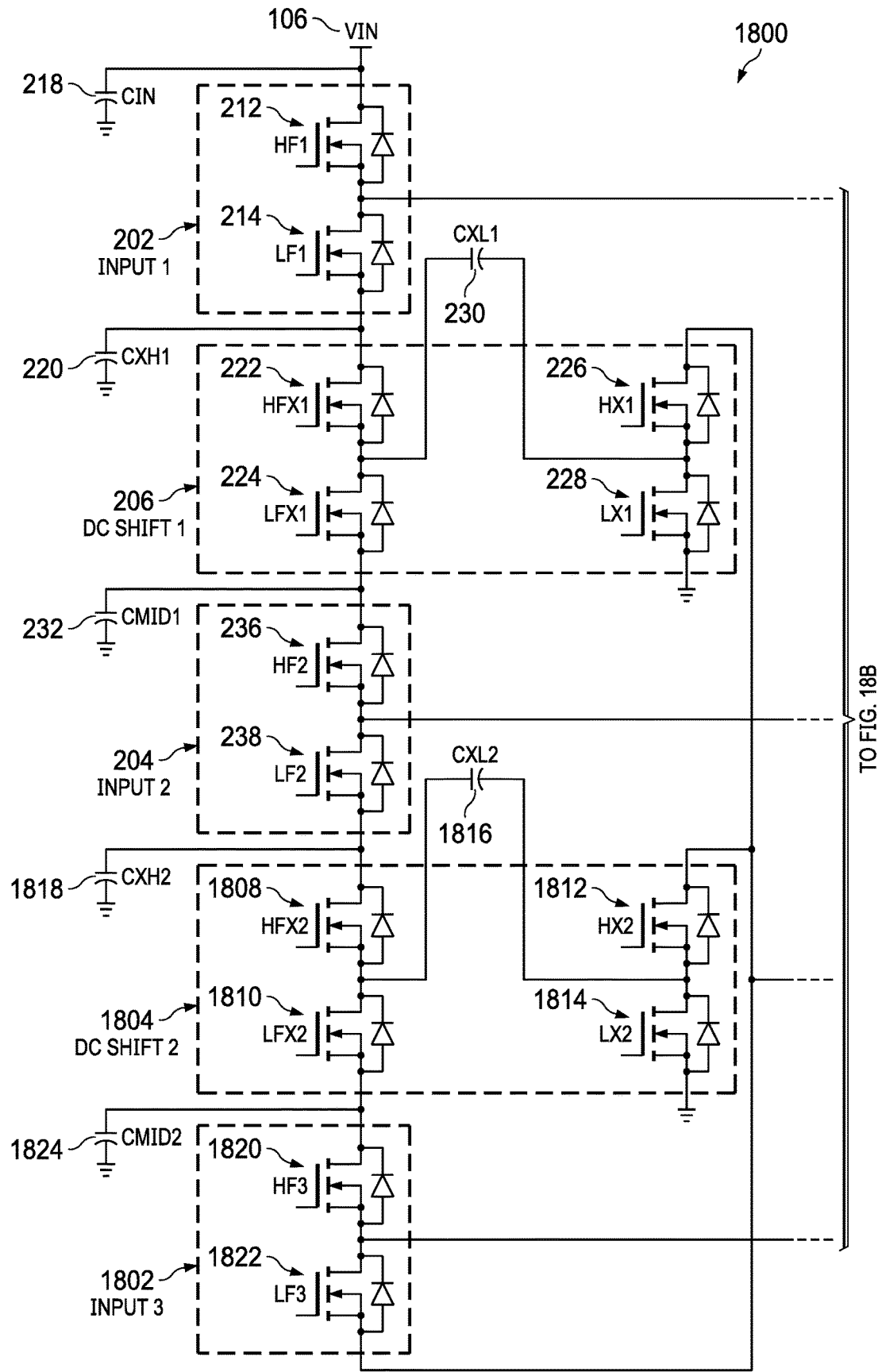
Figure 18B:
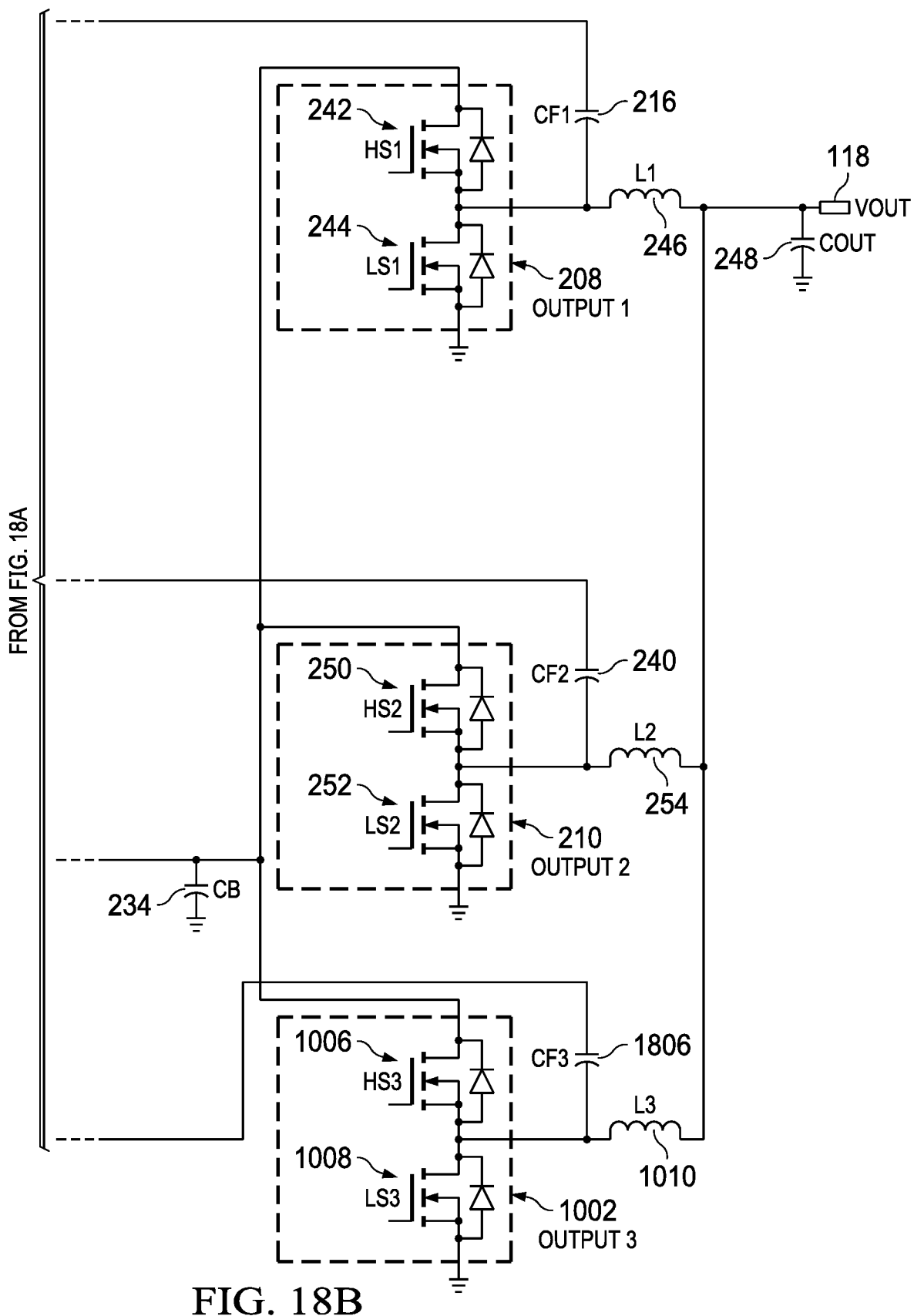

FIG. 18 is an example SCIB circuit 1800 as described in present implementations herein. Particularly, the SCIB circuit 1800 is similar to the SCIB circuit 200; however, an additional third input switch circuit 1802 is coupled by a second DC shift switch circuit 1804 to connect in series with the already series connected—first input switch circuit 202 and second input switch circuit 204. An additional third flying capacitor (CF3) 1806 is further added at the output circuit 1002 of the SCIB circuit 1400.

As shown, the second DC shift switch circuit 1804 includes a second floating high-side switch (HFX2) 1808, a second floating low-side switch (LFX2) 1810, a second high-side switch (HX2) 1812, and a second low-side switch (LX2) 1814. A common node between the high-side switch HX2 1812 and low-side switch LX2 1814 is connected to one end of a second voltage compensation capacitor (CXL2) 1816. The other end of the CXL2 is connected to a common node between the HFX2 1808 and LFX2 1810. Furthermore, the other end of the floating high-side switch HFX2 1808 is connected to a second voltage compensation capacitor (CXH2) 1818.

The third input switch circuit 1802 further includes a high-side switch (HF3) 1820 and a low-side switch (LF3) 1822 where a common node between the HF3 1820 and the LFX2 1810 is connected to a second middle capacitor (CMID2) 1824.

In an embodiment, the SCIB circuit 1800 generates a step down ratio of Vin/Vout=6/D with one/two/three output phases and one/two/three independent and regulated IBV outputs. That is, the output circuits 208, 210, and 1002 are configured to generate up to three regulated IBV outputs 118 using up to three output phases. In this embodiment, the Vin 106 can be further manipulated by using three input switch circuits 202, 204, and 1802 that are connected in series.

As described herein, when the high-side switch HF3 1820 of the third input switch circuit 1802 and the high-side switch HS3 1006 of the third output switch circuit 1002 are turned ON. Thereby the third phase delivers power to output 118 from two sources—CMID2 1824 and CB 234. When the low-side switch LF3 1822 of the third input switch circuit 1802 and the low-side switch LS3 1008 of the third output switch circuit 1002 are turned ON, the CB 234 and the CF3 1806 inherently charge balance during the third phase. Furthermore, the floating low-side switch LFX2 1808 and the low-side switch LX2 1814 of the second DC shift switch circuit 1804 are turned ON and the CXL2 1816 and the CMID2 1824 inherently charge balance. Similar to the described implementations above, the IBV 118 is generated through the parallel connected inductors 246, 254, and 1010 that are connected in parallel with the Cout 248.

Figure 19A:
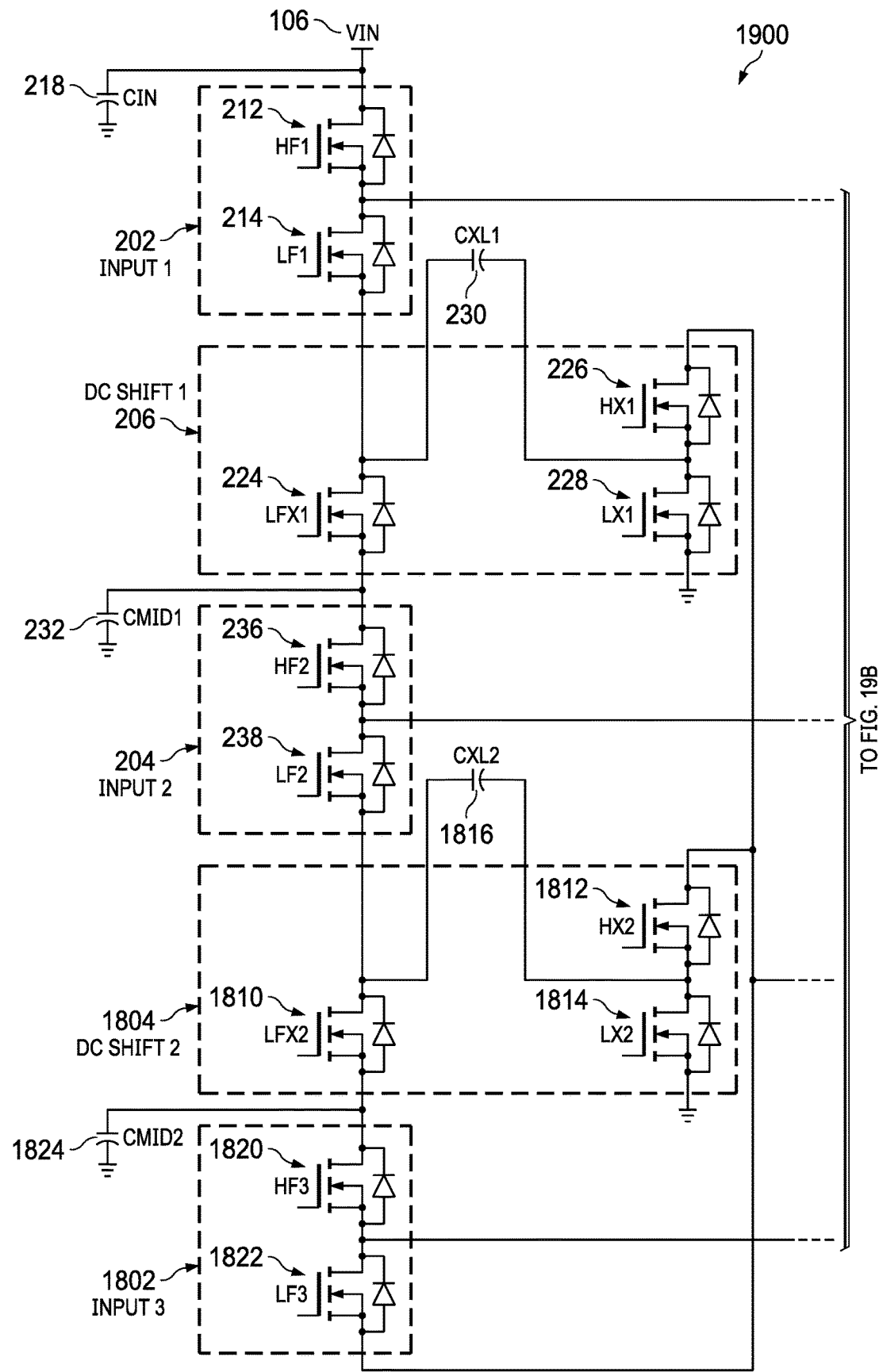
FIGS. 19A, 19B, 20A, 20B, and 21 are block diagrams of example variations of a scalable switched capacitor integrated buck (SCIB) circuit of example FIG. 18 as described in present implementations herein.
Figure 19B:
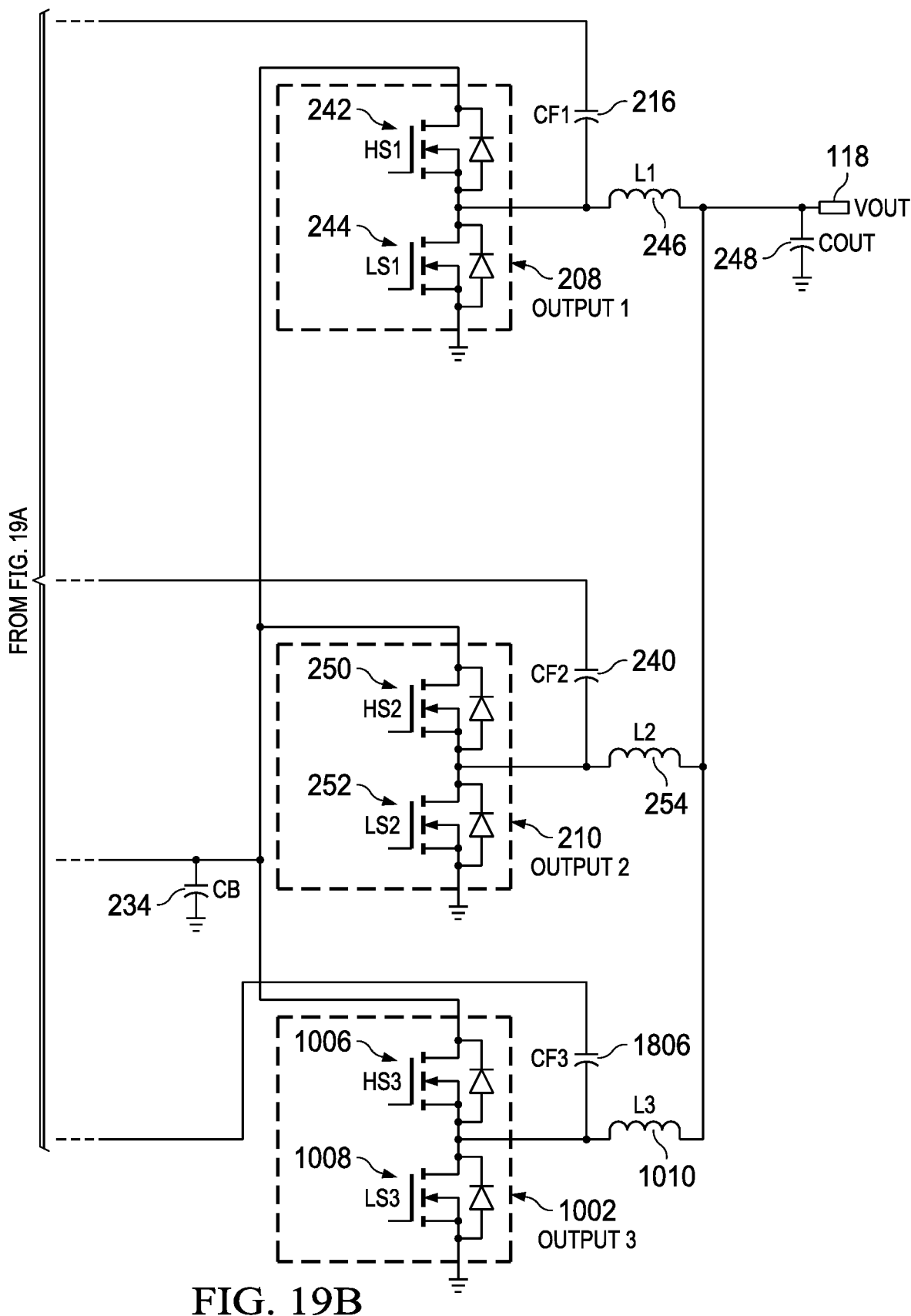

FIG. 19 is an example SCIB circuit 1900 as described in present implementations herein. Particularly, the SCIB circuit 1900, which is a variant of the SCIB circuit 1800, includes modified first DC shift switch circuit 206 to generate a variant on the DC shift switch circuit between the first input switch circuit 202 that is connected in series with the second input switch circuit 204 of FIG. 1800. Furthermore, the second DC shift switch circuit 1804 is modified to generate a variant on the DC shift switch circuit between the second input switch circuit 204 that is connected in series with the third input switch circuit 1802. The SCIB circuit 1900 generates three output phases using modified DC shift switch circuits.

Referencing the SCIB 1800 of FIG. 18, the CXH1 220, HFX1 222, CXH2 1818, and HFX2 1808 are removed to generate a variant circuit with less number of components. This embodiment does not compromise voltage and current variants. Reduced number of components can also be realized. In this embodiment, the one end of the low-side switch LF2 238 of the second input switch circuit 204 is now connected to the CXL2 1816 and one end of the LFX2 1810 of the DC shift switch circuit 1804. The common node of the high-side switch HX2 1812 and the low-side switch LX2 1814 of the second DC shift switch circuit 1804 is connected to the CXL2 1816. In this embodiment, with the removal of the CXH1 220, HFX1 222, CXH2 1818, and HFX2 1808, the CXL2 1816, CMID1 232, and CMID2 1824 can inherently charge balance when the low-side switch LX2 1814 of the DC shift switch circuit 1804 and the floating low-side switch LFX2 1810 of the second DC shift switch circuit 1804 are turned ON. Other capacitors can inherently charge balance. The values of the other components can be varied due to absence of the CXH1 220, HFX1 222, CXH2 1818, and HFX2 1808, and the SCIB circuit 1900 can generate a step down ratio of Vin/Vout=6/D with one/two/three output phases and one/two/three independent and regulated IBV outputs.

Figure 20A:
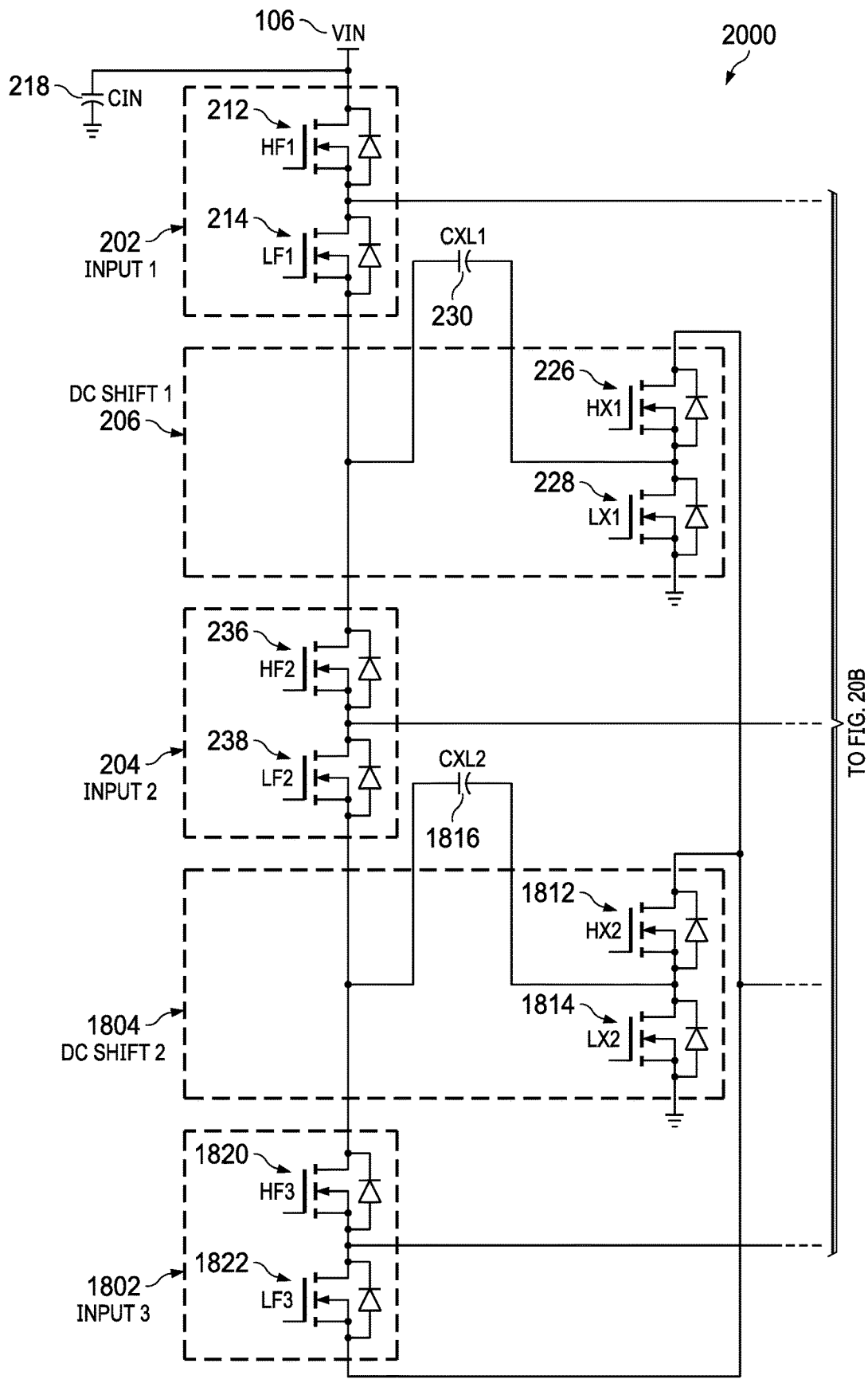
Figure 20B:
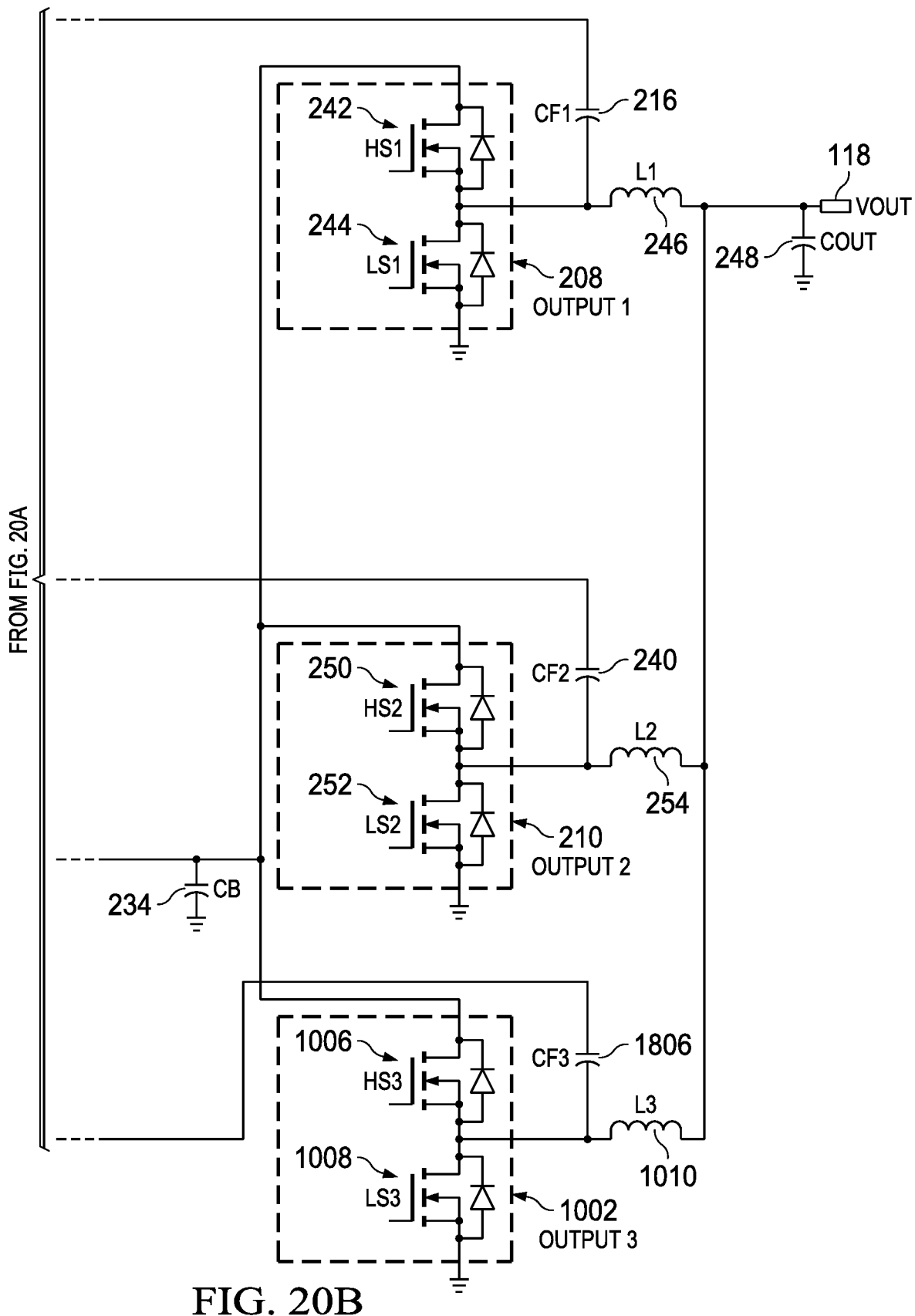

FIG. 20 is an example SCIB circuit 2000 as described in present implementations herein. Particularly, the SCIB circuit 2000, which is a variant of the SCIB circuit 1900, includes modified first DC shift switch circuit 206 to generate a variant on the DC shift switch circuit between the first input switch circuit 202 that is connected in series with the second input switch circuit 204 of FIG. 1900. Furthermore, the second DC shift switch circuit 1804 is modified to generate a variant on the DC shift switch circuit between the second input switch circuit 204 that is connected in series with the third input switch circuit 1802. The SCIB circuit 2000 generates three output phases using modified DC shift switch circuits.

Referencing the SCIB 1900 of FIG. 19, the floating high-side switch LFX1 224, CMID1 232, LFX2 1810, and CMID2 1824 are removed to generate the variant SCIB 1600 circuit with less number of components. This embodiment does not compromise voltage and current variants. Reduced number of components can also be realized. In this embodiment, the one end of the high-side switch HF2 236 of the second input switch circuit 204 is now connected directly to the CXL1 230 and the low-side switch LF1 214 of the first input switch circuit 202. The common node of the high-side switch HF3 1820 (of third input circuit 1802) and the low-side switch LF2 238 (of second input circuit 204) is connected to the CXL2 1816. In this embodiment, with the removal of the LFX1 224, CMID1 232, LFX2 1810, and CMID2 1824, the CXL1 230, CXL2 1816 and CB 234 can inherently charge balance when the low-side switch LX1 228 of the first DC shift switch circuit 206 and the low-side switch LX2 1814 of the second DC shift switch circuit 1804 are turned ON. Other capacitors can inherently charge balance. The values of the other components can be varied due to absence of the LFX1 224, CMID1 232, LFX2 1810, and CMID2 1824, and the SCIB circuit 2000 can generate a step down ratio of Vin/Vout=6/D with one/two/three output phases and one/two/three independent and regulated IBV outputs.

Figure 21:
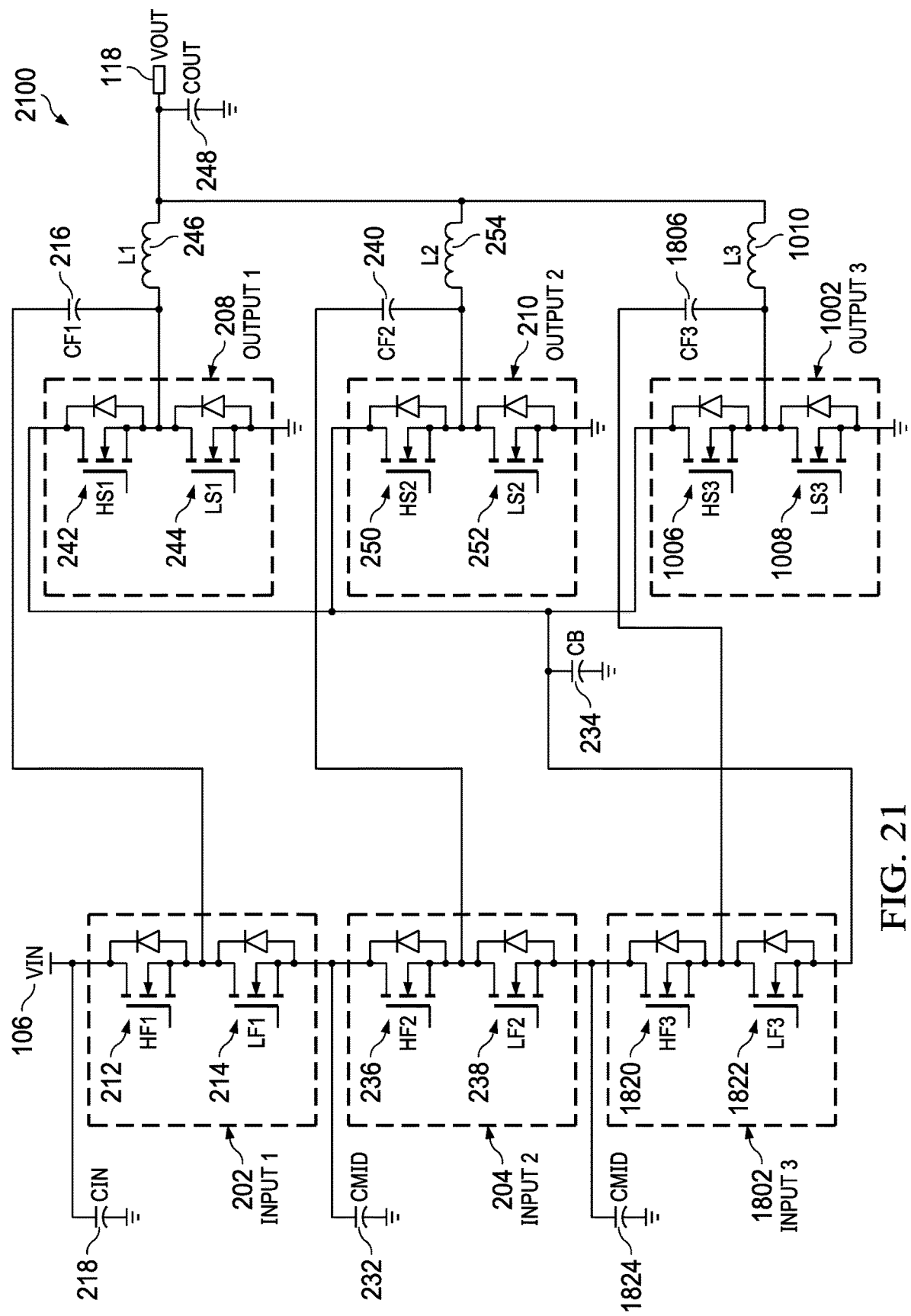

FIG. 21 is an example SCIB circuit 2100 as described in present implementations herein. Particularly, the SCIB circuit 2100, which is a variant of the SCIB circuit 2000, does not include DC shift switch circuit 206 between the series connected first input switch circuit 202 and second input switch circuit 204. Furthermore, the SCIB circuit 2100 does not include DC shift switch circuit 1804 between the series connected second input switch circuit 204 and third input switch circuit 1802.

In an embodiment, the DC shift switch circuits 206 and 1804 are removed to generate a variant circuit with less number of components. This embodiment does not compromise voltage and current variants. Reduced number of components can also be realized. In this embodiment, the one end of the low-side switch LF1 214 of the first input switch circuit 202 is connected to the CMID 232 and one end of the high-side switch HF2 236 of the second input switch circuit 204. The common node of the high-side switch HF2 236 and the low-side switch LF2 238 of the second input circuit 204 is connected to the capacitor CF2 240. The low-side switch LF2 238 of the second input switch circuit 204 is connected to common node between CMID 1824 and the high-side switch HF3 1820 of the third input switch circuit 1802. The common node between the high-side switch HF3 1820 and the low-side switch LF3 1822 of the third input switch circuit 1802 is connected to CF3 1806.

In the embodiment above, even with the removal of the DC shift switch circuits 206 and 1804, the CMID1 232, CMID2 1824, the CF1 216, the CF2 240, the CF3 1806, and the CB 234 can inherently charge balance. The voltages of the input switch circuits and the output switch circuits are equal to the biasing voltage Vbias about 10V-15V. The values of the other components can be varied due to absence of the DC shift switch circuits 206 and 1804, and the SCIB circuit 2100 can generate a step down ratio of Vin/Vout=6/D with one/two/three output phases and one/two/three independent and regulated IBV outputs of about 0.5-15V.

Figure 22A:
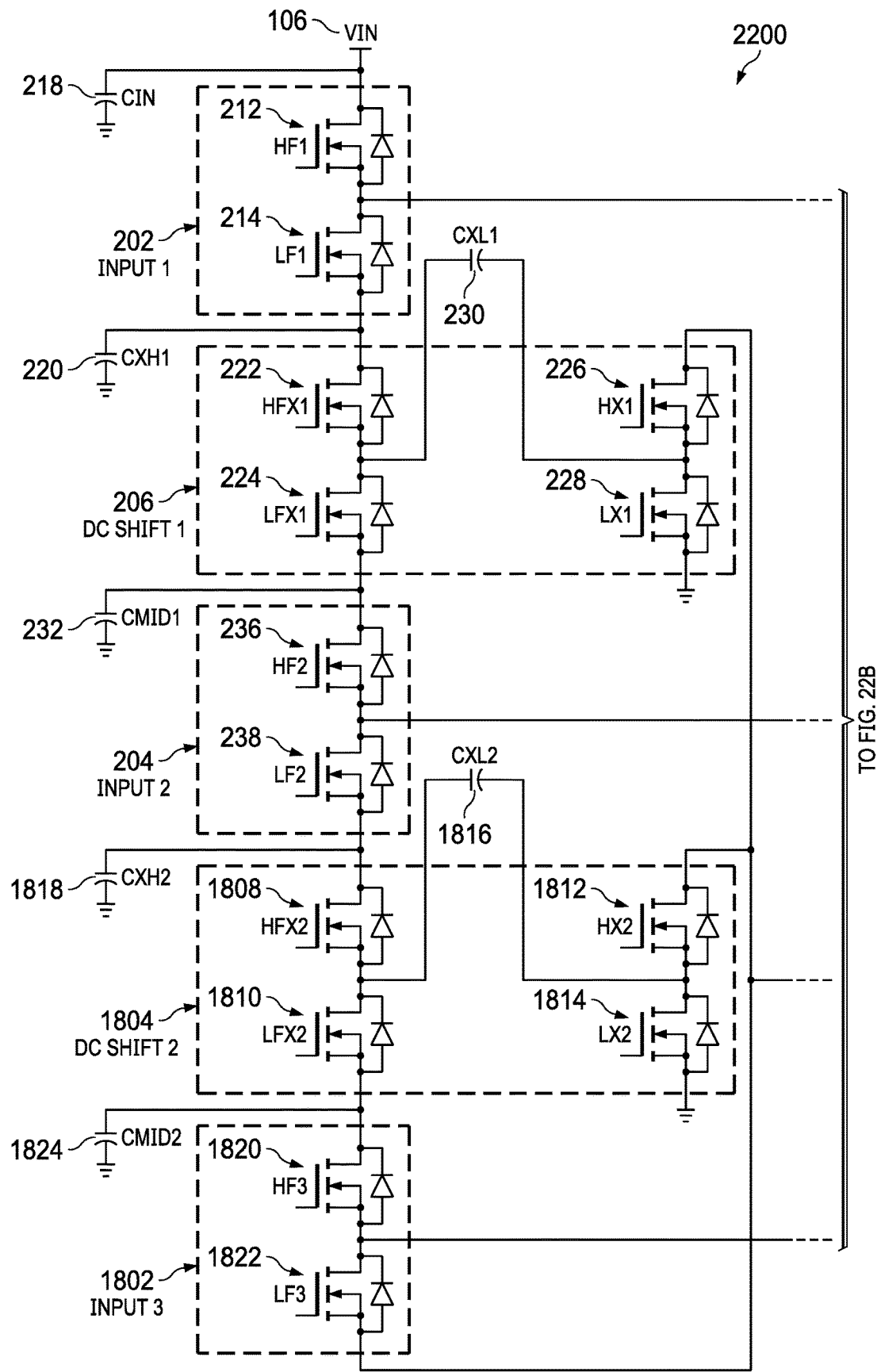
Figure 22B:
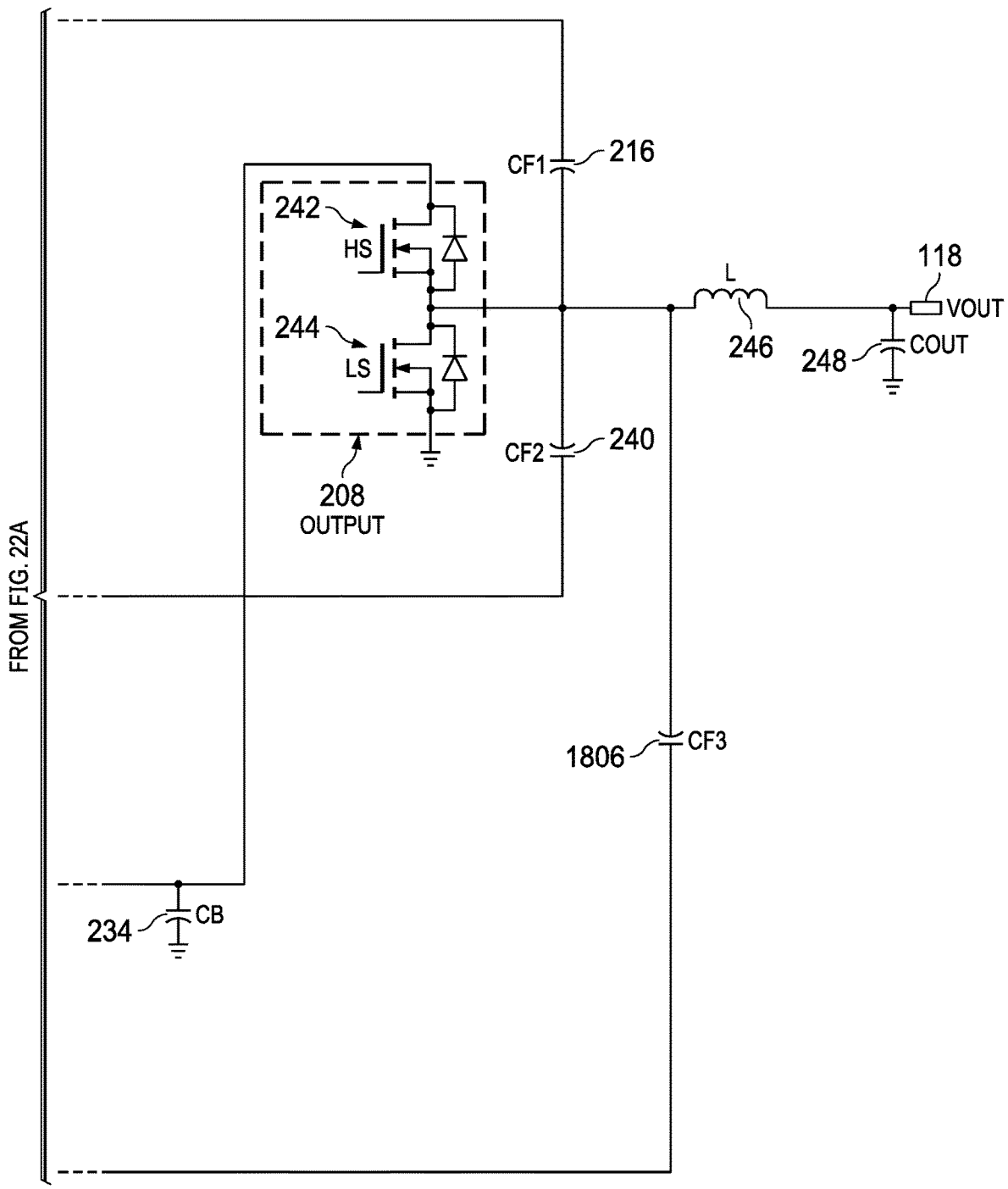

FIG. 22 is an example SCIB circuit 2200 as described in present implementations herein. Particularly, the SCIB circuit 2200 is similar to the SCIB circuit 1800; however, the second output circuit 210 and the third output circuit 1002, and the inductors 254 and 1010 are removed to generate a step down ratio of Vin/Vout=6/D with a single output phase and a single regulated IBV output.

As shown, the common node between the high-side switch HS1 242 and low-side switch LS1 244 of the output circuit 208 is connected to the CF1 216, CF2 240, CF3 906, and the LC circuit—inductor 246 and Cout 248. Furthermore, one end of the high-side switch 242 is connected to the CB 234 while another end of the low-side switch 244 is connected to ground.

In an embodiment, the step down ratio of the SCIB circuit 2200 is Vin/Vout=6/D with a single output phase at IBV 118. In this embodiment, the low-side switches LF1 214, LF2 238, and LF3 1822 of the series connected input switch circuits and the low-side switch LS 244 of the output switch circuit 208 are turned on thereby the CF1 216, CF2 240, CF3 1806, and the CB 234 inherently charge balance. Other capacitors can inherently charge balance. In this case, the SCIB circuit 2200 can generate a regulated predetermined output value of about 0.5-15 volts.

Figure 23A:
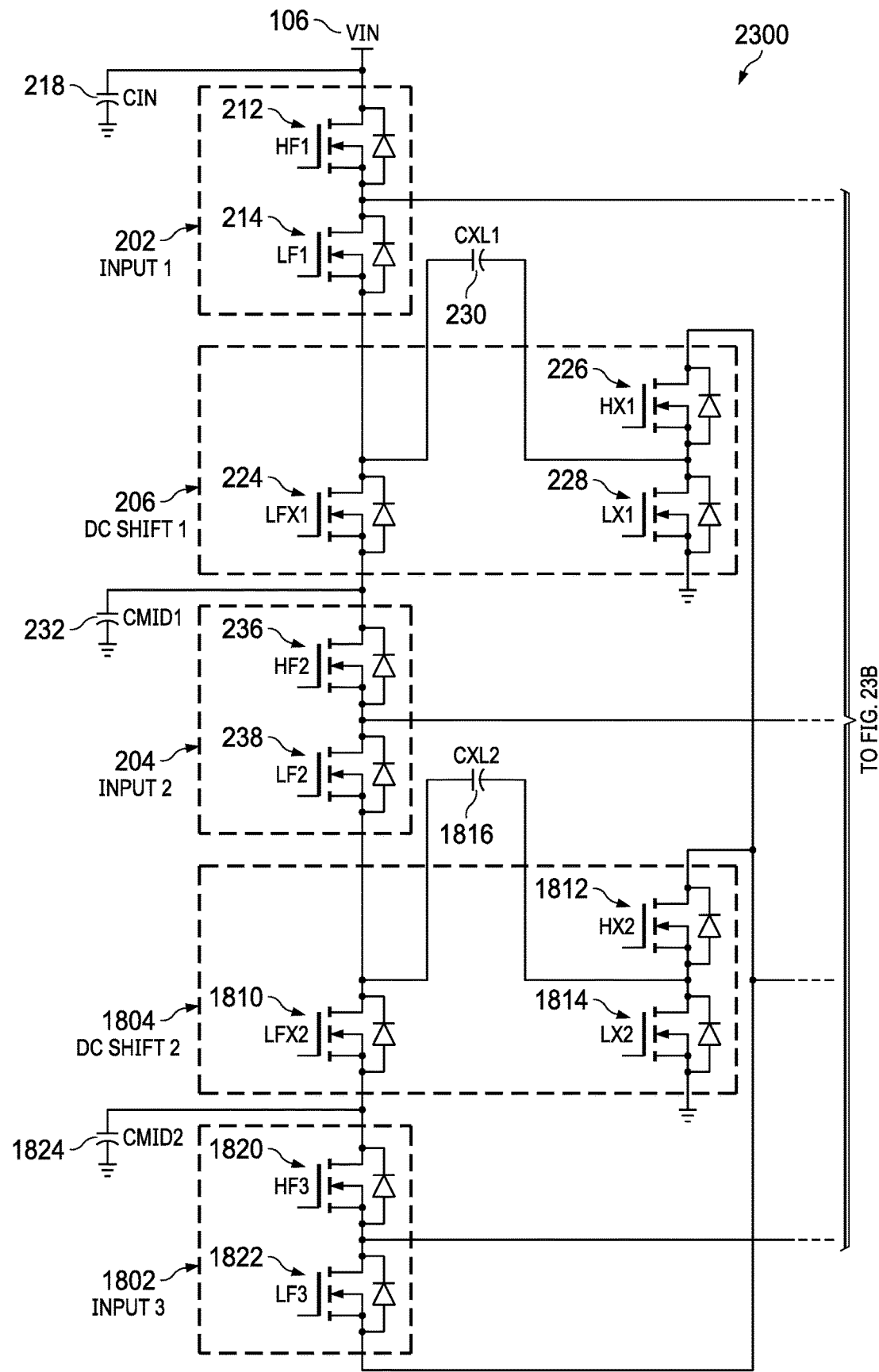
FIGS. 23A, 23B, 24A, 24B and 25 are block diagrams of example variations of a scalable switched capacitor integrated buck (SCIB) circuit of example FIG. 22 as described in present implementations herein.
Figure 23B:
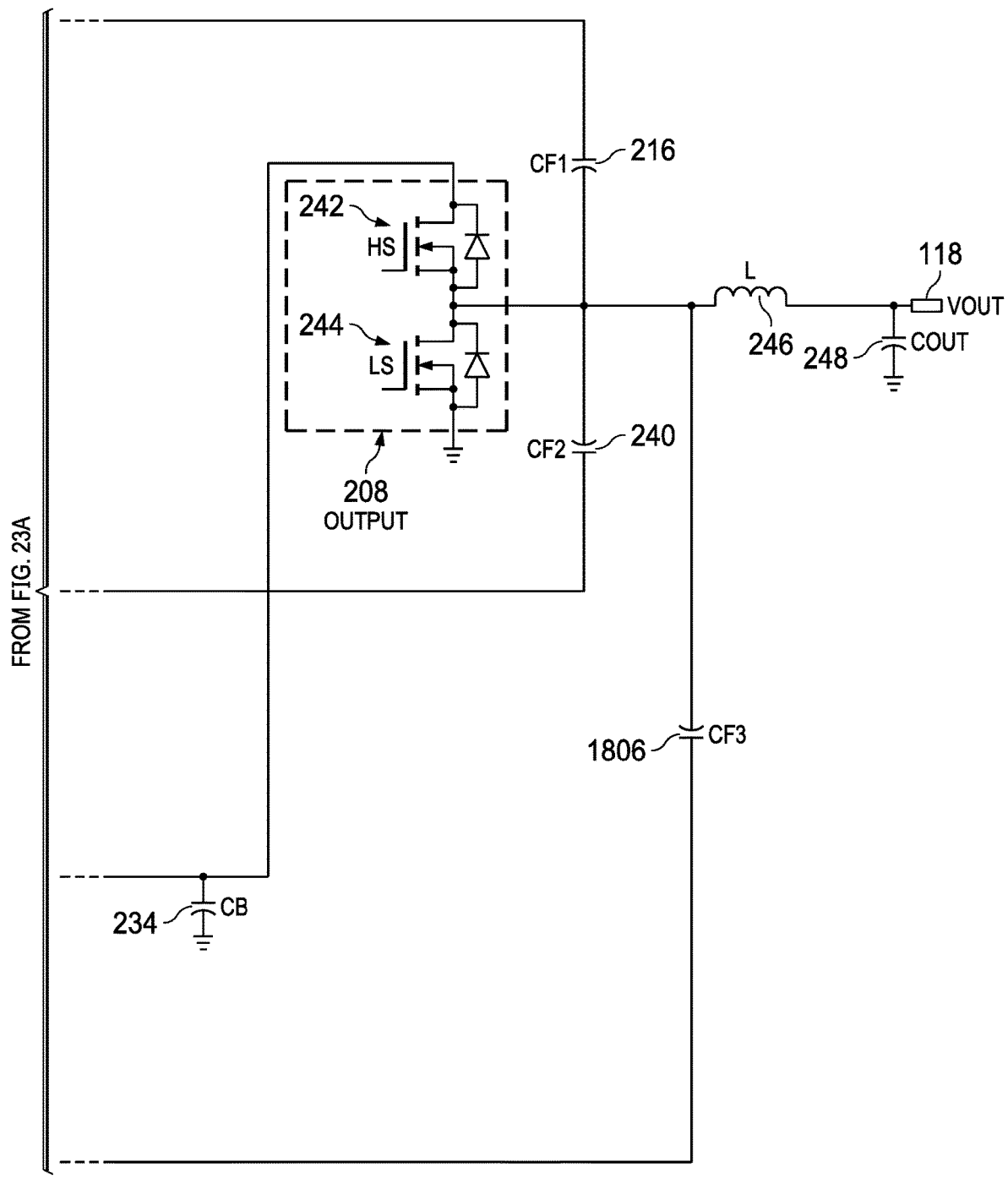

FIG. 23 is an example SCIB circuit 2300 as described in present implementations herein. Particularly, the SCIB circuit 2300, which is a variant of the SCIB circuit 2200, includes modified first DC shift switch circuit 206 to generate a variant on the DC shift switch circuit between the first input switch circuit 202 that is connected in series with the second input switch circuit 204 of FIG. 2200. Furthermore, the second DC shift switch circuit 1804 is modified to generate a variant on the DC shift switch circuit between the second input switch circuit 204 that is connected in series with the third input switch circuit 1802. The SCIB circuit 2300 generates a step down ratio of Vin/Vout=6/D with a single phase output using modified DC shift switch circuits.

Referencing the SCIB 2200 of FIG. 22, the CXH1 220, HFX1 222, CXH2 1818, and HFX2 1808 are removed to generate a variant SCIB circuit 2300 with less number of components. This embodiment does not compromise voltage and current variants. Reduced number of components to can also be realized. In this embodiment, the one end of the low-side switch LF2 238 of the second input switch circuit 204 is connected to the CXL2 1816 and one end of the floating low-side switch LFX2 1810 of the DC shift switch circuit 1804. The common node of the high-side switch HX2 1812 and the low-side switch LX2 1814 of the second DC shift switch circuit 1804 connected to the CXL2 1816. In this embodiment, even the removal of the CXH1 220, HFX1 222, CXH2 1818, and HFX2 1808, the CXL1 230, CXL2 1816, CMID 232, CMID2 1824, and the CB 234 can inherently charge balance when the low-side switches LX1 228 and LX2 1814 and the floating low-side switches LFX1

224 and LFX2 1810 of the DC shift switch circuits 206 and 1804 are turned ON. Other capacitors can inherently charge balance. The values of the other components can be varied due to absence of the CXH1 220, HFX1 222, CXH2 1818, and HFX2 1808, and the SCIB circuit 2300 can generate a step down ratio of Vin/Vout=6/D with a single output phase and a single regulated IBV output.

Figure 24A:
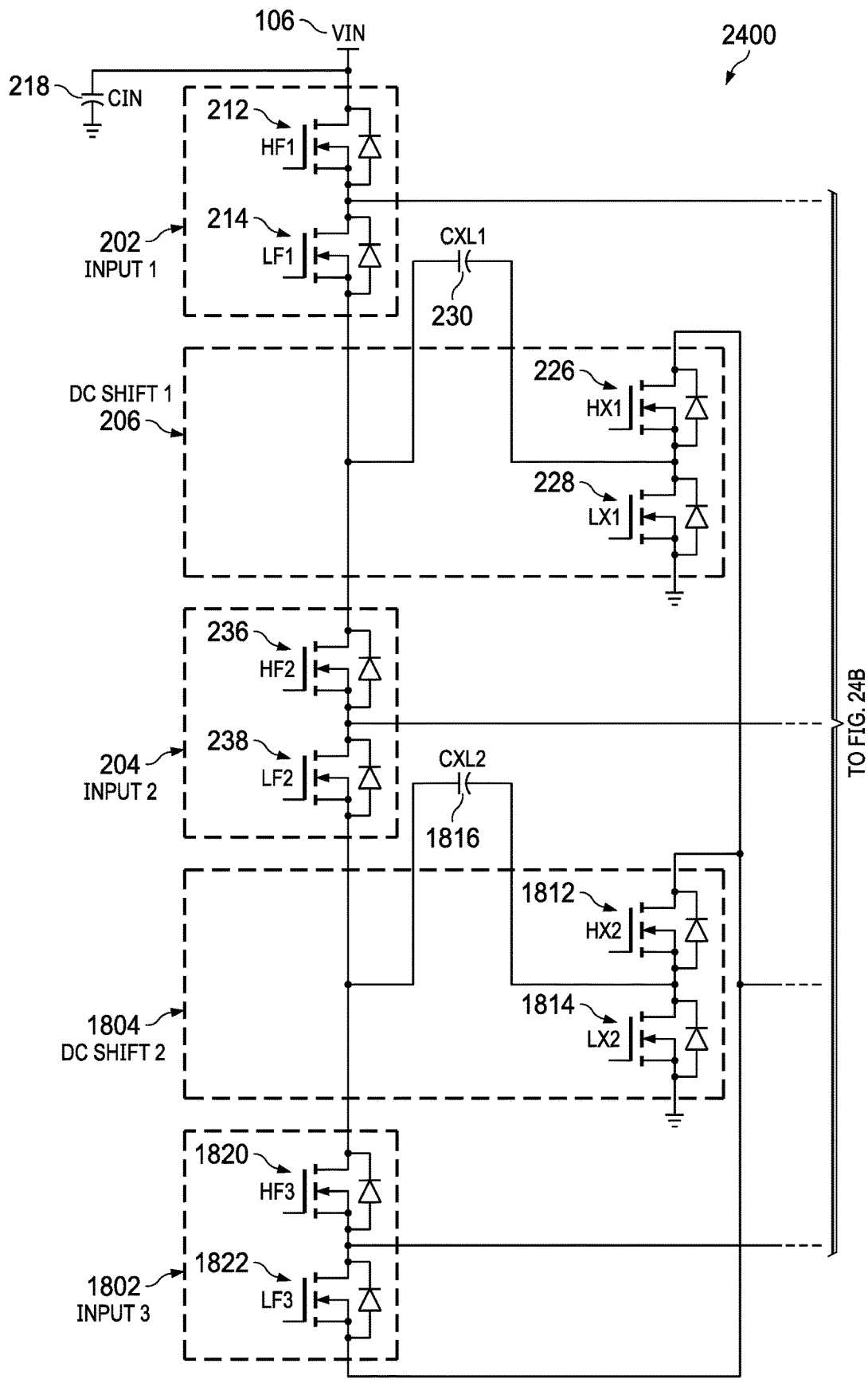
Figure 24B:
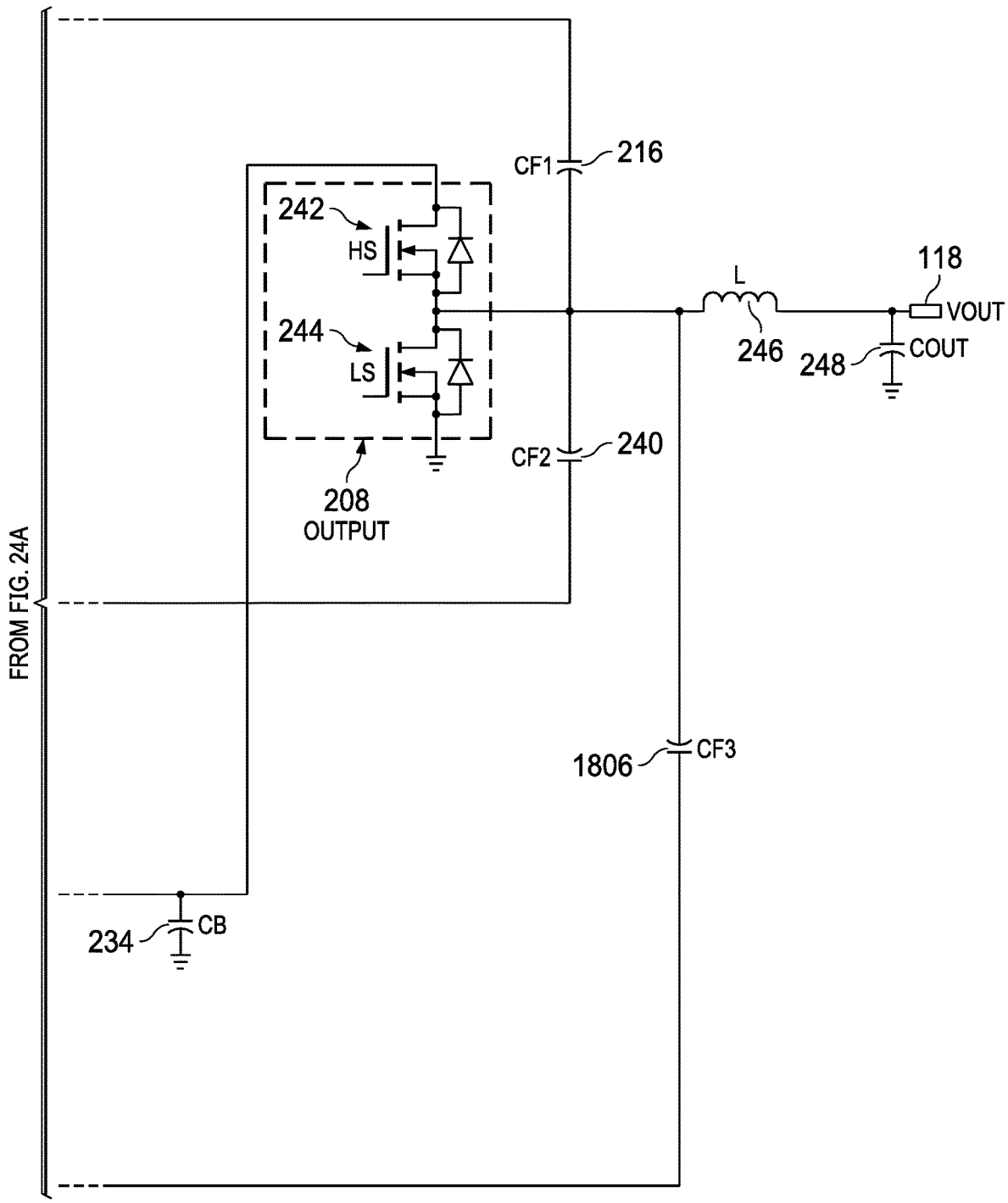

FIG. 24 is an example SCIB circuit 2400 as described in present implementations herein. Particularly, the SCIB circuit 2400, which is a variant of the SCIB circuit 2300, does not include the floating low-side switch LFX1 224, CMID1 232, LFX2 1810, and CMID2 1824 to generate the variant SCIB 2400 circuit with less number of components. This embodiment does not compromise voltage and current variants. Reduced number of components can also be realized. Particularly, the SCIB circuit 2400, which is a variant of the SCIB circuit 2300, includes modified first DC shift switch circuit 206 to generate a variant on the DC shift switch circuit between the first input switch circuit 202 that is connected in series with the second input switch circuit 204 of FIG. 1900. Furthermore, the second DC shift switch circuit 1804 is modified to generate a variant on the DC shift switch circuit between the second input switch circuit 204 that is connected in series with the third input switch circuit 1802. The SCIB circuit 2000 generates three output phases using modified DC shift switch circuits.

In this embodiment, the one end of the high-side switch HF2 236 of the second input switch circuit 204 is connected directly to the CXL1 230 and the low-side switch LF1 214 of the first input switch circuit 202. The common node of the high-side switch HF3 1820 (of third input circuit 1802) and the low-side switch LF2 238 (of second input circuit 204) is connected to the CXL2 1816. In this embodiment still, even with the removal of the LFX1 224, CMID1 232, LFX2 1810, and CMID2 1824, the CXL1 230, CXL2 1816, and CB 234 can inherently charge balance when the low-side switch LX1 228 of the first DC shift switch circuit 206 and the low-side switch LX2 1814 of the second DC shift switch circuit 1804 are turned ON. Other capacitors can inherently charge balance. The values of the other components can be varied due to absence of the LFX1 224, CMID1 232, LFX2 1810, and CMID2 1824, and the SCIB circuit 2400 can generate a step down ratio of Vin/Vout=6/D with a single output phase and a single regulated IBV output.

Figure 25:
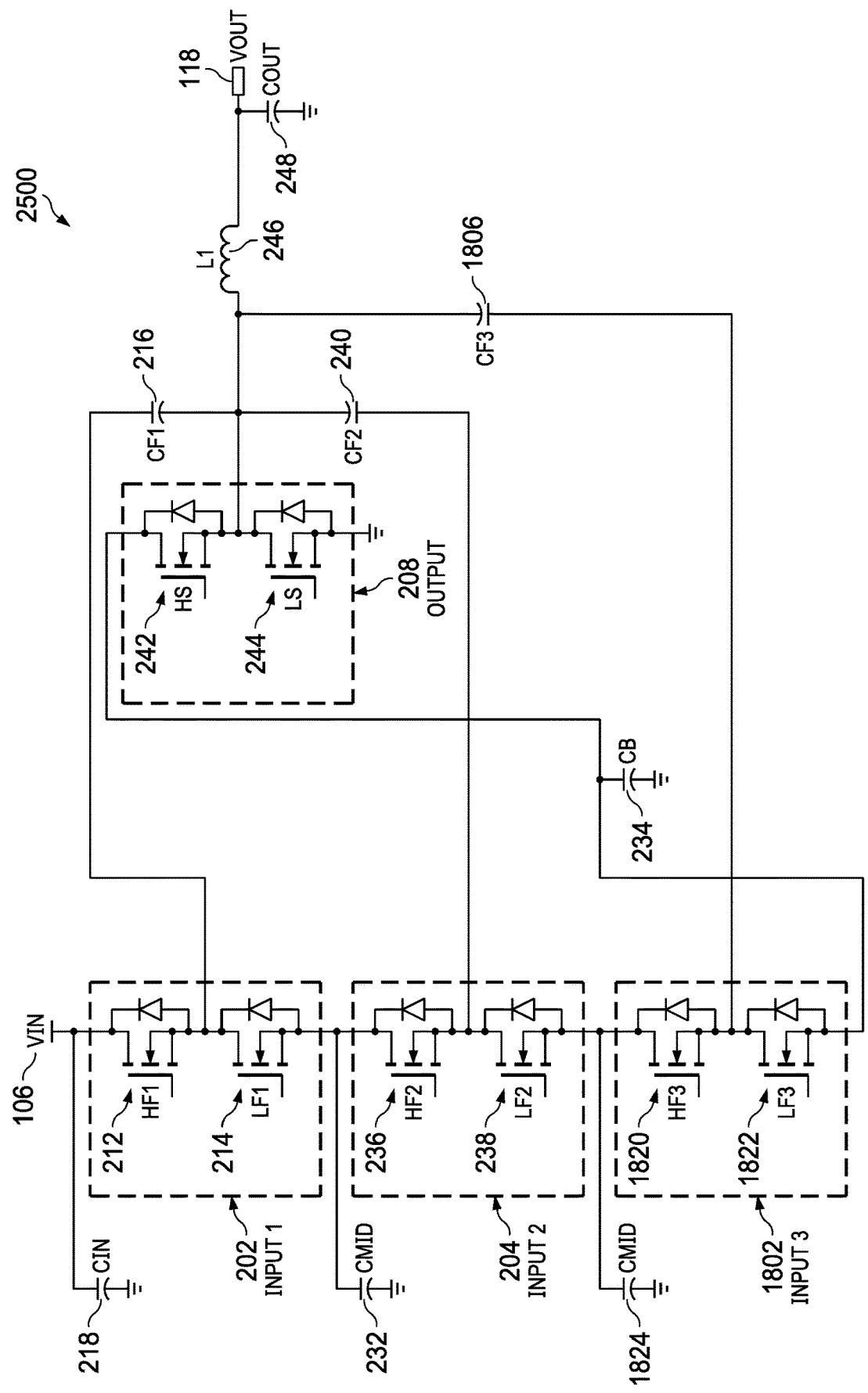

FIG. 25 is an example SCIB circuit 2500 as described in present implementations herein. Particularly, the SCIB circuit 2500, which is a variant of the SCIB circuit 2400, does not include DC shift switch circuit 206 between the series connected first input switch circuit 202 and second input switch circuit 204. Furthermore, the SCIB circuit 2100 does not include DC shift switch circuit 1804 between the series connected second input switch circuit 204 and third input switch circuit 1802.

In an embodiment, the DC shift switch circuits 206 and 1804 are removed to generate a variant circuit with less number of components. This embodiment does not compromise voltage and current variants. Reduced number of components can also be realized. In this embodiment, the one end of the low-side switch LF1 214 of the first input switch circuit 202 is connected to the CMID1 232 and one end of the high-side switch HF2 236 of the second input switch circuit 204. The common node of the high-side switch HF2 236 and the low-side switch LF2 238 of the second input circuit 204 is connected to the capacitor CF2 240. The low-side switch LF2 238 of the second input switch circuit 204 is connected to common node between CMID2 1824 and the high-side switch HF3 1820 of the third input switch circuit 1802. The common node between HF3 1820 and LF3 1822 is connected to CF3 1806.

In the embodiment above, even with the removal of the DC shift switch circuits 206 and 1804, the CMID1 232, the CMID2 1824, the CF1 216, the CF2 240, the CF3 1806, and the CB 234 can inherently charge balance. The values of the other components can be varied due to absence of the DC shift switch circuits 206 and 1804, and the SCIB circuit 2500 can generate a step down ratio of Vin/Vout=6/D with a single output phase and a single regulated IBV output.

Figure 26A:
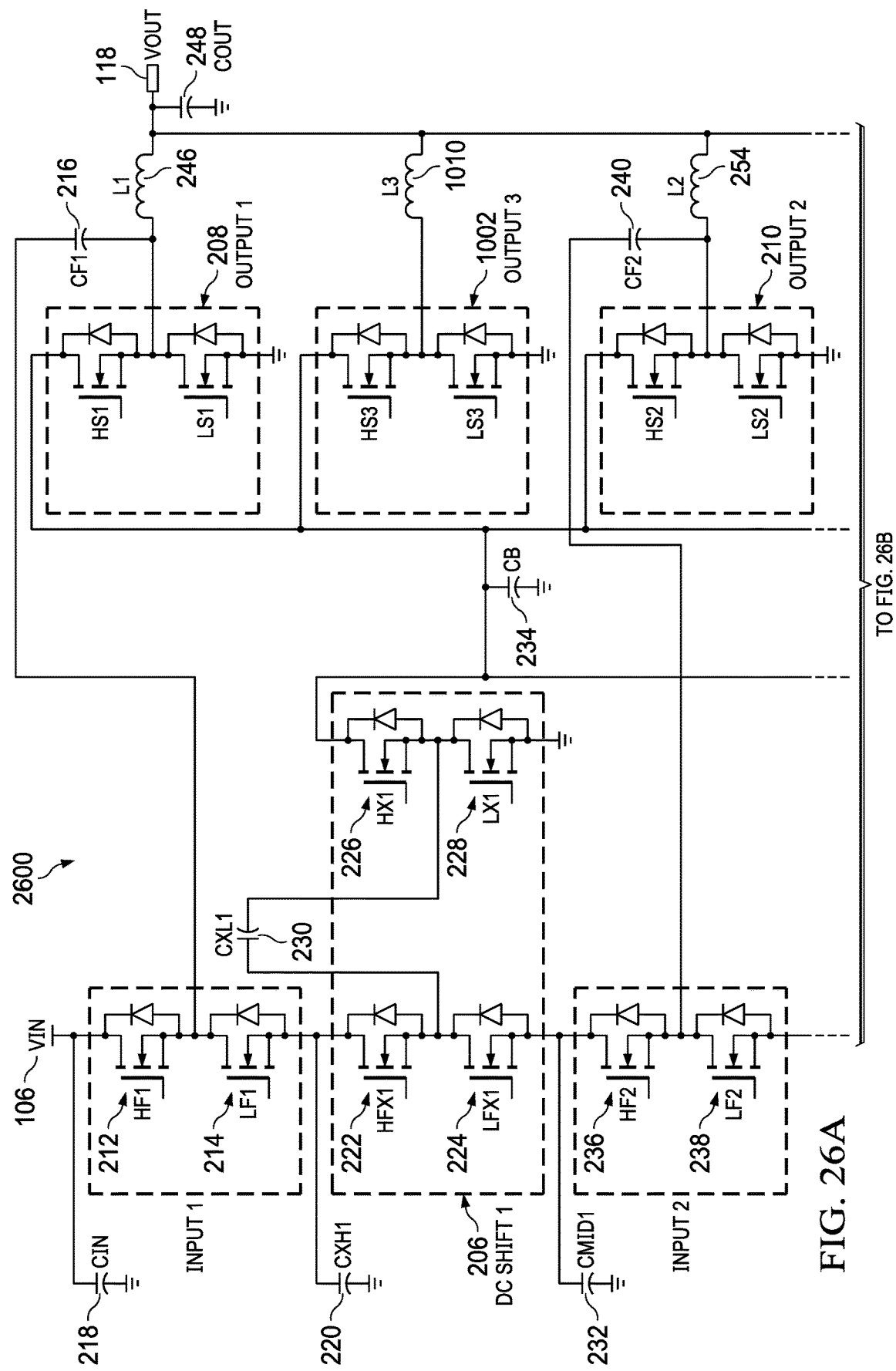
Figure 26B:
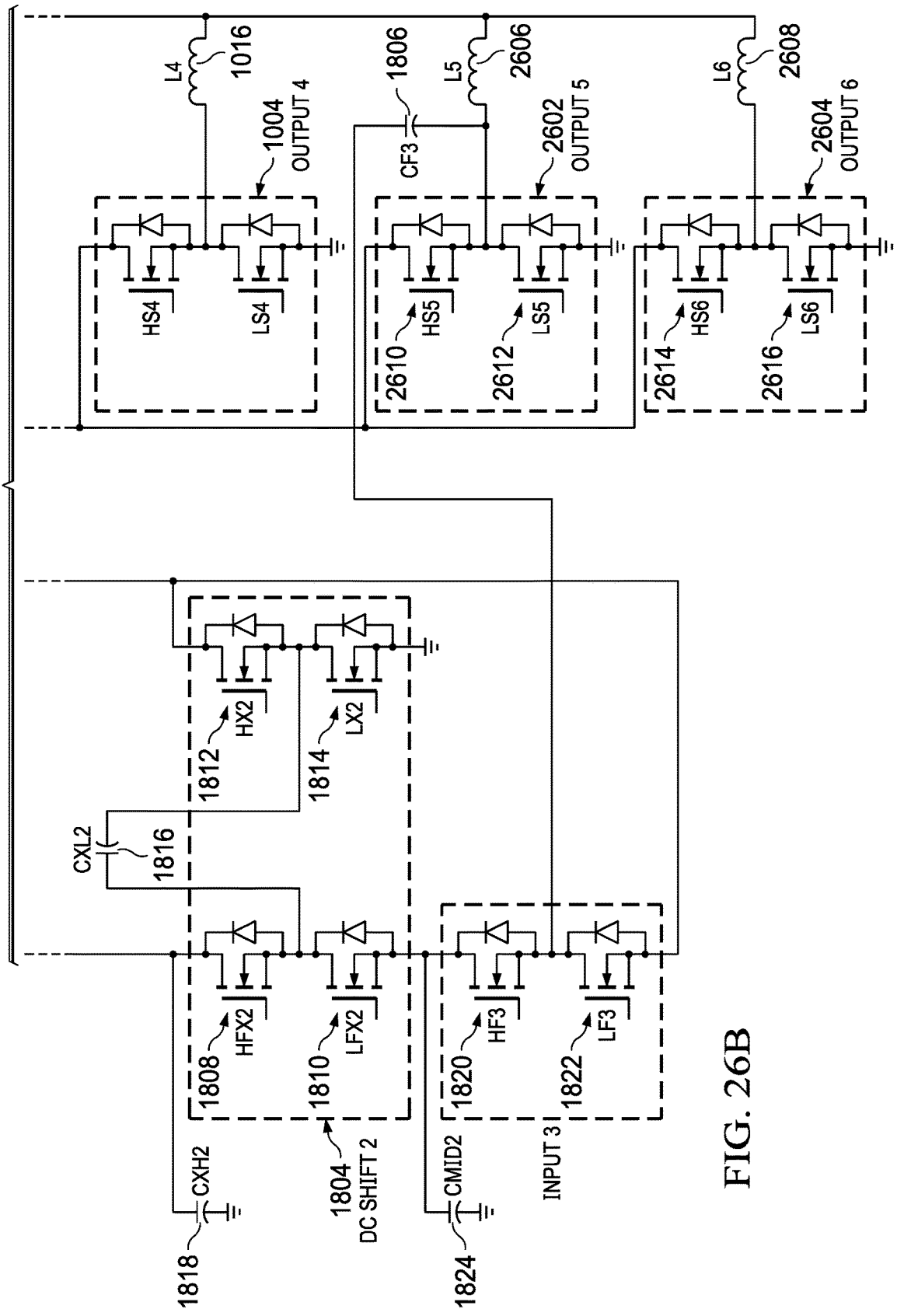

FIG. 26 is an example SCIB circuit 2600 as described in present implementations herein. Particularly, the SCIB circuit 2600 includes three input switch circuits and six output switch circuits to generate six output phases. As shown, a fifth output circuit 2602 and a sixth output circuit 2604 are added. Furthermore, parallel inductors L5 2606 and L6 2608 are added at the LC circuit output to generate the IBV 118.

The fifth output circuit 2602 includes a high-side switch HS5 2610 and a low-side switch LS5 2612 where a common node between the high-side switch HS5 2610 and low-side switch LS5 2612 is connected to the inductor L5 2606. The sixth output circuit 2604 further includes a high-side switch HS6 2614 and a low-side switch LS6 2616 where a common node between the high-side switch HS6 2614 and low-side switch LS6 2616 is connected to the inductor L6 2608. One end of the high-side switch HS6 2614 is connected to the CB 234 and in parallel to the high-side switches of the output circuits 208, 1002, 210, 1004, and 2602.

In an embodiment, the step down ratio of the SCIB circuit 2600 is Vin/Vout=6/D with six output phases at IBV 118. In this embodiment, the low-side switches LF1 214, LF2 224, and LF3 1822 of the series connected input switch circuits, and the low-side switches LS1 244, LS2 252 and LS5 2612 of the output switch circuits are turned ON and the CF1 216, CF2 240, CF3 1806, and the CB 234 charge balance. In this case, the SCIB circuit 2600 can generate one/two/three/four/ five/six independent and regulated predetermined output value of about 0.5-15 volts.

Figure 27A:
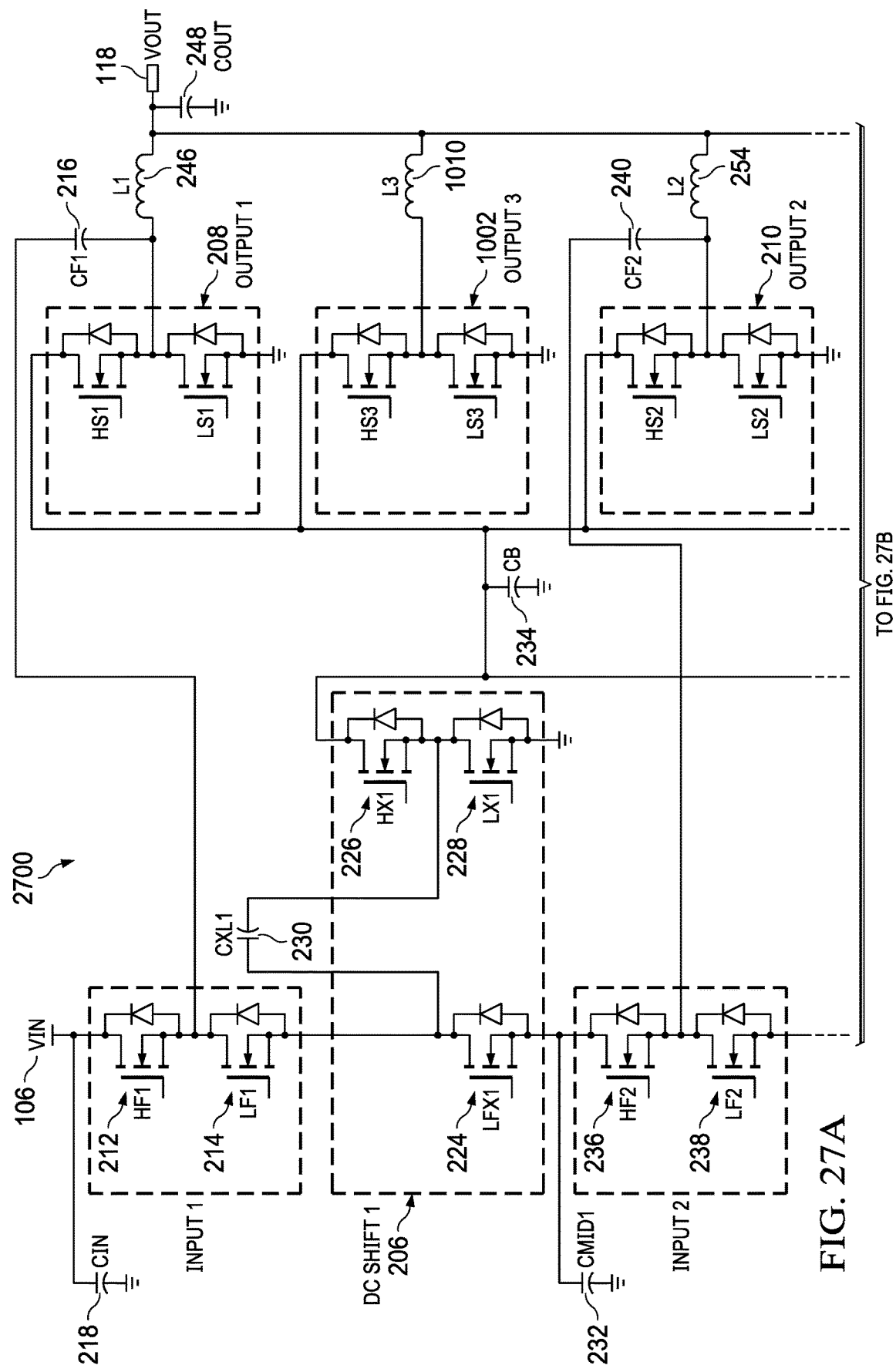
FIGS. 27A, 27B, 28A, 28B, 29A and 29B are block diagrams of example variations of a scalable switched capacitor integrated buck (SCIB) circuit of example FIG. 26 as described in present implementations herein.
Figure 27B:
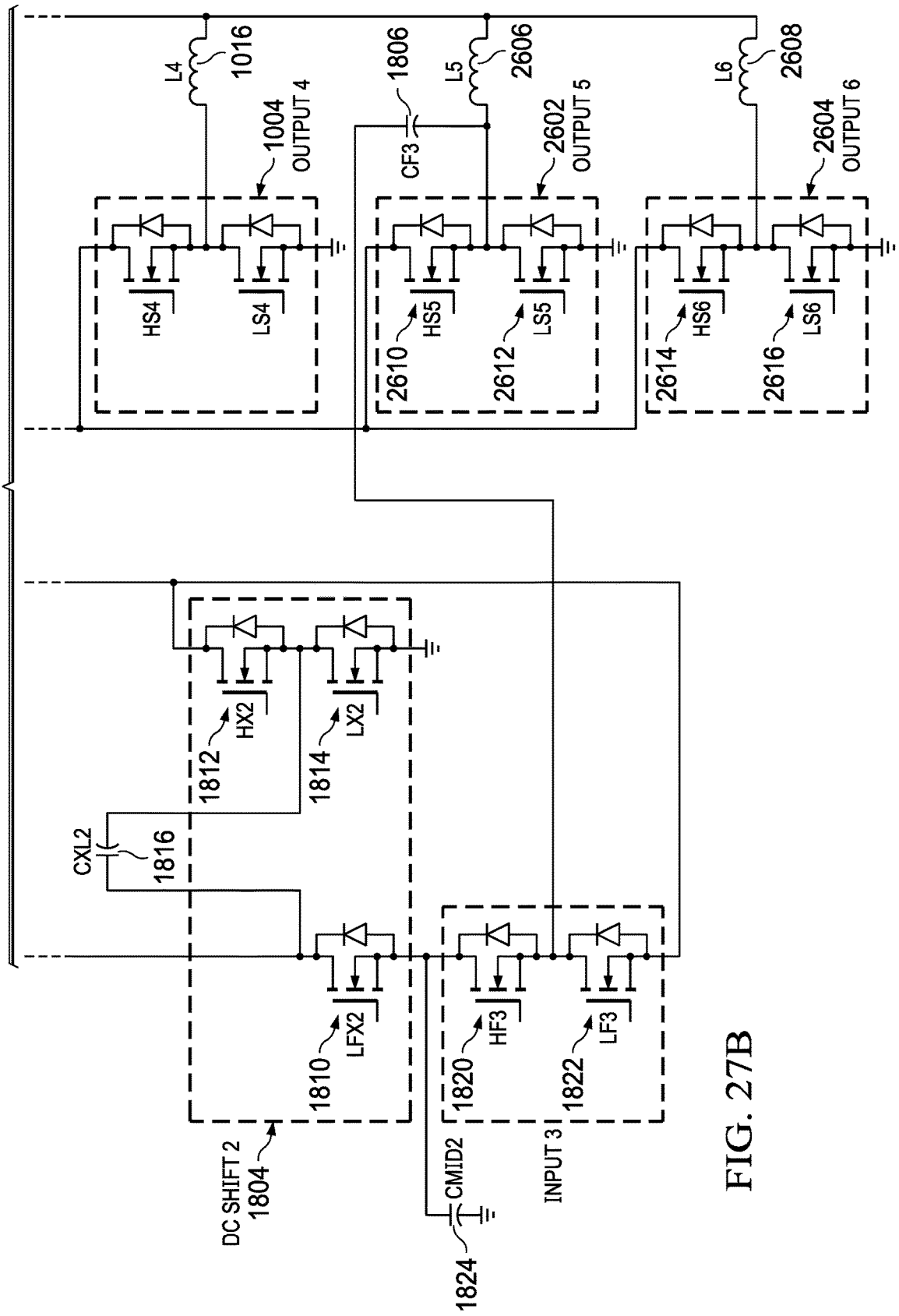

FIG. 27 is an example SCIB circuit 2700 as described in present implementations herein. Particularly, the SCIB circuit 2700, which is a variant of the SCIB circuit 2600, includes modified first DC shift switch circuit 206 to generate a variant on the DC shift switch circuit between the first input switch circuit 202 that is connected in series with the second input switch circuit 204 of FIG. 2600.

Furthermore, the second DC shift switch circuit 1804 is modified to generate a variant on the DC shift switch circuit between the second input switch circuit 204 that is connected in series with the third input switch circuit 1802. The SCIB circuit 2700 generates generate a step down ratio of Vin/Vout=6/D with one/two/three/four/five/six output phases and one/two/three/four/five/six independent and regulated IBV outputs.

Referencing the SCIB 2600 of FIG. 26, the CXH1 220, HFX1 222, CXH2 1818, and HFX2 1808 are removed to generate a variant SCIB circuit 2700 with less number of components. This embodiment does not compromise voltage and current variants. Reduced number of components can also be realized. In this embodiment, the one end of the low-side switch LF2 238 of the second input switch circuit 204 is connected to the CXL2 1816 and one end of the floating low-side switch LFX2 1810 of the second DC shift switch circuit 1804. The common node of the high-side switch HX2 1812 and the low-side switch LX2 1814 of the second DC shift switch circuit 1804 is connected to the CXL2 1816.

In this embodiment, with the removal of the CXH1 220, HFX1 222, CXH2 1818, and HFX2 1808, the CXL1 230, CXL2 1816, CMID1 232, CMID2 1824, and the CB 234 can inherently charge balance when the low-side switches LX1 228 and LX2 1814 and the floating low-side switches LFX1 224 and LFX2 1810 of the DC shift switch circuits 206 and 1804 are turned ON. Other capacitors can inherently charge balance. The values of the other components can be varied due to absence of the CXH1 220, HFX1 222, CXH2 1818, and HFX2 1808, and the SCIB circuit 2700 can generate a step down ratio of Vin/Vout=6/D with one/two/three/four/five/six output phases and one/two/three/four/five/six independent and regulated IBV outputs.

Figure 28A:
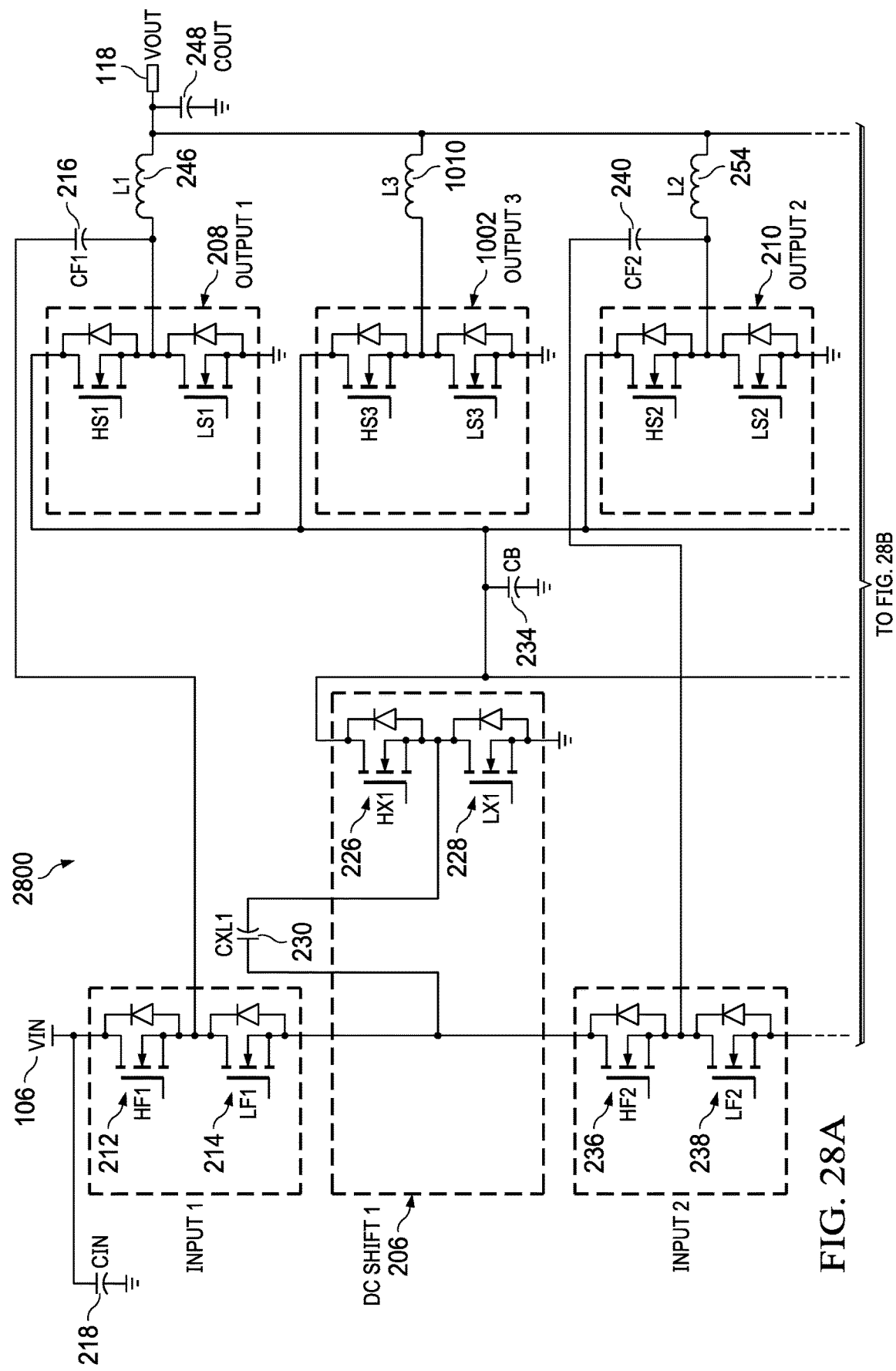
Figure 28B:
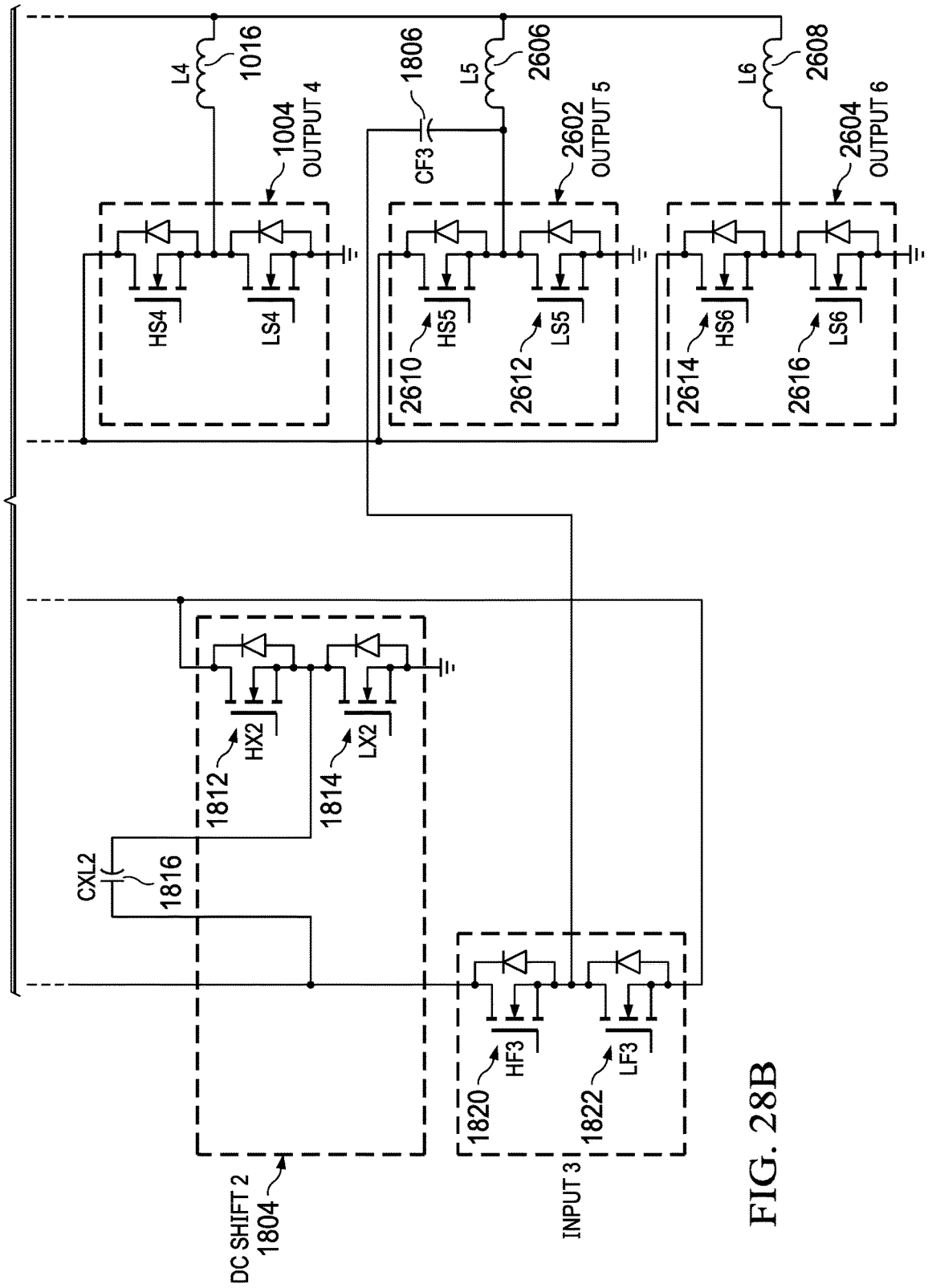

FIG. 28 is an example SCIB circuit 2800 as described in present implementations herein. Particularly, the SCIB circuit 2800, which is a variant of the SCIB circuit 2700, does not include the low-side switch LFX1 224, CMID1 232, LFX2 1810, and CMID2 1824 to generate the variant SCIB 2700 circuit with less number of components. This embodiment does not compromise voltage and current variants. Reduced number of components can also be realized. In this embodiment, the one end of the high-side switch HF2 236 of the second input switch circuit 204 is connected directly to the CXL1 230 and LF1 214. The common node of the high-side switch HF3 1820 (of third input circuit 1802) and the low-side switch LF2 238 (of second input circuit 204) is connected to the CXL2 1816. In this embodiment, with the removal of the LFX1 224, CMID1 232, LFX2 1810, and CMID2 1824, the CXL1 230, CXL2 1816, and CB 234 can inherently charge balance when the low-side switch LX1 228 of the first DC shift switch circuit 206 and the low-side switch LX2 1814 of the second DC shift switch circuit 1804 are turned ON. Other capacitors can inherently charge balance. The values of the other components can be varied due to absence of the LFX1 224, CMID1 232, LFX2 1810, and CMID2 1824, and the SCIB circuit 2400 can generate a step down ratio of Vin/Vout=6/D with one/two/three/four/five/six output phases and one/two/three/four/five/six independent and regulated IBV outputs.

Figure 29A:
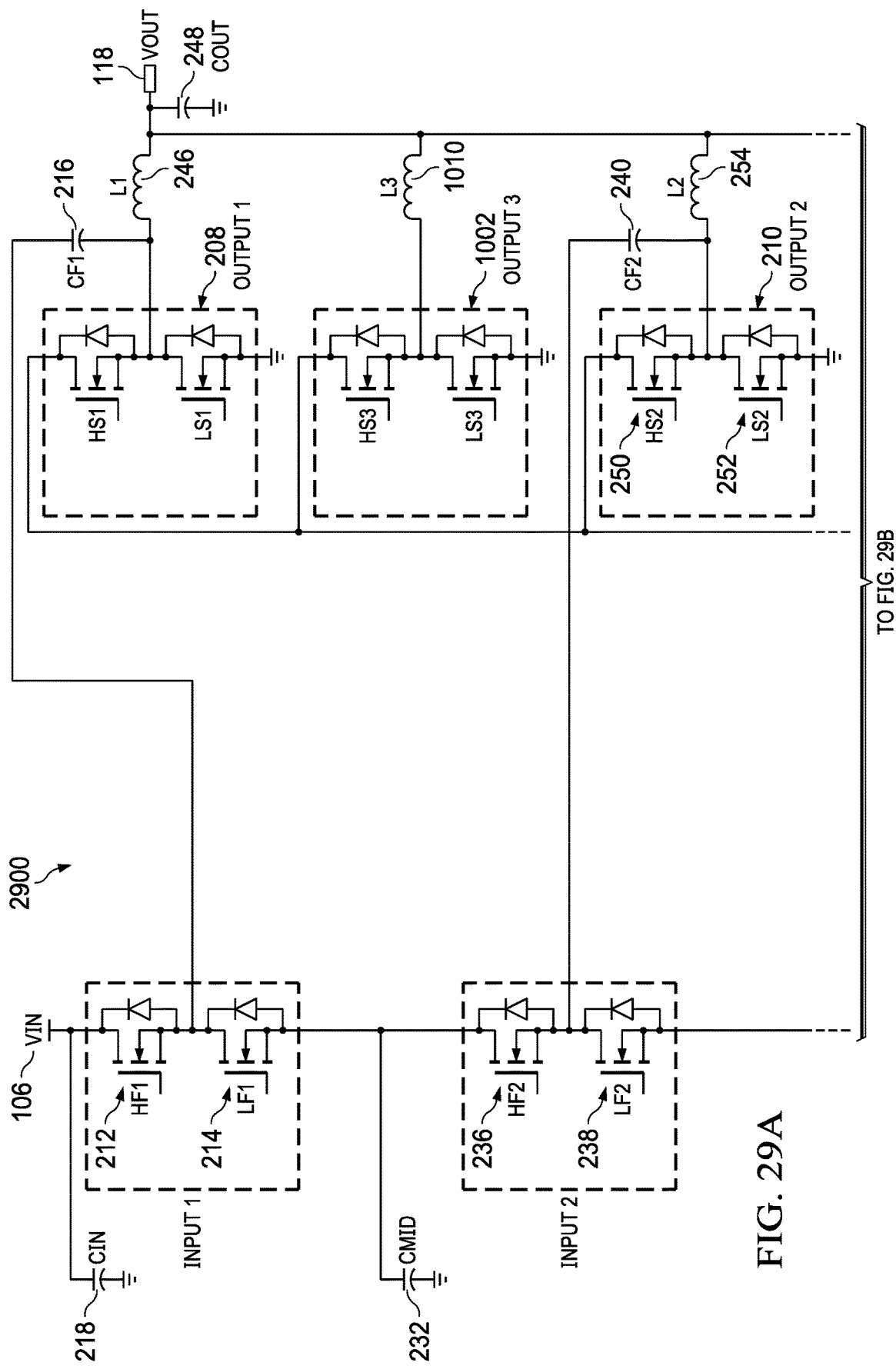
Figure 29B:
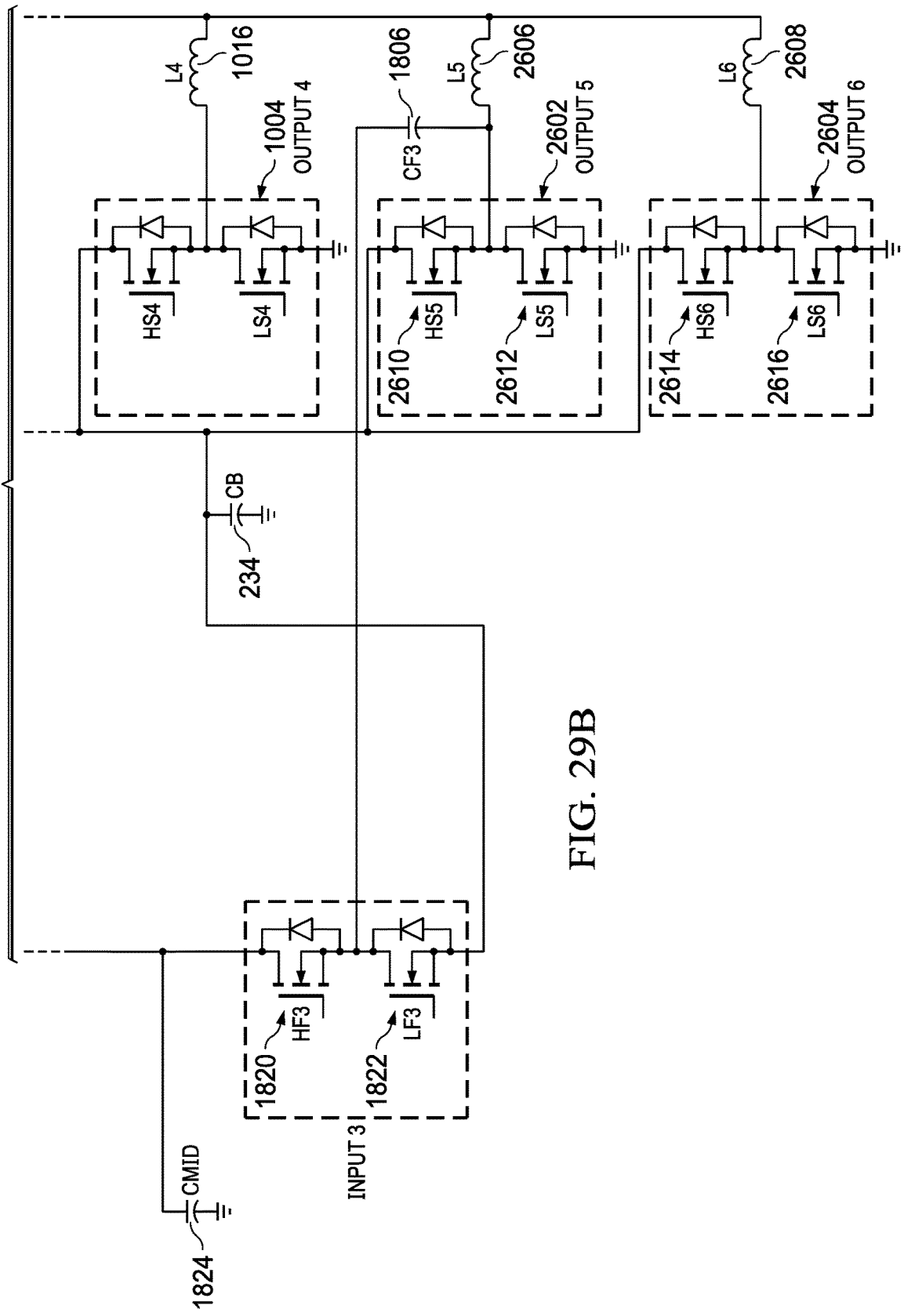

FIG. 29 is an example SCIB circuit 2900 as described in present implementations herein. Particularly, the SCIB circuit 2500, which is a variant of the SCIB circuit 2800, does not include DC shift switch circuit 206 between the series connected first input switch circuit 202 and second input switch circuit 204. Furthermore, the SCIB circuit 2900 does not include DC shift switch circuit 1804 between the series connected second input switch circuit 204 and third input switch circuit 1802.

In an embodiment, the DC shift switch circuits 206 and 1804 are removed to generate a variant circuit with less number of components. This embodiment does not compromise voltage and current variants. Reduced number of components can also be realized. In this embodiment, the one end of the low-side switch LF1 214 of the first input switch circuit 202 is connected to the CMID1 232 and one end of the high-side switch HF2 236 of the second input switch circuit 204. The common node of the high-side switch HF2 236 and the low-side switch LF2 238 of the second input circuit 204 is connected to the capacitor CF2 240. The LF2 238 is connected to a common node between CMID2 1824 and HF3 1820. The common node between HF3 1820 and LF3 1822 is connected to CF3 1806.

In the embodiment above, even with the removal of the DC shift switch circuits 206 and 1804, the CMID1 232, the CMID2 1824, the CF1 216, the CF2 240, the CF3 1806, and the CB 234 can inherently charge balance. The values of the other components can be varied due to absence of the DC shift switch circuits 206 and 1804, and the SCIB circuit 2500 can generate a step down ratio of Vin/Vout=6/D with one/two/three/four/five/six output phases and one/two/three/four/five/six independent and regulated IBV outputs.

Figure 30A:
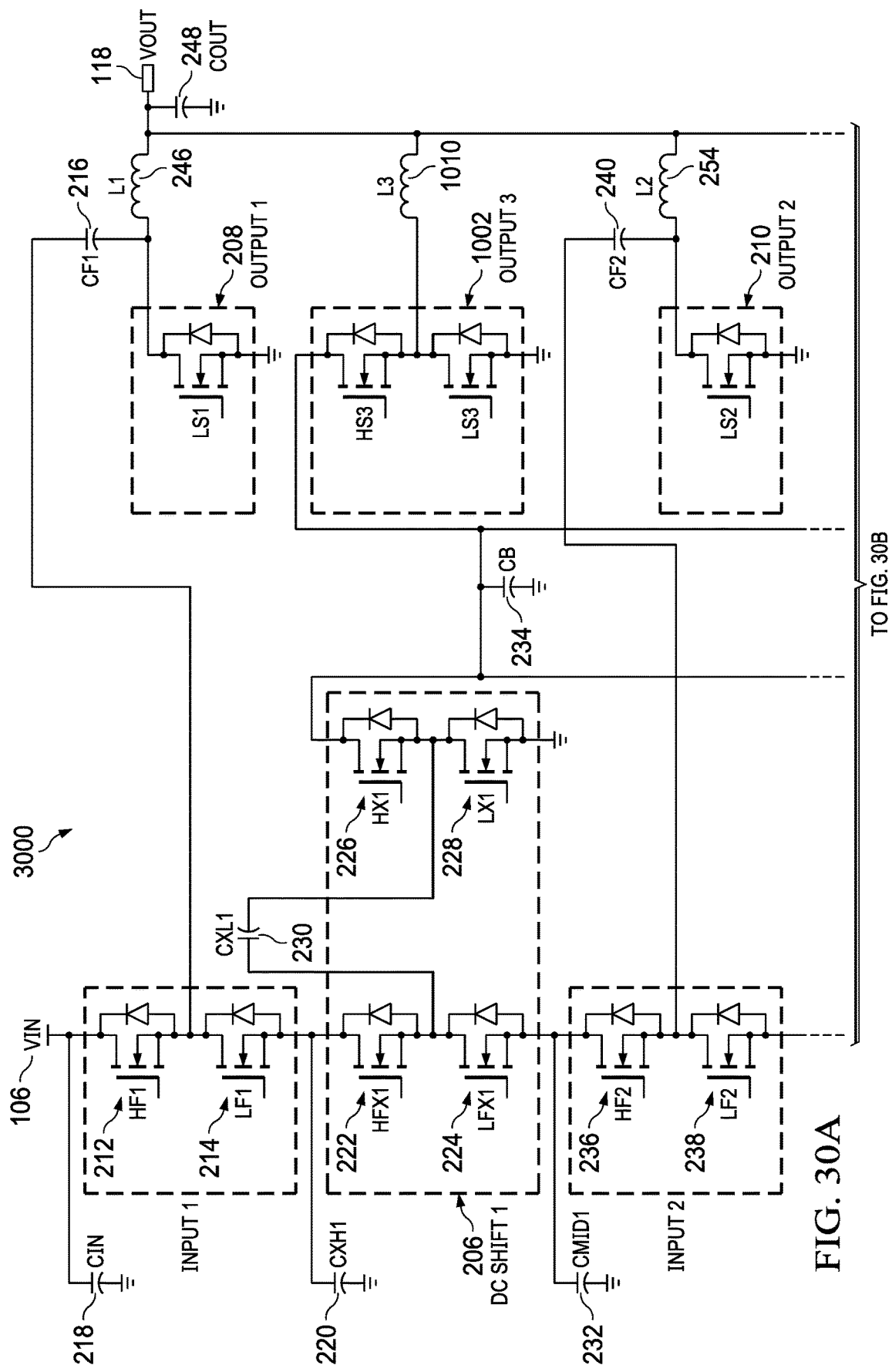
Figure 30B:
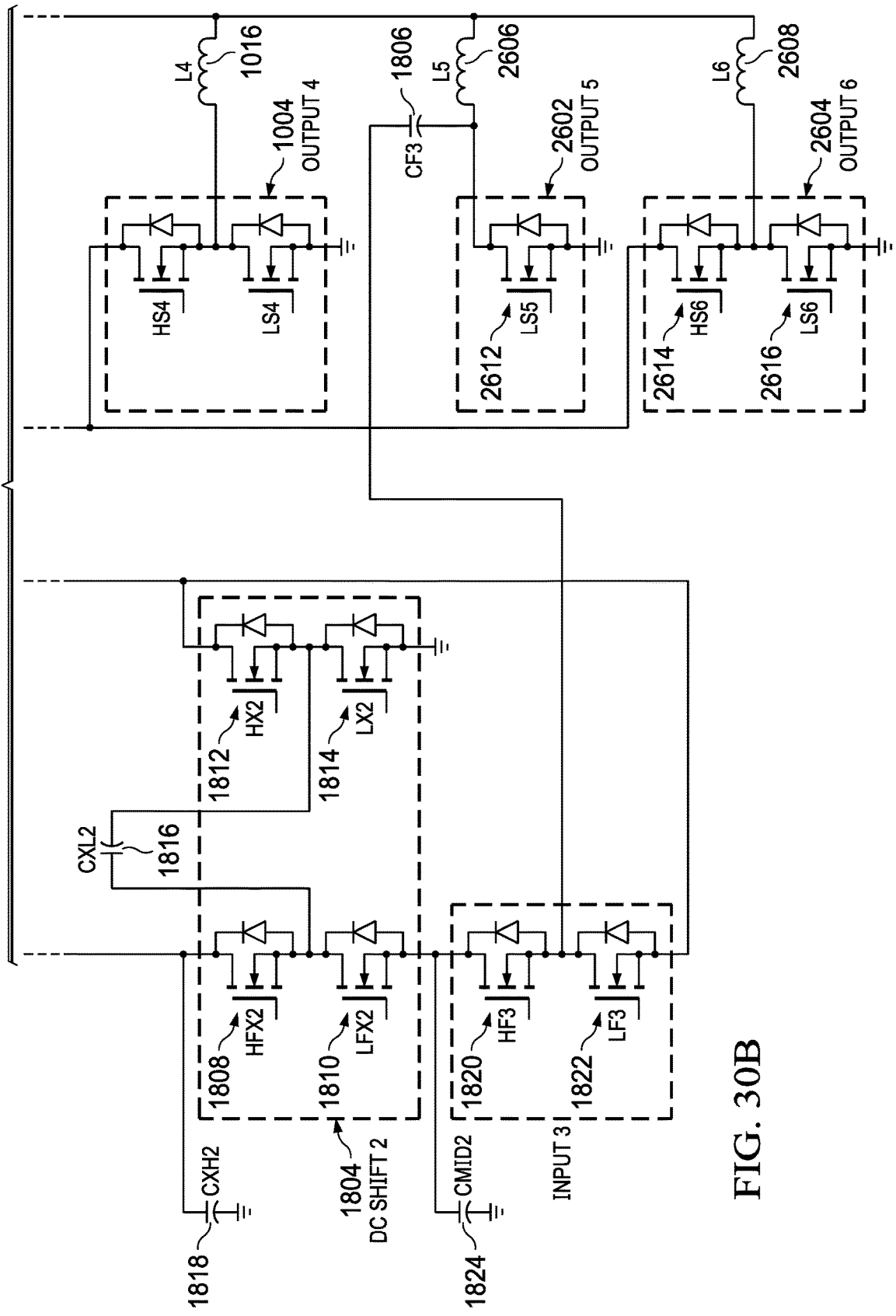

FIG. 30 is an example SCIB circuit 3000 as described in present implementations herein. Particularly, the SCIB circuit 3000 is similar to the SCIB circuit 2600; however, the high-side switch HS1 242 of the first output circuit 208, the high-side switch HS2 250 of the second output circuit 210, and the high-side switch HS5 2016 of the fifth output circuit 2602 are removed from the SCIB circuit 2600 to form the SCIB 3000 that generates six output phases from the six parallel output switch circuits 208, 210, 1002, 1004, 2602, and 2604.

As shown, when the high-side switch HS1 242 of the first output circuit 208 is removed from the SCIB circuit 2600, one end of the low-side switch LS1 244 of the first output circuit 208 is connected to the common node between the CF1 216 and the inductor L1 246. The other end of the low-side switch LS1 244 of the first output circuit 208 is connected to ground.

On the other hand, when the high-side switch HS2 250 of the second output circuit 210 is removed from the SCIB circuit 2600, one end of the low-side switch LS2 252 of the second output circuit 210 is connected to the common node between the CF2 240 and the inductor L2 254. The other end of the low-side switch LS2 252 of the second output circuit 210 is connected to ground. A similar case applies to the fifth output circuit 2602 when the high-side switch HS5 2610 is removed from the circuit.

In an embodiment, the inductors L1 246, L2 254, L3 1010, L4 1016, L5 2606 and L6 2608 are connected in parallel and are configured to operate on six different phases to provide a regulated IBV 118. For example, the six different phases including a first phase, a second phase, a third phase, a fourth phase, a fifth phase, and a sixth phase are interleaved with each other and controlled by six PWM pulses that have time differences in between equal to one-sixth of pulse cycle Ts. Furthermore, the SCIB circuit 3000 can be configured to operate on five output phases by removing one of six inductors; four output phases by removing two of six inductors; three output phases by removing three of six inductors; two output phases by removing four of six inductors; one output phase by removing five of six inductors. With the removal of the inductor, voltage and current variants are not compromised. Reduced number of components can also be realized.

Figure 31A:
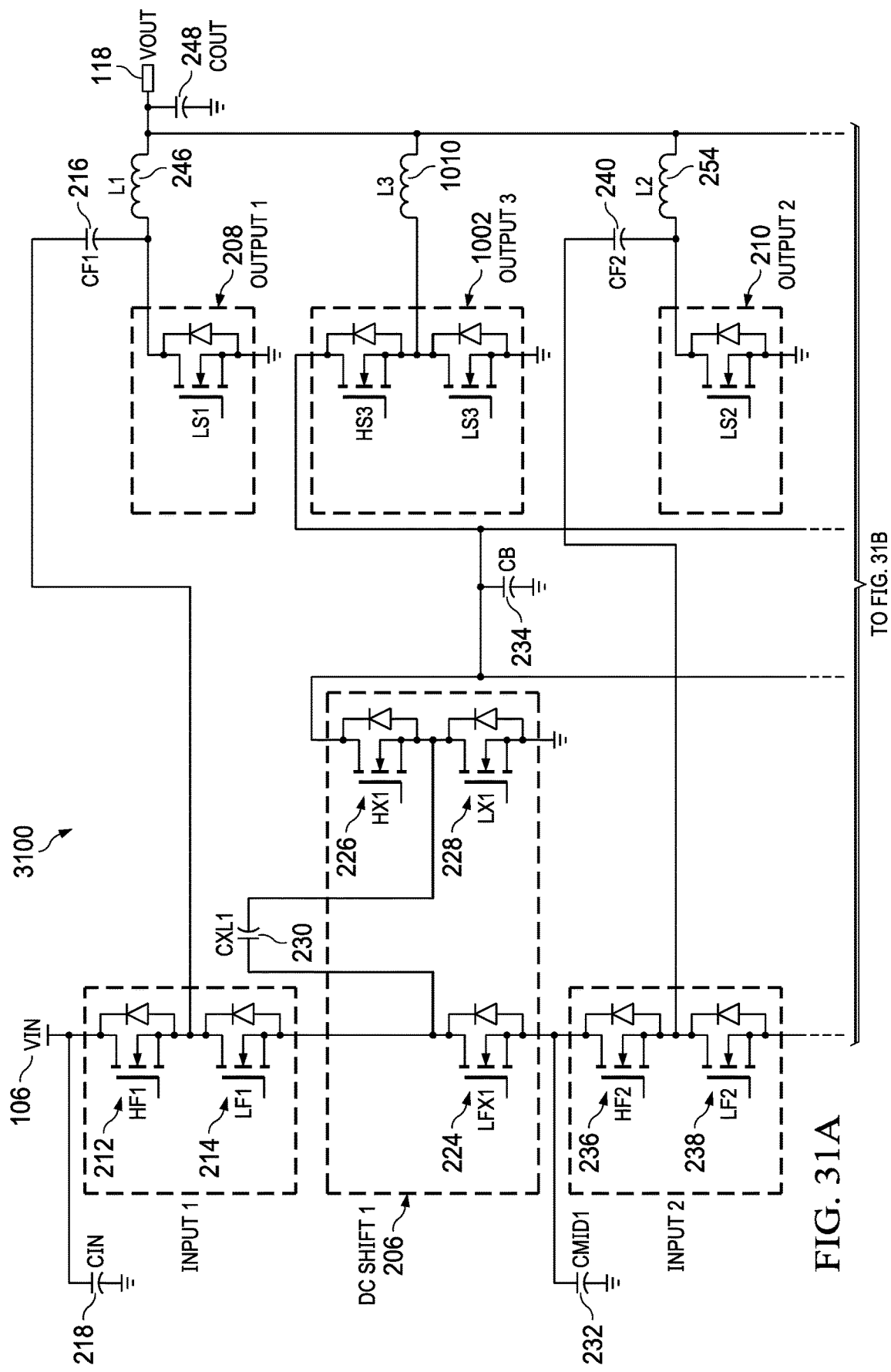
FIGS. 31A, 31B, 32A, 32B, 33A and 33B are block diagrams of example variations of a scalable switched capacitor integrated buck (SCIB) circuit of example FIG. 30 as described in present implementations herein.
Figure 31B:
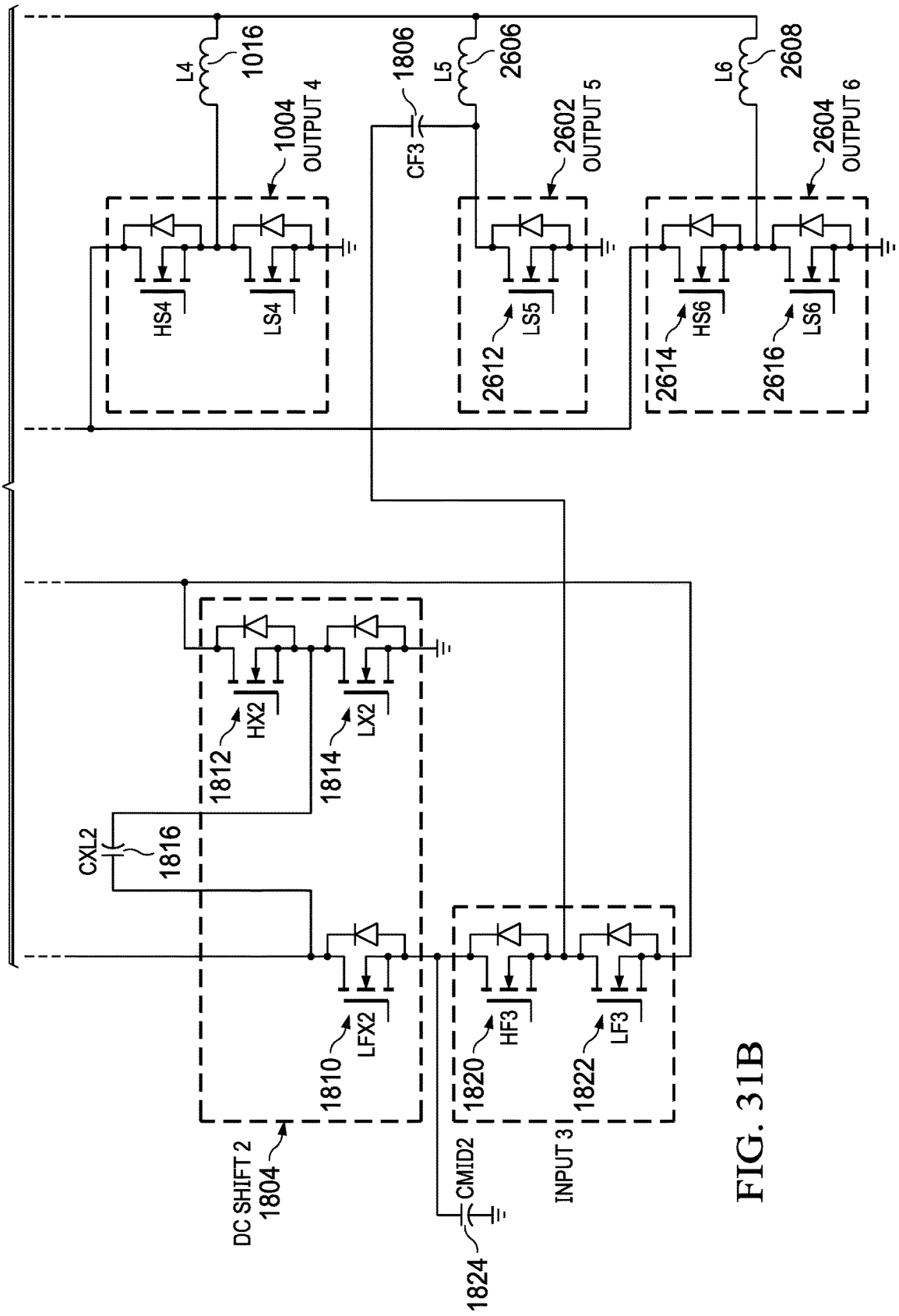

FIG. 31 is an example SCIB circuit 3100 as described in present implementations herein. Particularly, the SCIB circuit 3100, which is a variant of the SCIB circuit 3000, includes modified first DC shift switch circuit 206 to generate a variant on the DC shift circuit between the first input switch circuit 202 that is connected in series with the second input switch circuit 204 of FIG. 3000. Furthermore, the second DC shift switch circuit 1804 is modified to generate a variant on the DC shift switch circuit between the second input switch circuit 204 that is connected in series with the third input switch circuit 1802. The SCIB circuit 3100 generates a step down ratio of Vin/Vout=6/D with one/two/three/four/five/six output phases and one/two/three/four/five/six independent and regulated IBV outputs.

Referencing the SCIB 3000 of FIG. 30, the CXH1 220, HFX1 222, CXH2 1818, and HFX2 1808 are removed to generate a variant SCIB circuit 3100 with less number of components. This embodiment does not compromise voltage and current variants. Reduced number of components can also be realized. In this embodiment, the one end of the low-side switch LF2 238 of the second input switch circuit 204 is now connected to the CXL2 1816 and one end of the floating low-side LFX2 1810 of the second DC shift switch circuit 1804. The common node of the high-side switch HX2 1812 and the low-side switch LX2 1814 of the second DC shift switch circuit 1804 is connected to the CXL2 1816. In this embodiment, with the removal of the CXH1 220, HFX1 222, CXH2 1818, and HFX2 1808, the CXL1 230, CXL2 1816, CMID 232, CMID2 1824, and the CB 234 can inherently charge balance when the low-side switches LX1 228 and LX2 1814 and the floating low-side switches LFX1 224 and LFX2 1810 of the DC shift switch circuits 206 and 1804 are turned ON. Other capacitors can inherently charge balance. The values of the other components can be varied due to absence of the CXH1 220, HFX1 222, CXH2 1818, and HFX2 1808, and the SCIB circuit 3100 can generate a step down ratio of Vin/Vout=6/D with one/two/three/four/five/six output phases and one/two/three/four/five/six independent and regulated IBV outputs.

Figure 32A:
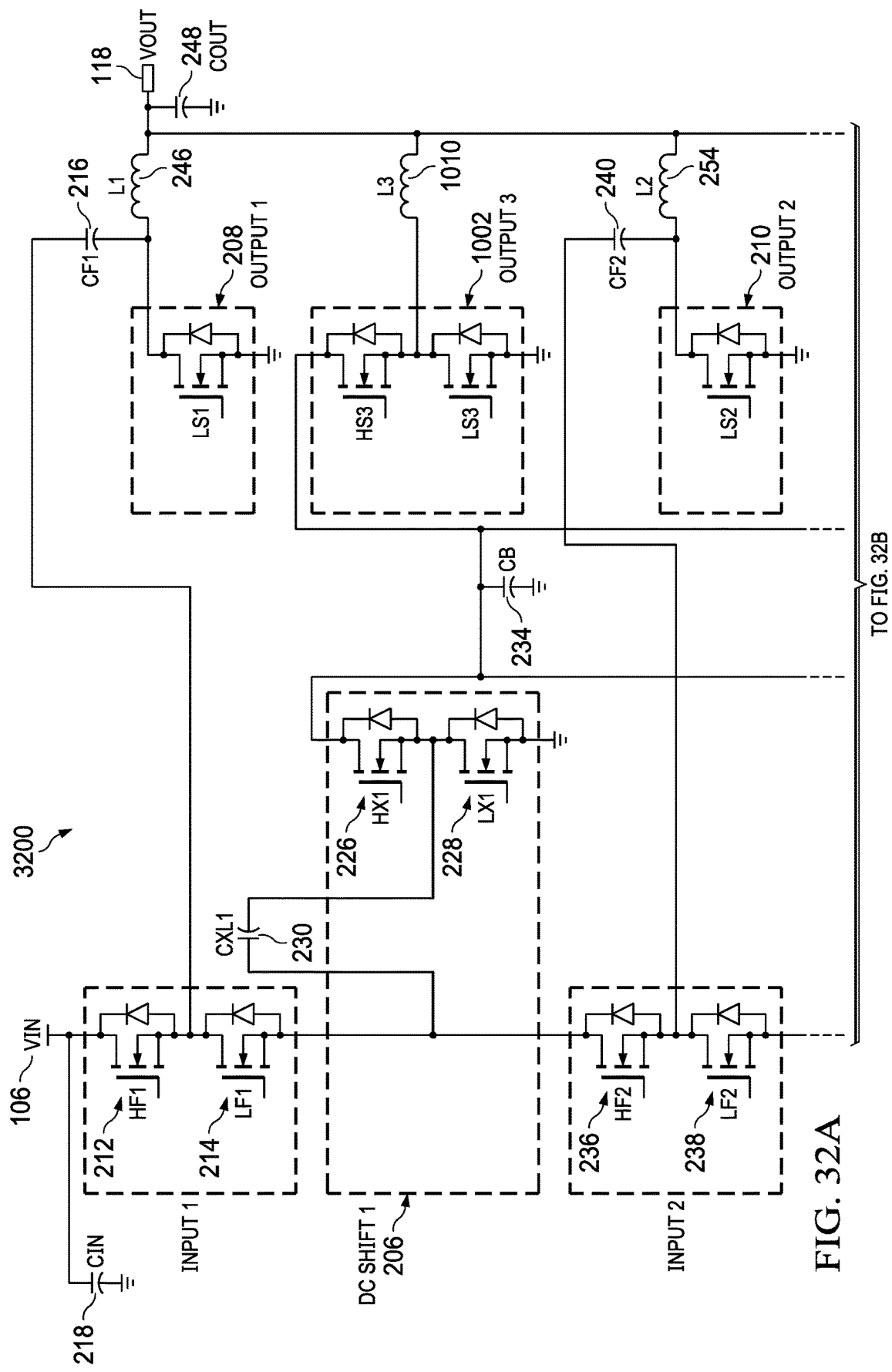
Figure 32B:
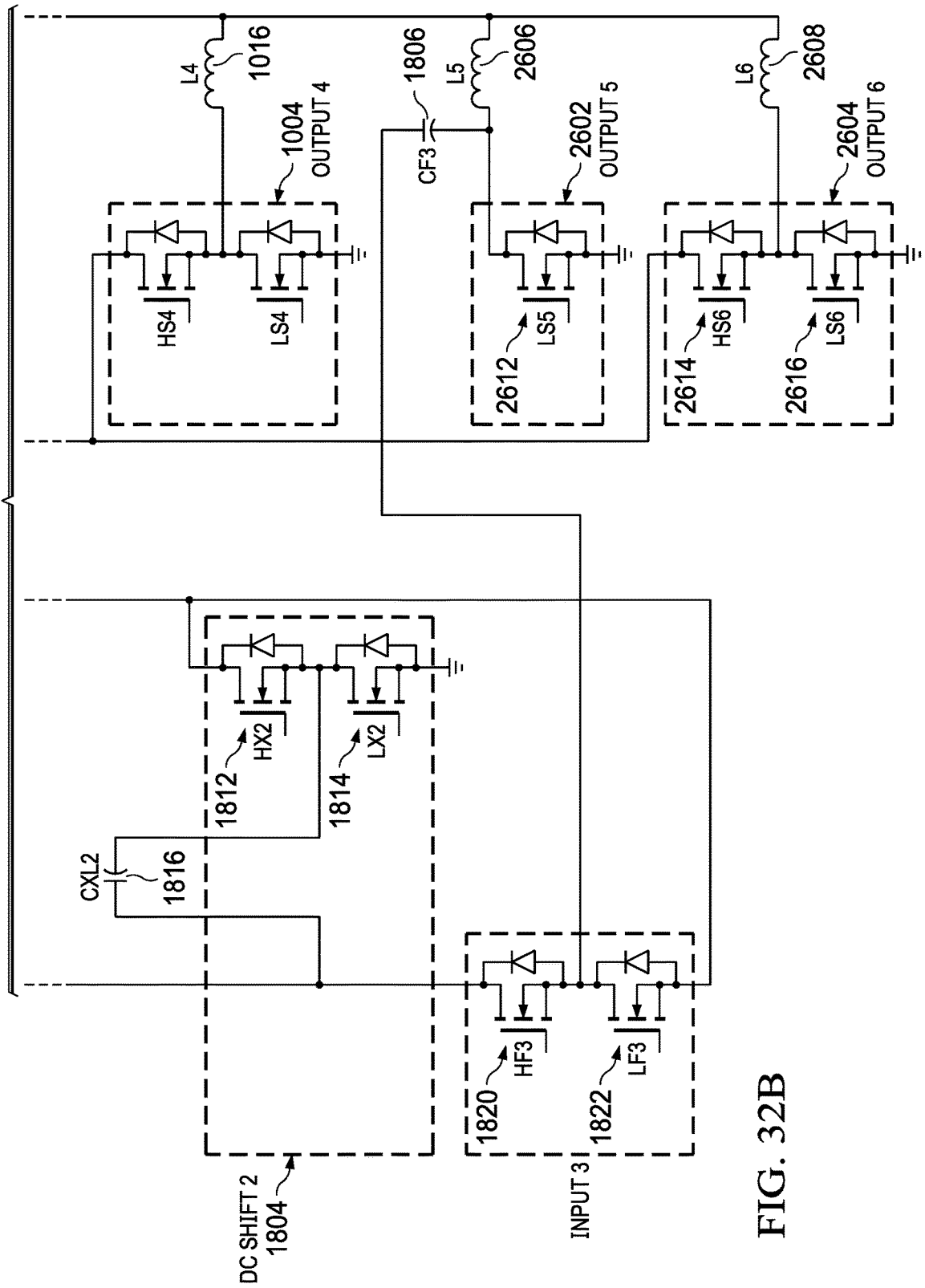

FIG. 32 is an example SCIB circuit 23200 as described in present implementations herein. Particularly, the SCIB circuit 3200, which is a variant of the SCIB circuit 3100, does not include the floating low-side switch LFX1 224, CMID1 232, LFX2 1810, and CMID2 1824 to generate the variant SCIB 3200 circuit with less number of components. In this embodiment, the one end of the high-side switch HF2 236 of the second input switch circuit 204 is connected directly to the CXL1 230 and the low-side switch LF1 214 of the first input switch circuit 202. The common node of the high-side switch HF3 1820 (of the third input circuit 1802) and the low-side switch LF2 238 (of the second input circuit 204) is connected to the CXL2 1816. In this embodiment, with the removal of the LFX1 224, CMID1 232, LFX2 1810, and CMID2 1824, the CXL1 230, CXL2 1816, and CB 234 can still inherently charge balance when the low-side switch LX1 228 of the first DC shift switch circuit 206 and the low-side switch LX2 1814 of the second DC shift switch circuit 1804 are turned ON. Other capacitors can inherently charge balance. The values of the other components can be varied due to absence of the LFX1 224, CMID1 232, LFX2 1810, and CMID2 1824, and the SCIB circuit 3200 can generate a step down ratio of Vin/Vout=6/D with one/two/three/four/five/six output phases and one/two/three/four/five/six independent and regulated IBV outputs.

Figure 33A:
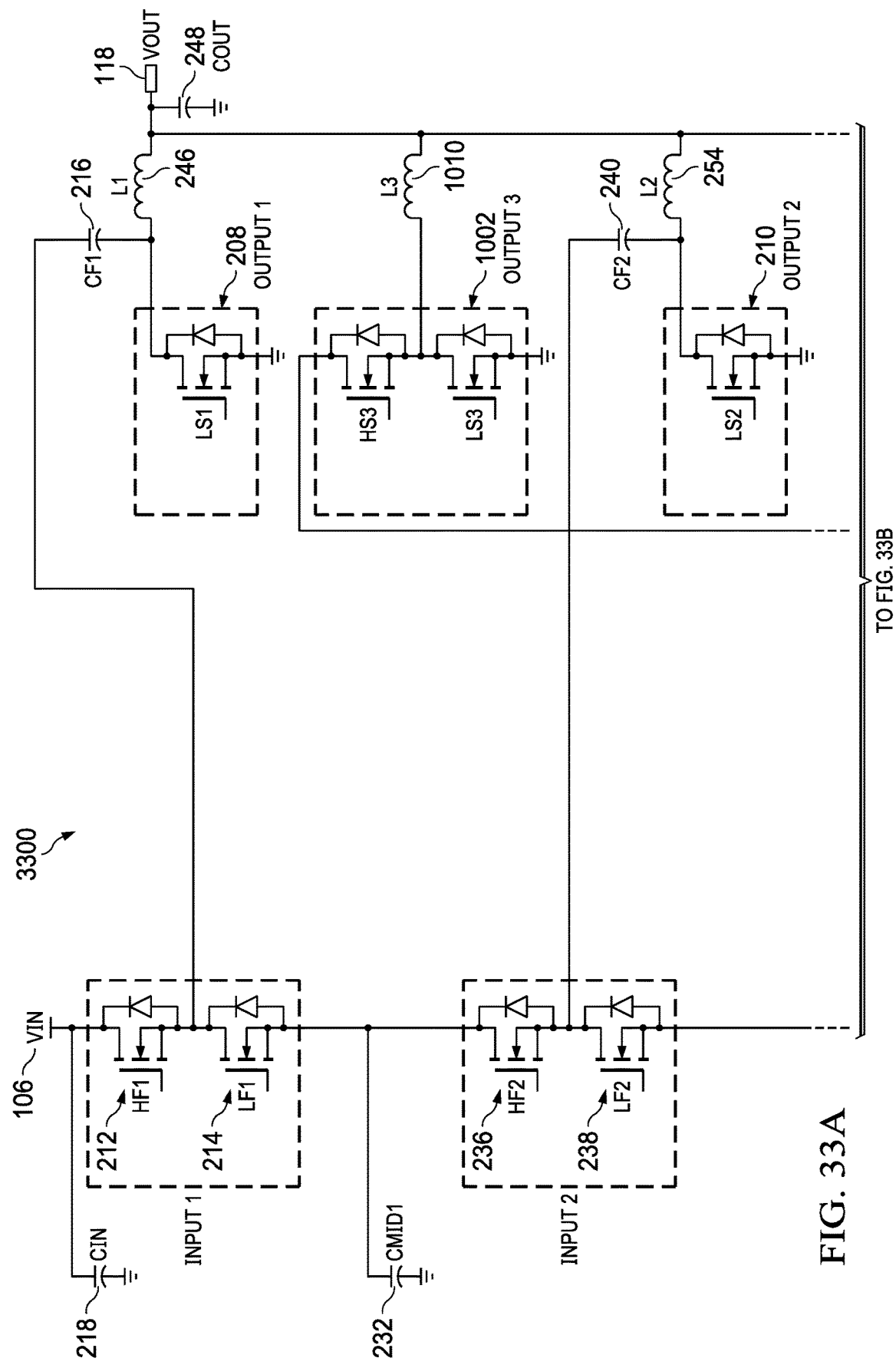
Figure 33B:
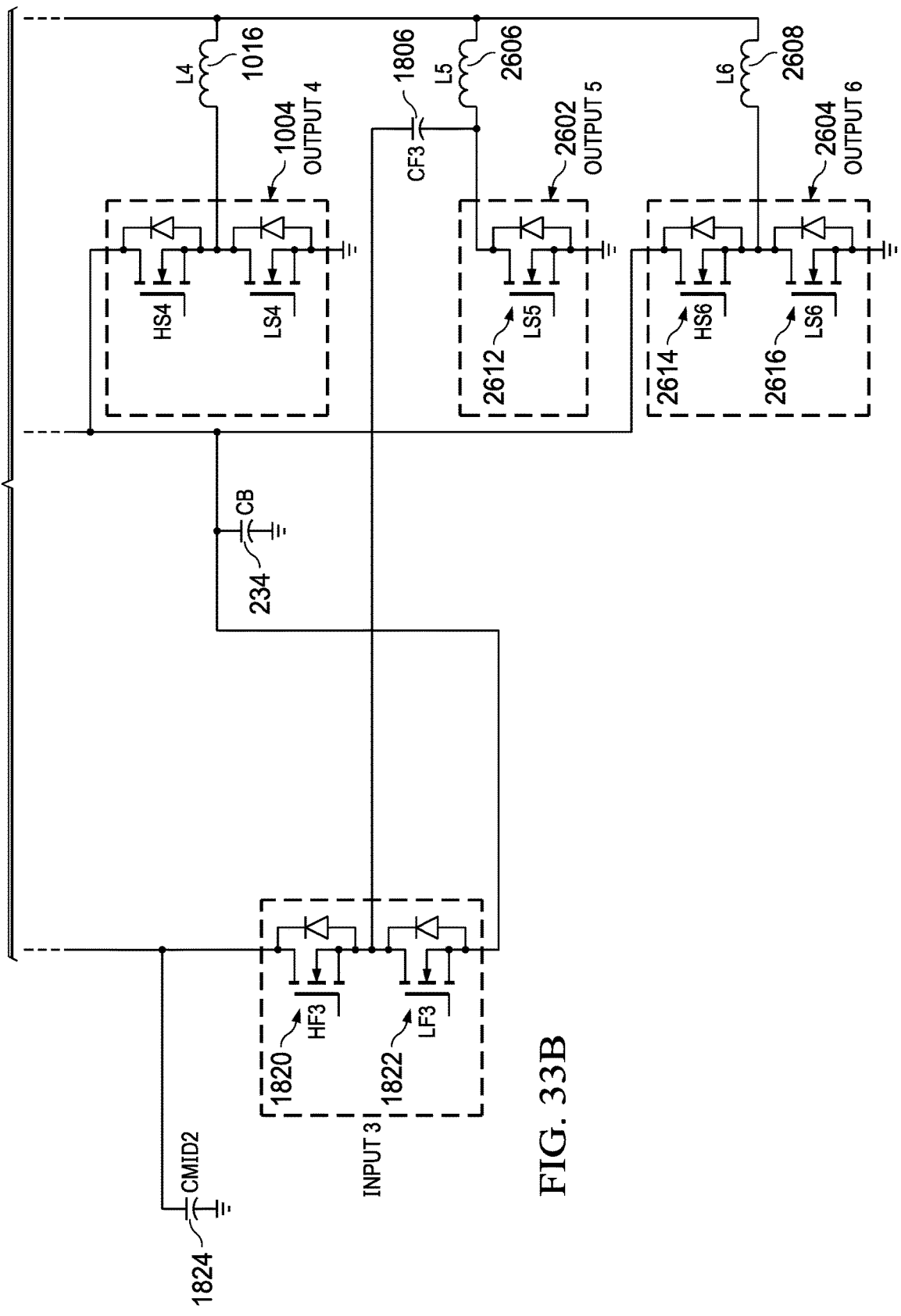

FIG. 33 is an example SCIB circuit 300 as described in present implementations herein. Particularly, the SCIB circuit 3300, which is a variant of the SCIB circuit 3200, does not include DC shift switch circuit 206 between the series connected first input switch circuit 202 and second input switch circuit 204. Furthermore, the SCIB circuit 3300 does not include DC shift switch circuit 1804 between the series connected second input switch circuit 204 and third input switch circuit 1802.

In an embodiment, the DC shift switch circuits 206 and 1804 are removed to generate a variant circuit with less number of components. This embodiment does not compromise voltage and current variants. Reduced number of components can also be realized. In this embodiment, the one end of the low-side switch LF1 214 of the first input switch circuit 202 is connected to the CMID1 232 and one end of the high-side switch HF2 236 of the second input switch circuit 204. The common node of the high-side switch HF2 236 and the low-side switch LF2 238 of the second input circuit 204 is connected to the capacitor CF2 240. The low-side switch LF2 238 of the second input switch circuit 204 is connected to common node between CMID2 1824 and the high-side switch HF3 1820 of the third input switch circuit 1802. The common node between HF3 1820 and LF3 1822 is connected to CF3 1806.

In the embodiment above, with the removal of the DC shift switch circuits 206 and 1804, the CMID1 232, the CMID2 1824, the CF1 216, the CF2 240, the CF3 1806, and the CB 234 can inherently charge balance. The values of the other components can be varied due to absence of the DC shift switch circuits 206 and 1804, and the SCIB circuit 3300 can generate a step down ratio of Vin/Vout=6/D with one/two/three/four/five/six output phases and one/two/three/four/five/six independent and regulated IBV outputs.

Figure 34:
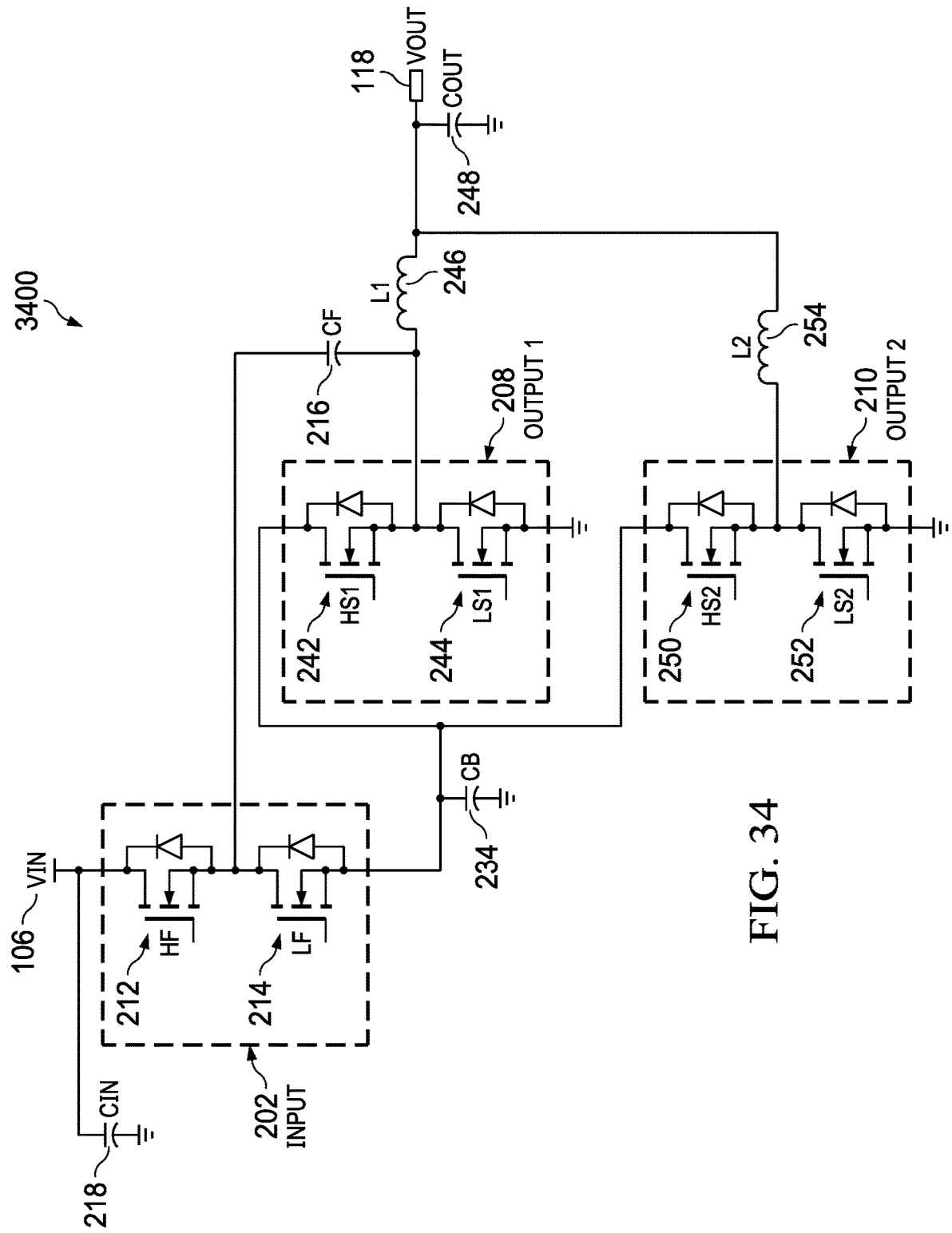

FIG. 34 is an example SCIB circuit 3400 as described in present implementations herein. Particularly, the SCIB circuit 3400 includes a single input switch circuit 202 with no DC shift switch circuit. As shown, the low-side switch LF 214 of the input switch circuit 202 is directly connected to a common node between the CB 234, high-side switch HS1 242 of the first output circuit 208, and the high-side switch HS2 250 of the second output circuit 210. Similarly, the common node between the high-side switch HF 212 and the low-side switch LF 214 of the input switch circuit 202 is connected to the CF 216. In an embodiment, the SCIB circuit 3400 generates a step down ratio of Vin/Vout=2/D with one or two output phases and one or two independent and regulated IBV outputs.

Figure 35:
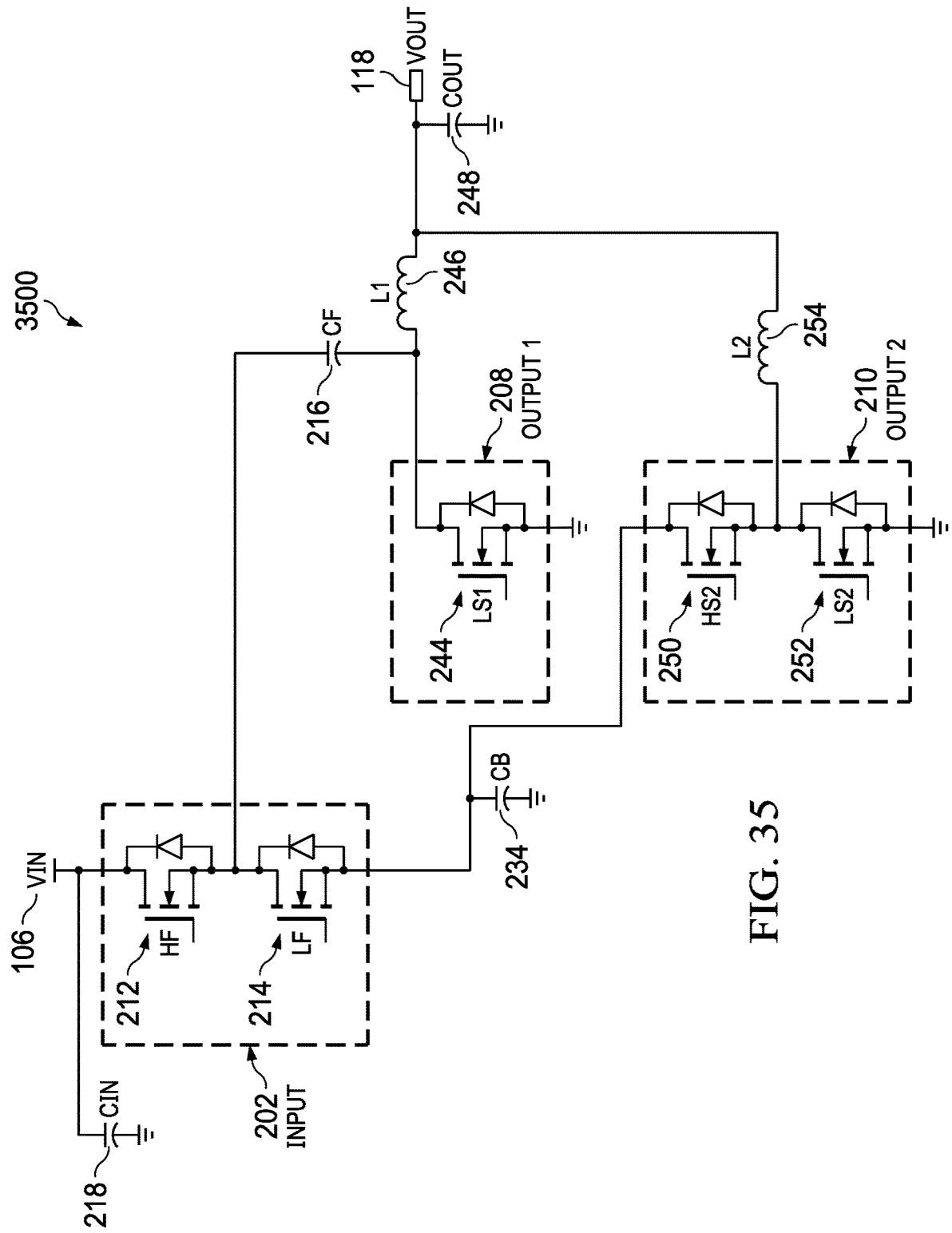
FIG. 35 is a block diagram of example variations of a scalable switched capacitor integrated buck (SCIB) circuit of example FIG. 34 as described in present implementations herein.

FIG. 35 is an example SCIB circuit 3500 as described in present implementations herein. Particularly, the SCIB circuit 3500 is similar to the SCIB circuit 3400; however, in this embodiment, a variant of the SCIB circuit 3400 includes removal of the high-side switch HS1 242 of the first output circuit 208 to generate a variant circuit with less number of components. This embodiment does not compromise voltage and current variants. Reduced number of components can also be realized. When the high-side switch HS1 242 of the first output circuit 208 is removed from the SCIB circuit 3400, one end of the low-side switch LS1 244 of the first output circuit 208 is connected to the common node between the CF 216 and the inductor L1 246. The other end of the low-side switch LS1 244 of the first output circuit 208 is connected to ground. In this embodiment, SCIB circuit 3500 can generate a step down ratio of Vin/Vout=2/D with one or two output phases and one or two independent and regulated IBV outputs.

What is claimed is:

1. A voltage step down dc-dc converter comprising:
   first and second input switch circuits, the first input switch circuit coupled to an input terminal, and the first and second input switch circuits configured to step down an input voltage at the input terminal to a biasing voltage;
   first and second output switch circuits connected in series with the first and second input switch circuits respectively, the first and second output switch circuits comprising respective first and second buck regulator circuits having respective first and second voltage outputs, and the first and second buck regulator circuits configured to regulate the biasing voltage to different output voltages at the first and second voltage outputs; and
   a DC shift switch circuit coupled in series between the first and second input switch circuits, the DC shift switch circuit configured to compensate voltage differences between the first and second input switch circuits.

2. The voltage step down dc-dc converter of claim 1, wherein the first and second buck regulator circuits are configured to regulate the biasing voltage to different output voltages below the input voltage.

3. The voltage step down dc-dc converter of claim 1, wherein the voltage step down dc-dc converter is controlled by a single-phase buck controller or a multi-phase interleaved buck controller.

4. The voltage step down dc-dc converter of claim 1, wherein the input voltage is a voltage from 4 to 60 volts, and the different output voltages are voltages from 0.5 to 15 volts.

5. The voltage step down dc-dc converter of claim 1, wherein each of the first and second input switch circuits comprises:
- a respective high-side switch and a respective low-side switch connected in series;
- wherein the high-side switch is connected to either an input capacitor or a common node of a middle capacitor and another input switch circuit, and
- the low-side switch is connected to either a biasing voltage capacitor or a common node of a middle capacitor and another input switch circuit, and
- a common node of the high-side switch and the low-side switch is connected to a corresponding flying capacitor.

6. The voltage step down dc-dc converter of claim 1, wherein each of the first and second output switch circuits comprises:
- a respective low-side switch; or
- a respective high-side switch and a respective low-side switch connected in series;
- wherein the high-side switch is connected to a biasing voltage capacitor, and the low-side switch is connected to ground, and
- the low-side switch is connected to either an inductor or a common node of an inductor and a flying capacitor, and
- the flying capacitor is connected to the first or second input switch circuit, and the inductor is connected to an output capacitor.

7. The voltage step down dc-dc converter of claim 5 or 6, wherein the voltages of the capacitors are inherently balanced and steady at voltages that are proportional to the input voltage.

8. The voltage step down dc-dc converter of claim 1, wherein each of the first and second input switch circuits or each of the first and second output switch circuits has an inherent capability of zero voltage switching or zero current switching.

9. The voltage step down dc-dc converter of claim 1, wherein the DC shift switch circuit comprises:
- a high-side switch and a low-side switch connected in series; or
- a high-side switch, a low-side switch and a floating switch connected in series; or
- a high-side switch, a low-side switch, a floating high-side switch and a floating low-side switch connected in series.

10. A scalable switched capacitor integrated buck (SCIB) regulator comprising:
- first and second input power stages, the first input power stage coupled to an input terminal, and the first and second input power stages configured to step down an input voltage at the input terminal to a biasing voltage;
- first and second output power stages connected in series with the first and second input power stages respectively, the first and second output power stages comprising respective first and second buck regulator circuits having respective first and second voltage outputs, and the first and second buck regulator circuits configured to regulate the biasing voltage to different output voltages at the first and second voltage outputs; and
- a DC shift switch circuit coupled in series between the first and second input power stages, the DC shift switch circuit configured to compensate voltage differences between the first and second input power stages.

11. The SCIB regulator of claim 10, wherein the input voltage is a voltage from 4 to 60 volts, and the different output voltages are voltages from 0.5 to 15 volts.

12. The SCIB regulator of claim 10, wherein each of the first and second input power stages or each of the first and second output power stages comprises a respective high-side switch and a respective low-side switch connected in series and a respective half bridge gate driver.

13. The SCIB regulator of claim 10, wherein the DC shift switch circuit comprises:
- a power stage; or
- a power stage and a floating switch connected in series; or
- two power stages connected in series.

* * * * *